(12) United States Patent
Seth et al.

(10) Patent No.: US 11,504,822 B2
(45) Date of Patent: Nov. 22, 2022

(54) ABRASIVE ARTICLE HAVING A NON-UNIFORM DISTRIBUTION OF OPENINGS

(71) Applicants: SAINT-GOBAIN ABRASIVES, INC., Worcester, MA (US); SAINT-GOBAIN ABRASIFS, Conflans-Sainte-Honorine (FR)

(72) Inventors: Anuj Seth, Northborough, MA (US); Julie M. Dinh-Ngoc, Holliston, MA (US); Vivek Cheruvari Kottieth Raman, Toronto (CA); Paul A. Krupa, Grand Island, NY (US); James M. Garrah, Gananoque (CA)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 1046 days.

(21) Appl. No.: 16/104,649

(22) Filed: Aug. 17, 2018

(65) Prior Publication Data

US 2019/0001464 A1 Jan. 3, 2019

Related U.S. Application Data

(63) Continuation of application No. 15/481,526, filed on Apr. 7, 2017, now Pat. No. 10,076,820, which is a
(Continued)

(51) Int. Cl.
*B24B 55/10* (2006.01)
*B24D 9/08* (2006.01)
(Continued)

(52) U.S. Cl.
CPC ............ *B24B 55/105* (2013.01); *B24B 37/26* (2013.01); *B24B 55/06* (2013.01); *B24B 55/102* (2013.01);
(Continued)

(58) Field of Classification Search
CPC ........... B24B 37/16; B24B 37/26; B24D 7/10; B24D 7/02
See application file for complete search history.

(56) References Cited

U.S. PATENT DOCUMENTS 3,353,308 A 11/1967 Zane
3,426,486 A 2/1969 Kubsh
(Continued)

FOREIGN PATENT DOCUMENTS

CN 1269277 A 10/2000
CN 1549757 A 11/2004
(Continued)

OTHER PUBLICATIONS

Algorithmic Bontany (https://web.archive.org/web/20111103170453/http://algorithmicbotany.org/papers/abop/abop-ch4.pdf) (Year: 2011).*
(Continued)

*Primary Examiner* — Joseph J Hail
*Assistant Examiner* — Robert C Moore
(74) *Attorney, Agent, or Firm* — Abel Schillinger, LLP; Joseph P. Sullivan

(57) ABSTRACT

An abrasive article having a plurality of apertures arranged in a non-uniform distribution pattern, wherein the pattern is spiral or phyllotactic, and in particular those patterns described by the Vogel equation. Also, provided is a back-up pad having a spiral or phyllotactic patterns of air flow paths, such as in the form of open channels. The back-up pad can be specifically adapted to correspond with an abrasive article having a non-uniform distribution pattern. Alternatively, the
(Continued)

back-up pad can be used in conjunction with conventional perforated coated abrasives. The abrasive articles having a non-uniform distribution pattern of apertures and the back-up pads can be used together as an abrasive system.

4 Claims, 65 Drawing Sheets

Related U.S. Application Data continuation of application No. 13/731,768, filed on Dec. 31, 2012, now Pat. No. 9,656,366.

(60) Provisional application No. 61/582,308, filed on Dec. 31, 2011.

(51) Int. Cl.
| | |
|---|---|
| *B24D 11/00* | (2006.01) |
| *C09K 3/14* | (2006.01) |
| *B24B 37/26* | (2012.01) |
| *B24B 55/06* | (2006.01) |

(52) U.S. Cl.
CPC ............... *B24D 9/08* (2013.01); *B24D 11/00* (2013.01); *C09K 3/1409* (2013.01); *C09K 3/1436* (2013.01)

(56) References Cited

U.S. PATENT DOCUMENTS

| | | | |
|---|---|---|---|
| 4,158,935 | A | 6/1979 | Robert |
| 5,108,463 | A | 4/1992 | Buchanan |
| 5,137,542 | A | 8/1992 | Buchanan et al. |
| 5,152,917 | A | 10/1992 | Pieper et al. |
| 5,328,716 | A | 7/1994 | Buchanan |
| 5,417,726 | A | 5/1995 | Stout et al. |
| 5,505,747 | A | 4/1996 | Chesley et al. |
| 5,560,753 | A | 10/1996 | Schnabel et al. |
| 5,565,011 | A | 10/1996 | Follett et al. |
| 5,573,619 | A | 11/1996 | Benedict et al. |
| 5,650,039 | A | 7/1997 | Talieh |
| 5,692,949 | A | 12/1997 | Sheffield et al. |
| 5,700,302 | A | 12/1997 | Stoetzel et al. |
| 5,810,650 | A | 9/1998 | Jöst |
| 5,842,910 | A | 12/1998 | Krywanczyk et al. |
| 5,989,112 | A | 11/1999 | Long et al. |
| 6,059,644 | A | 5/2000 | Manor et al. |
| 6,281,681 | B1 | 8/2001 | Cline et al. |
| 6,312,325 | B1 | 11/2001 | Van Osenbruggen |
| 6,368,078 | B1 | 4/2002 | Palumbo |
| 6,533,684 | B2 | 3/2003 | Winfield et al. |
| 6,685,548 | B2 | 2/2004 | Chen et al. |
| 6,699,143 | B2 | 3/2004 | Nardacci et al. |
| 7,108,594 | B2 | 9/2006 | Swei |
| D532,800 | S | 11/2006 | Braunschweig et al. |
| D533,200 | S | 12/2006 | Braunschweig et al. |
| D536,714 | S | 2/2007 | Braunschweig et al. |
| D538,312 | S | 3/2007 | Braunschweig et al. |
| D538,313 | S | 3/2007 | Braunschweig et al. |
| D541,317 | S | 4/2007 | Braunschweig et al. |
| D543,562 | S | 5/2007 | Braunschweig et al. |
| 7,244,170 | B2 | 7/2007 | Woo et al. |
| 7,390,244 | B2 | 6/2008 | Woo et al. |
| D572,019 | S | 7/2008 | Braunschweig et al. |
| 7,393,269 | B2 | 7/2008 | Rambosek et al. |
| 7,441,927 | B1 | 10/2008 | Kling |
| 7,452,265 | B2 | 11/2008 | Rambosek et al. |
| D582,684 | S | 12/2008 | Braunschweig et al. |
| D586,370 | S | 2/2009 | Owen et al. |
| 7,507,267 | B2 | 3/2009 | Hall et al. |
| 7,628,829 | B2 | 12/2009 | Woo et al. |
| 7,927,187 | B2 | 4/2011 | Watanabe et al. |
| 7,927,234 | B2 | 4/2011 | Aoyama |
| 7,959,694 | B2 | 6/2011 | Braunschweig et al. |
| D645,065 | S | 9/2011 | Braunschweig et al. |
| 8,080,072 | B2 | 12/2011 | Woo et al. |
| 10,076,820 | B2 | 9/2018 | Seth et al. |
| 2003/0003856 | A1 | 1/2003 | Swei |
| 2004/0266326 | A1 | 12/2004 | Shiho et al. |
| 2005/0194681 | A1 | 9/2005 | Hu et al. |
| 2006/0019579 | A1 | 1/2006 | Braunschweig et al. |
| 2006/0160481 | A1 | 7/2006 | Miyanaga |
| 2007/0028526 | A1 | 2/2007 | Woo et al. |
| 2007/0243803 | A1 | 10/2007 | Oka et al. |
| 2008/0081546 | A1 | 4/2008 | Takinami et al. |
| 2008/0216413 | A1 | 9/2008 | Woo et al. |
| 2008/0216414 | A1 | 9/2008 | Braunschweig et al. |
| 2008/0293332 | A1 | 11/2008 | Watanabe et al. |
| 2008/0318506 | A1 | 12/2008 | Brown |
| 2009/0233527 | A1 | 9/2009 | Chung-Fat et al. |
| 2011/0095762 | A1 | 4/2011 | Piccini et al. |
| 2013/0196579 | A1 | 8/2013 | Zaech et al. |
| 2013/0260656 | A1 | 10/2013 | Seth et al. |
| 2017/0209981 | A1 | 7/2017 | Seth et al. |

FOREIGN PATENT DOCUMENTS

| | | | | |
|---|---|---|---|---|
| CN | 2701589 | Y | 5/2005 | |
| CN | 1964818 | A | 5/2007 | |
| CN | 1990183 | A * | 7/2007 | ............. B24B 37/26 |
| CN | 101232973 | A | 7/2008 | |
| CN | 101626869 | A | 1/2010 | |
| CN | 101885164 | A | 11/2010 | |
| DE | 102012201329 | A1 | 8/2013 | |
| EP | 0868262 | B1 | 2/2001 | |
| EP | 2145733 | A1 | 1/2010 | |
| EP | 2145733 | A1 * | 1/2010 | ............ B24B 55/102 |
| JP | S61184657 | U | 11/1986 | |
| JP | H0839423 | A | 2/1996 | |
| JP | H10249710 | A | 9/1998 | |
| JP | H11239979 | A | 9/1999 | |
| JP | 2004071985 | A | 3/2004 | |
| JP | 2004514827 | A | 5/2004 | |
| JP | 2007283426 | A | 11/2007 | |
| JP | 2008087082 | A | 4/2008 | |
| JP | 2008290197 | A | 12/2008 | |
| JP | 2010520078 | A | 6/2010 | |
| TW | 567121 | B | 12/2003 | |
| WO | 1996013358 | A1 | 5/1996 | |
| WO | 1997033718 | A1 | 9/1997 | |
| WO | 2008109211 | A1 | 9/2008 | |
| WO | WO-2008109211 | A1 * | 9/2008 | ............ B24D 11/001 |
| WO | 2009088772 | A2 | 7/2009 | |
| WO | 2011021087 | A1 | 2/2011 | |
| WO | 2013102206 | A1 | 7/2013 | |

OTHER PUBLICATIONS

Certificate of Trademark Registration, Registration No. EU 001161293, published Sep. 25, 2009, Office for Harmonization in the Internal Market (Trade Marks and Designs), Trade Marks and Register Department, 4 pages.
International Search Report and Written Opinion for PCT/US2012/072304, dated Apr. 16, 2013, 12 pages.
Extended European Search Report for EP12861139.9, dated Jul. 8, 2015, 7 pages.
Extended European Search Report for EP16168746.2, dated Jul. 27, 2016, 6 pages.
Simon Zurcher, "line." Undergraduate Thesis, submitted to Fachhochschule Nordwestschweiz, Hochschule für Gestaltung und Kunst, 2011, 32 pages, CH.
Duan Min, Study of the design, manufacture, and motion field of a bionic polishing pad based on a sunflower seed pattern, Shenyang University of Technology, Nov. 30, 2011, pp. 12-17.
Third Party Observation submitted in EP12861139.9, dated Jun. 20, 2017, 13 pages.

(56) References Cited

OTHER PUBLICATIONS

Hoehn, Alfred, "Fibonacci- und Lucasfolgen in Der Phyllotaxis," Dec. 6, 2011, 12 pages, CH <http://www.alfredhoehn.ch/Phyllotaxis.pdf>.

\* cited by examiner

MultiAir 5" 125 holes 10.5% removed area 2.225 mm dia 350 holes 5" disc
10.7% removed area Area under the line 3 mm²

2.6 mm dia 148 holes 5" disc 7.8% removed area

Area under the line 51 mm²

6in/ 246/ 2.6mm holes

6in/ 441/ 1.4mm holes 45 degree rotation

ABRASIVE ARTICLE HAVING A NON-UNIFORM DISTRIBUTION OF OPENINGS

CROSS-REFERENCE TO RELATED APPLICATIONS

This application is a continuation of and claims priority under 35 U.S.C. § 120 to U.S. patent application Ser. No. 15/481,526 entitled "ABRASIVE ARTICLE HAVING A NON-UNIFORM DISTRIBUTION OF OPENINGS", by Anuj SETH et al., filed Apr. 7, 2017, which claims priority to Ser. No. 13/731,768 entitled "ABRASIVE ARTICLE HAVING A NON-UNIFORM DISTRIBUTION OF OPENINGS", by Anuj SETH et al., filed Dec. 31, 2012, now U.S. Pat. No. 9,656,366 which issued on May 23, 2017, which claims priority under 35 U.S.C. § 119(e) to U.S. Provisional Patent Application No. 61/582,308, entitled "ABRASIVE ARTICLE HAVING A NON-UNIFORM DISTRIBUTION OF OPENINGS", by Anuj SETH et al., filed Dec. 31, 2011, which are assigned to the current assignee hereof and incorporated herein by reference in their entireties for all purposes.

FIELD OF THE DISCLOSURE

The present disclosure relates generally to abrasives, and more particularly to abrasive articles having a pattern of openings, wherein the pattern is a non-uniform distribution pattern.

BACKGROUND

Abrasive articles, such as coated abrasive articles, are used in various industries to abrade work pieces by hand or by machine processes, such as by lapping, grinding, or polishing. Machining utilizing abrasive articles spans a wide industrial and consumer scope from optics industries, automotive paint repair industries, and metal fabrication industries to construction and carpentry. Machining, such as by hand or with use of commonly available tools such as orbital polishers (both random and fixed axis), and belt and vibratory sanders, is also commonly done by consumers in household applications. In each of these examples, abrasives are used to remove surface material and affect the surface characteristics (e.g., planarity, surface roughness, gloss) of the abraded surface. Additionally, various types of automated processing systems have been developed to abrasively process articles of various compositions and configurations.

Surface characteristics include, among others, shine, texture, gloss, surface roughness, and uniformity. In particular, surface characteristics, such as roughness and gloss, are measured to determine quality. For example, when coating or painting a surface certain imperfections or surface defects may occur during the application or curing process. Such surface imperfections or surface defects might include pock marks, "orange peel" texture, "fish eyes", or encapsulated bubble and dust defects. Typically, such defects in a painted surface are removed by first sanding with a coarse grain abrasive, followed by subsequently sanding with progressively finer grain abrasives, and even buffing with wool or foam pads until a desired smoothness is achieved. Hence, the properties of the abrasive article used will generally influence the surface quality.

In addition to surface characteristics, industries are sensitive to cost related to abrasive operations. Factors influencing operational costs include the speed at which a surface can be prepared and the cost of the materials used to prepare that surface. Typically, the industry seeks cost effective materials having high material removal rates.

However, abrasives that exhibit high removal rates often exhibit poor performance in achieving desirable surface characteristics. Conversely, abrasives that produce desirable surface characteristics often have low material removal rates. For this reason, preparation of a surface is often a multi-step process using various grades of abrasive sheets. Typically, surface flaws (e.g., scratches) introduced by one step are repaired (e.g., removed) using progressively finer grain abrasives in one or more subsequent steps. Therefore, abrasives that introduce scratches and surface flaws result in increased time, effort, and expenditure of materials in subsequent processing steps and an overall increase in total processing costs.

An additional factor affecting material removal rate and surface quality is the "loading" of the abrasive with "swarf", i.e., the material that is abraded from the workpiece surface, which tends to accumulate on the surface of, and between, the abrasive particles. Loading is undesirable because it typically reduces the effectiveness of the abrasive product and can also negatively affect surface characteristics by increasing the likelihood of scratching defects.

Although various efforts have been made to reduce the accumulation of swarf, such as the introduction of fluids onto the workpiece surface to wash away swarf, as well as the application of vacuum systems to carry away swarf as it is generated, there continues to be a demand for improved, cost effective, abrasive articles, processes, and systems that promote efficient abrasion and improved surface characteristics.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
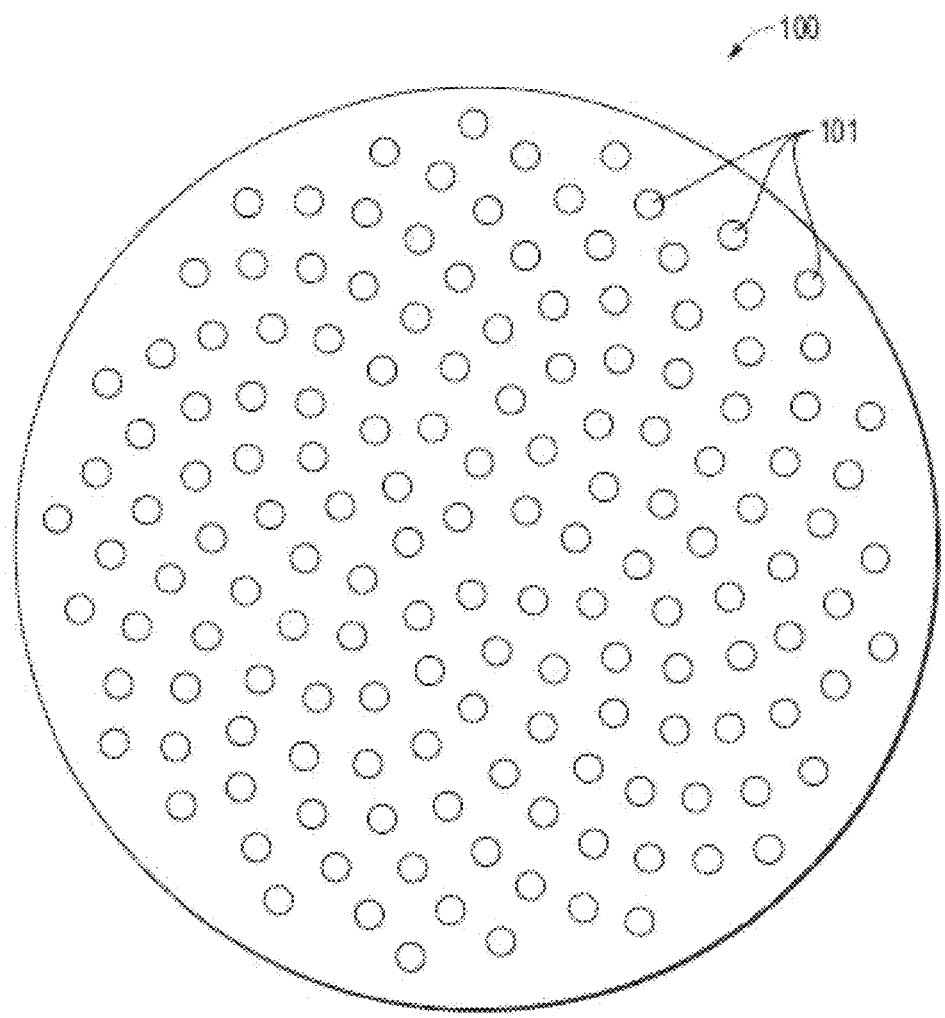
FIG. 1 is an exemplary embodiment of a coated abrasive disc having an aperture pattern with a controlled non-uniform distribution of the apertures according to the present invention.

In an embodiment, an abrasive article comprises a coated abrasive having a plurality of holes (hereinafter equally referred to as "perforations" or "apertures") arranged in a pattern having a controlled non-uniform distribution. The aperture pattern can be any pattern having a controlled non-uniform distribution, including a radial pattern, a spiral pattern, a phyllotactic pattern, an asymmetric pattern, or combinations thereof. The pattern can be partially, substantially, or fully asymmetric. The pattern can cover (i.e., be distributed over) the entire abrasive article, can cover substantially the entire abrasive article (i.e. greater than 50% but less than 100%), can cover multiple portions of the abrasive article, or can cover only a portion of the abrasive article.

A controlled "non-uniform distribution" means that the aperture pattern has a controlled asymmetry (i.e., a controlled randomness), such that although the distribution of apertures can be described by or predicted by, for example, a radial, spiral, or phyllotactic equation, the aperture pattern still exhibits at least a partial to complete asymmetry.

The controlled asymmetry can be a controlled reflection asymmetry (also called mirror symmetry, line symmetry, and bilateral symmetry), a controlled rotational asymmetry, a controlled translational symmetry, controlled glide reflection symmetry, or combinations of thereof. An example of a non-uniform distribution can be demonstrated for a radial, spiral, or phyllotactic aperture pattern having a rotational symmetry of an order of one, meaning that such an aperture pattern has no rotational symmetry because the aperture pattern repeats itself only once during a rotation of 360° about its center. In other words, if two copies of the same exact pattern are placed directly over each other and one copy is held constant while the second copy is rotated 360° about its center, all of the apertures of both copies will come into alignment only once during the 360° rotation.

Typically, all apertures of an aperture pattern (i.e., the entire pattern) will possess a controlled asymmetry. However, it is contemplated that aperture patterns according to the present embodiments also includes aperture patterns where only a portion of the total number of apertures of the aperture pattern (i.e., a portion of the pattern) possesses a controlled asymmetry. Such can occur for instance by combining, or substituting, a portion of a uniformly distributed pattern, or a completely random pattern, with a pattern having controlled a controlled non-uniform distribution such that only a portion of the apertures of the resulting aperture pattern have a controlled non-uniform distribution. The portion of the total apertures that have a controlled non-uniform can be quantified as a discrete number, or as a fraction, percentage, or ratio of the total number of apertures of the aperture pattern. In an embodiment, at least 50%, at least 55%, at least 60%, at least 65%, at least 70%, at least 80%, at least 85%, at least 90%, at least 95%, at least 96%, at least 97%, at least 98%, at least 99%, at least 99.5%, at least 99.9% of the apertures of the aperture pattern possess a controlled asymmetry. The portion of apertures of the aperture pattern possessing a controlled asymmetry can be within a range comprising any pair of the previous upper and lower limits. In a particular embodiment, from about 50% to about 99.9%, from about 60% to about 99.5%, from about 75% to about 99%% of the aperture pattern possesses a controlled non-uniform distribution.

In another embodiment, the aperture pattern possesses controlled asymmetry over at least approximately 5 apertures, at least approximately 10 apertures, at least approximately 15 apertures, at least approximately 20 apertures, at least approximately 25 apertures, or at least approximately 50 apertures. In another embodiment, the aperture pattern possesses controlled asymmetry over not greater than approximately 100,000 apertures, not greater than approximately 10,000 apertures, not greater than approximately 5,000 apertures, not greater than approximately 2,500 apertures, not greater than approximately 1,000 apertures, not greater than approximately 750 apertures, or not greater than approximately 500 apertures. The number of apertures possessing controlled asymmetry can be within a range comprising any pair of the previous upper and lower limits.

As stated above, an aperture pattern of the present embodiments can be any pattern having a controlled non-uniform distribution, including a radial pattern, a spiral pattern, a phyllotactic pattern, an asymmetric pattern, or combinations thereof. A radial pattern can be any pattern that appears to radiate from a central point, such as spokes from the hub of a wheel.

In an embodiment, a spiral pattern can be any curve, or set of curves, that emanates from a central point on the abrasive article and extends progressively farther away as it revolves around the central point. The central point can be located at or near the center of the abrasive article, or alternatively, away from the center of the abrasive article. There can be a single spiral or multiple spirals (i.e., a plurality of spirals). The spirals can be discreet or continuous, separate or joined. Separate spirals can emanate from different central points (i.e., each spiral has its own central point), can emanate from a common central point (i.e., each spiral shares a central point), or combinations thereof. Spiral patterns can include: an Archimedean spiral; a Euler spiral, Cornu spiral, or clothoid; a Fermat's spiral; a hyperbolic spiral; a lituus; a logarithmic spiral; a Fibonacci spiral; a golden spiral; or combinations thereof.

Figure 2:
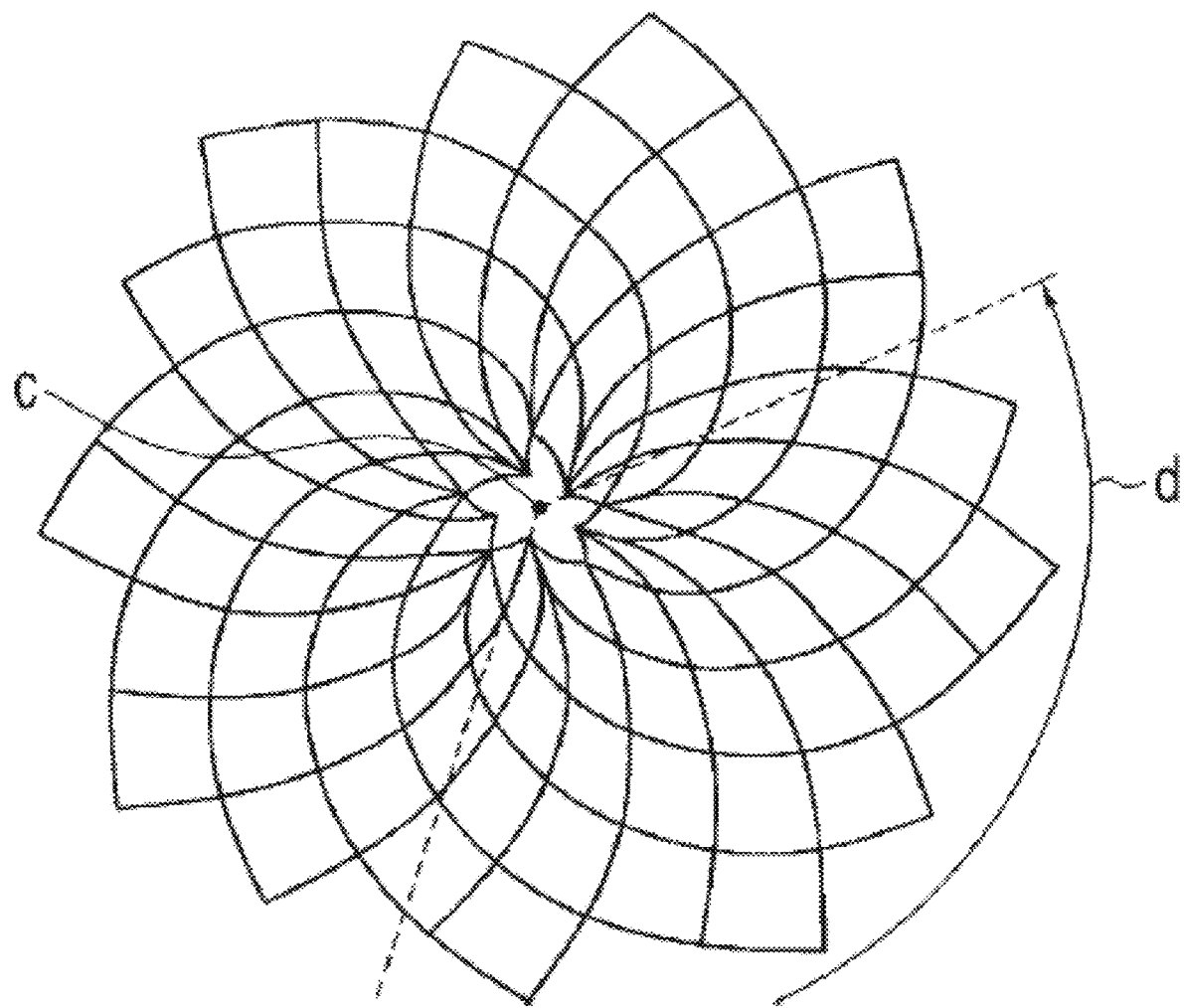
FIG. 2 is an illustration of a phyllotactic spiral pattern having clockwise and counterclockwise parastichy according to the present invention.
Figure 3:
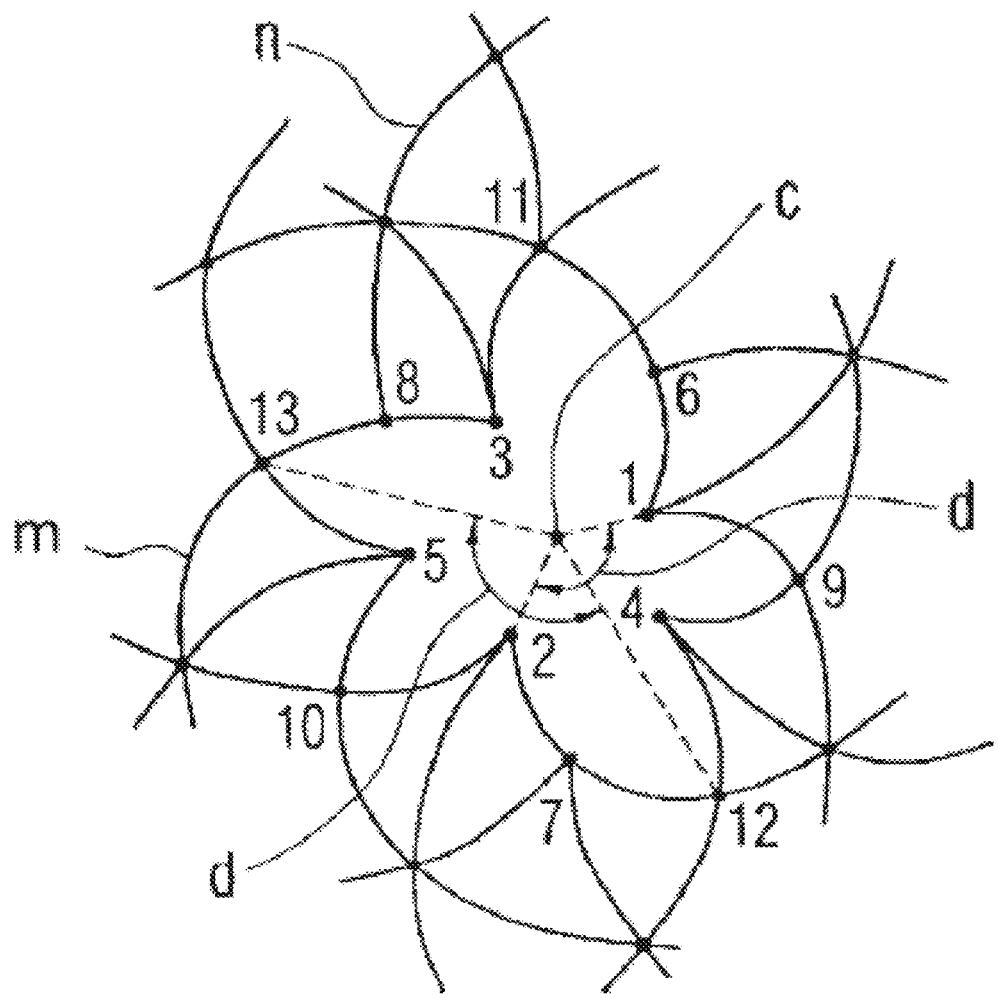
FIG. 3 is another illustration of a phyllotactic spiral pattern having clockwise and counterclockwise parastichy according to the present invention.

In an embodiment, the pattern can be a phyllotactic pattern. As used herein, "a phyllotactic pattern" means a pattern related to phyllotaxis. Phyllotaxis is the arrangement of lateral organs such as leaves, flowers, scales, florets, and seeds in many kinds of plants. Many phyllotactic patterns are marked by the naturally occurring phenomenon of conspicuous patterns having arcs, spirals, and whorls. The pattern of seeds in the head of a sunflower is an example of this phenomenon. As shown in FIG. 2 and FIG. 3, multiple arcs or spirals, also called parastichy, can have their origin at a center point (C) and travel outward, while other spirals originate to fill in the gaps left by the inner spirals. See Jean's Phyllotaxis A Systemic Study in Plant Morphogenesis at p. 17. Frequently, the spiral-patterned arrangements can be viewed as radiating outward in both the clockwise and counterclockwise directions. As shown in FIG. 3, these type of patterns have visibly opposed parastichy pairs that can be denoted by (m, n) where the number of spirals or arcs at a distance from the center point radiating in a clockwise direction is "m" and the number of spirals or arcs radiating counterclockwise is "n." Further, the angle between two consecutive spirals or arcs at their center is called the divergence angle "d." It has been surprisingly discovered by the inventors that phyllotactic patterns are useful in creating new aperture patterns for abrasive articles, in particular coated abrasive articles.

In an embodiment, the aperture pattern has a number of clockwise spirals and a number of counter-clock wise spirals, wherein the number of clockwise spirals and the number of counterclockwise spirals are Fibonacci numbers or multiples of Fibonacci numbers. In a particular embodiment, the number of clockwise spirals and the number of counterclockwise spirals is, as a pair (m, n): (3, 5), (5, 8), (8, 13), (13, 21), (21, 34), (34, 55), (55, 89), (89, 144) or a multiple of such pairs. In another embodiment, the number of clockwise spirals and the number of counterclockwise spirals are Lucas numbers or multiples of Lucas numbers. In a particular embodiment, the number of clockwise spirals and the number of counterclockwise spirals is, as a pair (m, n): (3, 4), (4, 7), (7, 11), (11, 18), (18, 29), (29, 47), (47, 76), or (76, 123), or a multiple of such pairs. In another embodiment, the number of clockwise spirals and the number of counterclockwise spirals are any numbers in a ratio that converges on the golden ratio, wherein the golden ratio is equal to the sum of one plus the square root of five, divided by two $(1+\sqrt{15})/2$, which is approximately equal to 1.6180339887. In a particular embodiment, the ratio of the clockwise spirals to the counterclockwise spirals is approximately equal to the golden ratio.

As already mentioned above, it has been observed in nature that the seeds of the sunflower plant are arranged in a spiral phyllotactic pattern. In an embodiment, the aperture pattern is a sunflower pattern.

The sunflower pattern has been described by Vogel's model, which is a type of "Fibonacci spiral", or a spiral in which the divergence angle between successive points is a fixed Fibonacci angle that approaches the golden angle, which is equal to 137.508°.

Figure 4:
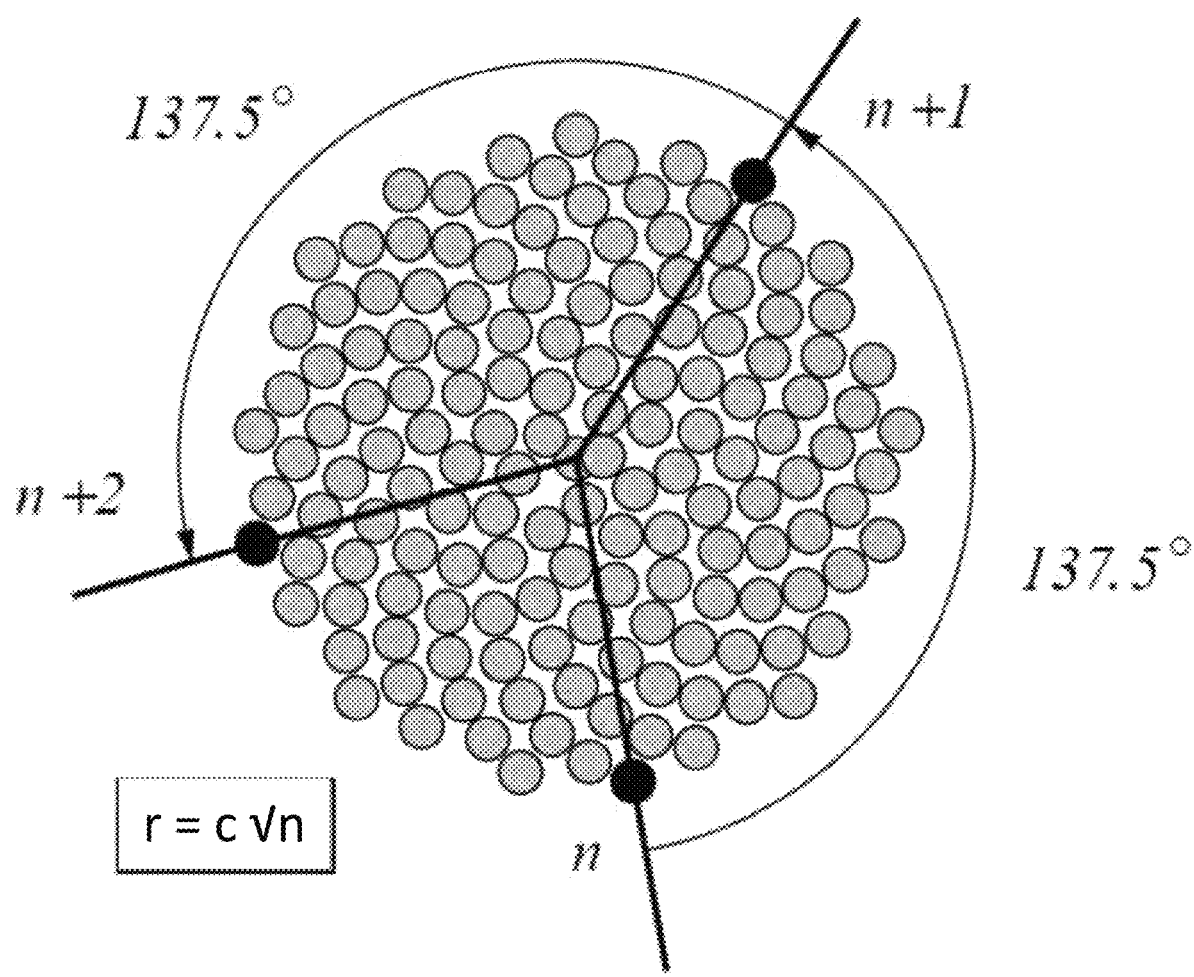
FIG. 4 is an illustration of the Vogel model in accordance with the present invention.

FIG. 4 illustrates the Vogel model, which is:

$$\varphi = n^*\alpha, \; r = c\sqrt{n} \tag{Eq. 1}$$

where:

n is the ordering number of a floret, counting outward from the center;

$\varphi$ is the angle between a reference direction and the position vector of the nth floret in a polar coordinate system originating at the center of the capitulum, such that the divergence angle, $\alpha$, between the position vectors of any two successive florets is constant, and with regard to the sunflower pattern, at 137.508°;

r is the distance from the center of the capitulum and the center of the nth floret; and c is a constant scaling factor.

In an embodiment, the aperture pattern is described by the Vogel model or a variation of the Vogel model. In a particular embodiment, the aperture pattern is described by the Vogel model where:

n is the ordering number of an aperture, counting outward from the center of the aperture pattern;

$\varphi$ is the angle between a reference direction and a position vector of the nth aperture in a polar coordinate system originating at the center of the aperture pattern, such that the divergence angle between the position vectors of any two successive apertures is a constant angle $\alpha$;

r is the distance from the center of the aperture pattern to the center of the nth aperture; and c is a constant scaling factor.

As stated above, all, substantially all, or a portion of the apertures of the aperture pattern will be described by (i.e., conform to) the Vogel model. In an embodiment, all the apertures of the aperture pattern are described by the Vogel model. In another embodiment at least 50%, at least 60%, at least 70%, at least 80%, at least 90%, at least 95%, at least 99% of the apertures are described by the Vogel model.

The inventors have surprisingly found that phyllotactic patterns are useful in creating new aperture patterns that improve the performance of abrasive articles, including fixed abrasive articles, such as bonded abrasive articles and coated abrasive articles. In particular, phyllotactic patterns are useful in creating new aperture patterns for coated abrasive articles. Phyllotactic aperture patterns help solve the competing problems of achieving a high removal rate of surface material while still achieving an acceptable surface quality, reducing the amount of swarf loading on the abrasive surface, and maintaining a high durability and long useful life of the abrasive. This is surprising, in part, in at least the following respects. First, the phyllotactic aperture patterns of the present embodiments unexpectedly provide superior swarf removal coverage and have a more complete distribution of swarf extraction sites (i.e., apertures) over the face of the abrasive compared to state-of-the-art abrasive aperture patterns, even when having a total aperture area that is less than the total aperture area of a state-of-the-art aperture pattern. Second, phyllotactic aperture patterns of the present embodiments unexpectedly provide at least comparable to superior abrasive performance (e.g., cumulative material cut) compared to state-of-the-art aperture patterns, with and without the application of vacuum, even when the total abrasive area is less than that of state-of-the-art aperture patterns. Third, phyllotactic patterns of the present embodiments can unexpectedly provide an increased abrasive area compared to state-of-the art aperture patterns even while still providing aperture coverage that is more complete than that of state-of-the art aperture patterns. Additionally, as discussed in more detail later in the application, the effectiveness and performance of the present embodiments can be even further enhanced when paired with a co-operative back-up pad and vacuum system.

It will be appreciated that important aspects of aperture pattern design for coated abrasive articles include the percentage of total abrasive surface area, the percentage of total area devoted to the apertures (i.e., the aperture area); the ratio of abrasive surface area to aperture area, the predicted aperture area coverage as the abrasive article is in use (e.g., rotation in an orbital sander, oscillation in a sheet sander, continuous lateral movement in a belt sander), the scaling factor, the number of apertures, the divergence angle between the apertures, the size of the apertures, the distance between adjacent apertures, and the distance between the outermost apertures and the edge, or edges, of the coated abrasive article.

Sizes of Abrasive Discs

There are various sizes of abrasives that are commonly used in industry and by commercial consumers that typically range from about fractions of an inch in diameter up to feet in diameter. The present aperture patterns are suitable for use on abrasives of most any size, including various standard sizes of abrasive discs (e.g., 3 inch to 20 inch). In an embodiment, the abrasive article is a circular disc having a diameter of at least about 0.25 inches, at least about 0.5 inches, at least about 1.0 inches, at least about 1.5 inches, at least about 2.0 inches, at least about 2.5 inches, or at least about 3.0 inches. In another embodiment, the abrasive article is a circular disc having a diameter of not greater than about 72 inches, not greater than about 60 inches, not greater than about 48 inches, not greater than about 36 inches, not greater than about 24 inches, not greater than about 20 inches, not greater than about 18 inches, not greater than about 12 inches, not greater than about 10 inches, not greater than about 9 inches, not greater than about 8 inches, not greater than about 7 inches, or not greater than about 6 inches. In another embodiment, the abrasive article has a size in the range from about 0.5 inches in diameter to about 48 inches in diameter, about 1.0 inch in diameter to about 20 inches in diameter, about 1.5 inches in diameter to about 12 inches in diameter.

Total Potential Surface Area

The size and shape of the abrasive article determines the total potential surface area of the abrasive article. For instance, an abrasive disc having a 1 inch diameter has a total potential surface area of 0.7854 in$^2$. As another example, a rectangular abrasive sheet measuring 2 inches by 3 inches would have a total potential surface area of 6 in$^2$.

Total Aperture Area

The total aperture area affects the amount of swarf extraction. Typically, as the amount of aperture area increases, the amount of swarf extraction increases, which tends to maintain, or sometimes improve the abrasive article's material removal rate (i.e. "cut" rate) during usage. However, increasing the amount of aperture area also directly reduces the amount of available abrasive area, which at a certain point will reduce the material removal rate. In an embodiment, the total aperture area is equal to the sum of the area of all the apertures on the face of the abrasive article. In an embodiment, the total aperture area is at most about 0.5% of the total potential surface area for the abrasive article, at least about 0.75%, at least about 1.0%, at least about 1.25%, at least about 1.5%, at least about 1.75%, at least about 2.0%, at least about 2.25%, at least about 2.5%, or at least about 3.0%. In another embodiment, the total aperture area is not greater than about 50%, not greater than about 45%, not greater than about 40%, not greater than about 35%, not greater than about 30%, not greater than about 25%, not greater than about 20%, not greater than about 15%, or not greater than about 12%. The amount of the total aperture area can be within a range comprising any pair of the previous upper and lower limits. In another embodiment, the total aperture area ranges from about 0.5% to about 35%, about 1.0% to about 25%, about 1.5% to about 15%, or about 2.0% to about 10%. In a particular embodiment, the amount of total aperture area is in the range of about 2.5% to about 10%. The total aperture are may be considered as a discreet amount instead of a percentage. For example, an abrasive five inch disc can have a total aperture area ranging from about 0.0982 in$^2$ to about 9.8175 in$^2$.

Total Abrasive Surface Area

The total abrasive surface area affects the amount surface material removed. Typically, as the amount of total abrasive surface area is increased, the amount of surface material removed is increased. Also typically, as the amount of surface material removed is increased, both the tendency for swarf to build-up is increased and the surface roughness tends to increase. In an embodiment, the total abrasive surface area of the coated abrasive is equal to the total potential surface of the abrasive article (i.e., the abrasive surface area if there were no apertures) minus the total aperture area (i.e., the sum of the area of all the apertures). Thus, the amount of the total abrasive surface area can range from about 50% to about 99.5% of the total potential surface area, depending on the amount of desired aperture area. For example, a 5-inch disc can have a total abrasive surface area ranging from about 9.8175 in$^2$ to about 19.5368 in$^2$.

Ratio of Total Aperture Area to Total Abrasive Surface Area

In an embodiment, the ratio of total aperture area to total abrasive surface area is at least about 1:199, at least about 1:99, at least about 1:65.7; at least about 1:49, or at least about 1:39. In another embodiment, the ratio of total aperture area to total abrasive area is not greater than about 1:1.9, not greater than about 1:2.0, not greater than about 1:2.3, not greater than about 1:3.0, not greater than about 1:3.5, not greater than about 1:4.0, not greater than about 1:5.7, or not greater than about 1:9.0. The ratio of total aperture area to total abrasive area can be within a range comprising any pair of the previous upper and lower limits. In another embodiment, the ratio of total aperture area to total abrasive area ranges from about 1:99 to about 1:1.9, about 1:65.7 to about 1:2.0, about 1:39.0 to about 1:3.0, or about 1:32.3 to about 1:5.7. In a particular embodiment, the ratio of total aperture area to total abrasive surface area is in the range of about 1:65.7 to 1:9.0.

Number of Apertures

The number of apertures influences the total amount of aperture area and the amount of total abrasive area. Additionally, the number of apertures affects the density and distribution of aperture coverage on the surface of the abrasive article, which in turn directly affects the swarf extraction efficiency of the abrasive article. In an embodiment, the number of apertures is at least about 5, at least about 10, at least about 15; at least about 18, or at least about 21. In another embodiment, the number of apertures is not greater than about 100,000; not greater than about 50,000; not greater than about 10,000; not greater than about 1,000; not greater than about 800; not greater than about 750; not greater than about 600; or not greater than about 550. The number of apertures can be within a range comprising any pair of the previous upper and lower limits. In another embodiment, the number of apertures ranges from about 21 to about 10,000; about 25 to about 1,000; about 30 to about 750; or about 35 to about 550. In a particular embodiment, the number of apertures is in the range of about 21 to about 550.

Divergence Angle

Figure 5A:
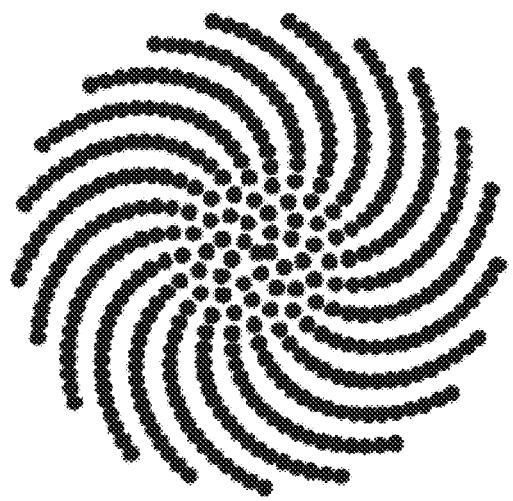
FIG. 5A-5C are illustrations of phyllotactic spiral patterns conforming to the Vogel model that have differing divergence angles according to the present invention.
Figure 5B:
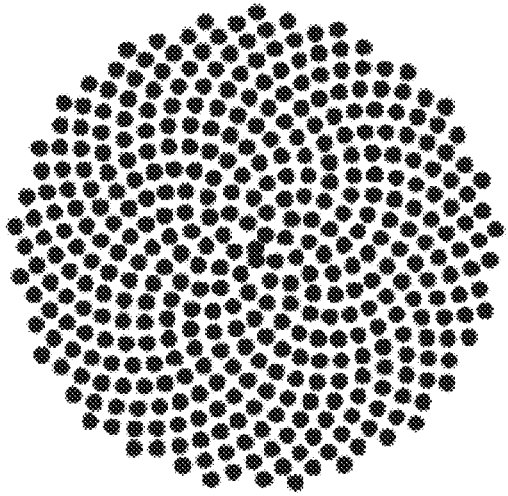
Figure 5C:
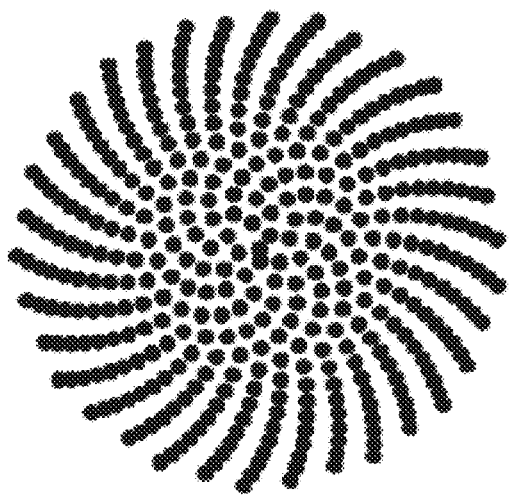
Figure 6A:
FIG. 6A-6F are illustrations of exemplary embodiments of aperture slit shapes according to the present invention
Figure 6B:
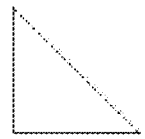
Figure 6C:
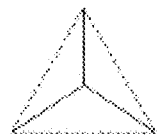
Figure 6D:
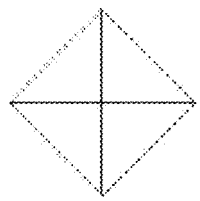
Figure 6E:
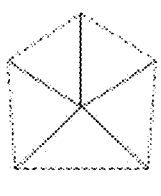
Figure 6F:
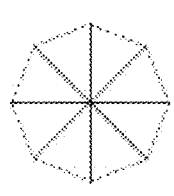

Increasing or decreasing the divergence angle α affects how the apertures are placed within the pattern and the shape of the clockwise and counter clockwise spirals. The divergence angle is equal to 360° divided by a constant or variable value, thus the divergence angle can be a constant value or it can vary. It has been observed that small changes in divergence angle can significantly alter the aperture pattern. FIG. 5a, FIG. 5b, and FIG. 5c show phyllotactic patterns that differ only in the value of the divergence angle. The divergence angle for FIG. 5a is 137.3°. The divergence angle for FIG. 5b is 137.5°. The divergence angle for FIG. 5c is 137.6°. In an embodiment, the divergence angle is at least about 30°, at least about 45°, at least about 60°; at least about 90°, or at least about 120°. In another embodiment, the divergence angle is less than 180°, such as not greater than about 150°. The divergence angle can be within a range comprising any pair of the previous upper and lower limits. In another embodiment, the divergence angle ranges from about 90° to about 179°, about 120° to about 150°, about 130° to about 140°, or about 135° to about 139°. In an embodiment, the divergence angle is determined by dividing 360° by an irrational number. In a particular embodiment, the divergence angle is determined by dividing 360° by the golden ratio. In a particular embodiment, the divergence angle is in the range of about 137° to about 138°, such as about 137.5° to about 137.6°, such as about 137.50° to about 137.51°. In a particular embodiment, the divergence angle is 137.508°.

Distance to the Edge of the Abrasive

Depending on the geometry of the abrasive article and its intended usage, the overall dimensions of the aperture pattern can be determined. The distance from the center of the pattern to the outermost apertures can extend to a distance coterminous with the edge of the abrasive article. Thus, the edges of the outermost apertures can extend to or intersect with the edge of the abrasive article. Alternatively, the distance from the center of the pattern to the outermost apertures can extend to a distance that allows a certain amount of space between the edges of the outermost apertures and the edge of the abrasive article to be free of apertures. The minimum distance from the edges of the outermost apertures can specified as desired. In an embodiment, the minimum distance from the edges of the outermost apertures to the outer edge of the abrasive article is a specific distance, identified as a discreet length or as a percentage of the length of face of the abrasive article upon which the aperture pattern appears. In an embodiment, the minimum distance from the edges of the outermost apertures to the outer edge of the abrasive article can be at least about zero (i.e., the edge of the outermost apertures intersect or are co-terminus with the edge of the abrasive article) ranging to about 15% of the length of the face of the abrasive article.

Size of Apertures

The size of the apertures is determined, at least in part, by the desired total amount of aperture area for the abrasive article. The size of the apertures can be constant throughout the pattern or it can vary within the pattern. In an embodiment, the size of the apertures is constant. In another embodiment, the size of the apertures varies with the distance of the apertures from the center of the pattern.

Scaling factor

The scaling factor influences the overall size and dimensions of the aperture pattern. The scaling factor can be adjusted so that the edges of the outermost apertures are within a desired distance of the outer edge of the abrasive article.

Distance Between Nearest Adjacent Apertures

Along with consideration for the number and size of the apertures, the distance between the centers of the nearest adjacent apertures can be determined. The distance between the centers of any two apertures is a function of the other aperture design considerations. In an embodiment, the shortest distance between the center of any two apertures is never repeated (i.e., the hole-to-hole spacing is never the same exact distance). This type of spacing is also an example of controlled asymmetry.

Aperture Pattern Coverage—Acceptable Amounts of Anomalies

It will be apparent that an aperture pattern need not be applied to an abrasive article in its entirety or in a continuous manner. Portions of an aperture pattern may be applied or skipped such that various divisions or sectors of the face of the abrasive article do not bear the complete aperture pattern. In an embodiment, a half, a third, a quarter, a fifth, a sixth, an eighth, a tenth of the of the aperture pattern may be skipped. In another embodiment, the aperture pattern may be applied to only one or more concentric annular regions of the abrasive article. In another embodiment, it is possible to skip one or more of the apertures that would normally appear in the series of apertures along the individual arcs or spiral arms of the aperture pattern. In an embodiment, every nth aperture, or multiple of every nth aperture could be skipped. In another embodiment, individual apertures, groups of apertures, or apertures according to a specific numerical series can be skipped. Conversely, it is also possible to include a certain amount of additional apertures to the aperture pattern. The addition or subtraction of apertures can be considered as anomalies to the aperture pattern, and a certain amount of anomalies to the pattern, plus or minus, can be acceptable. In an embodiment, an acceptable amount of anomalies to the aperture pattern can range from 0.1% to 10% of the total aperture area of the abrasive article.

Shape of the Apertures

The amount of coverage can be influenced by the shape of the apertures. The shape of the apertures can be regular or irregular. In an embodiment, the shape of the apertures can be in the form of slits, regular polygons, irregular polygons, ellipsoids, circles, arcs, spirals, channels, or combinations thereof. In a particular embodiment, the apertures have the shape of a circle. In another embodiment, the shape of the aperture may be in the form of one or more slits, wherein multiple slits intersect. FIG. 6A-F show examples of such slit shaped apertures. The slits are configured such that if a vacuum is applied to the back of the abrasive article, the flaps created by the slits will bend back, thus creating open apertures resembling polygons, which can have slightly accurate edges. It is believed that swarf removal will be promoted by the bending backward of the flaps, because it will guide swarf directly into the vacuum system and will prevent entrainment of the swarf in any open fibrous layers, such as hook and loop material layers, that might be attached to the backside of the abrasive article.

Method of Making—Apertures

The apertures can be created by standard conversion techniques, including stamping, die-cutting, laser cutting, or combinations thereof. In an embodiment, the apertures are die-cut. In another embodiment, the apertures are laser cut.

Shape of the Abrasive Article

The shape of the abrasive article can be any shape that will accommodate the desired aperture pattern and will be dictated by the intended abrasive process and materials of construction. In an embodiment, the abrasive article is a bonded abrasive article. In another embodiment, the abrasive article is a coated abrasive article. In a particular embodiment, the abrasive article is one of a sheet, belt, or circular disc.

FIG. 1 shows a top view of an embodiment of a coated abrasive article 100 having a plurality of apertures 101 arranged in a pattern having a non-uniform distribution. The coated abrasive is in the shape of a substantially planar (i.e., generally flat) circular disc.

Figure 7:
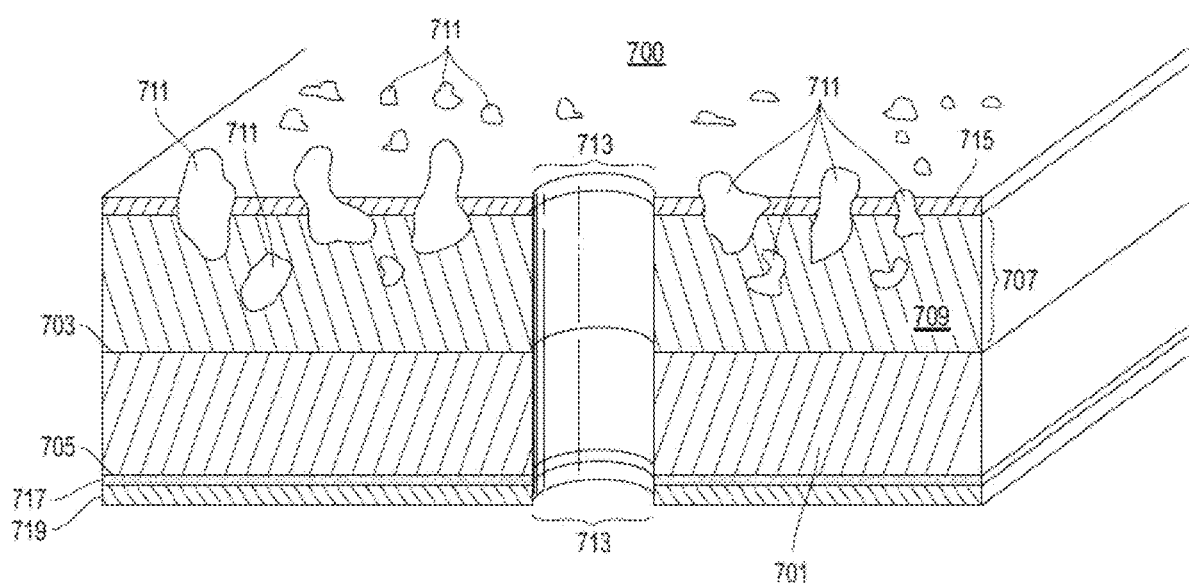
FIG. 7 is an illustration of a cross section of an exemplary embodiment of a coated abrasive article according to the present invention
Figure 8:
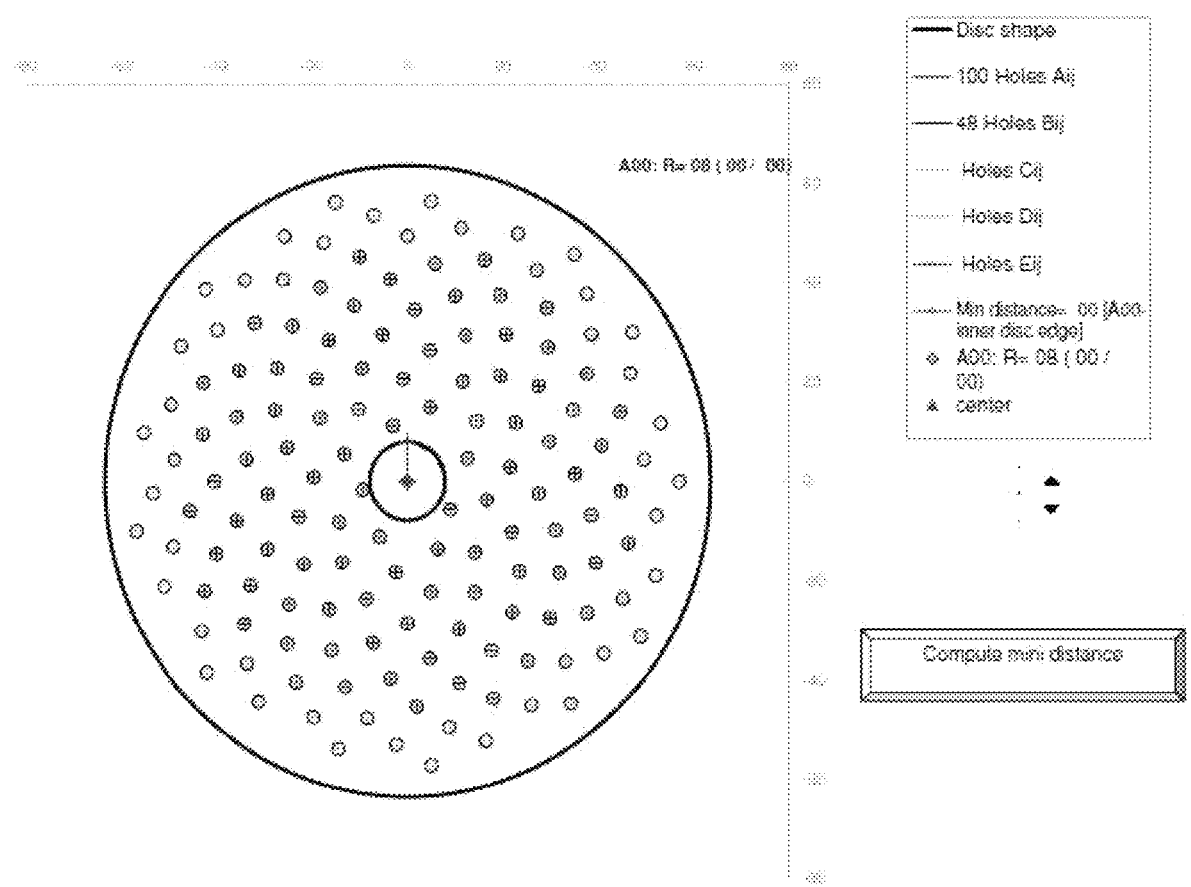
FIG. 8 is a graphical image of an exemplary embodiment of an aperture pattern having 148 apertures according to the present invention

FIG. 7 shows a side view of a coated abrasive article 700 including a backing 701 having a first major surface 703 and a second major surface 705. An abrasive layer 707 is disposed on the first major surface of the backing. The abrasive layer can comprise multiple layers, including a binder layer 709, also called a make coat. A plurality of abrasive grains 711 can be dispersed within, penetrating into, or resting upon the binder layer, or combinations thereof. A pattern of apertures 713 (i.e., holes) perforate all the layers of the abrasive article. A size coat 715 can optionally be disposed on the binder layer. A supersize coat (not shown) can be disposed over the size coat. A back coat 717 can be disposed on the second major surface (i.e., the back) of the backing layer. A fastener layer 719 can be disposed over the back coat, or alternatively can be directly disposed onto the second major side of the backing. In a particular embodiment, the coated abrasive article 700 can optionally be attached to a back-up pad (not shown) or a vacuum system.

Backing

The backing 701 can be flexible or rigid. The backing can be made of any number of various materials including those conventionally used as backings in the manufacture of coated abrasives. An exemplary flexible backing includes a polymeric film (for example, a primed film), such as polyolefin film (e.g., polypropylene including biaxially oriented polypropylene), polyester film (e.g., polyethylene terephthalate), polyamide film, or cellulose ester film; metal foil; mesh; foam (e.g., natural sponge material or polyurethane foam); cloth (e.g., cloth made from fibers or yarns comprising polyester, nylon, silk, cotton, poly-cotton or rayon); paper; vulcanized paper; vulcanized rubber; vulcanized fiber; nonwoven materials; a combination thereof; or a treated version thereof. Cloth backings may be woven or stitch bonded. In particular examples, the backing is selected from the group consisting of paper, polymer film, cloth, cotton, poly-cotton, rayon, polyester, poly-nylon, vulcanized rubber, vulcanized fiber, metal foil and a combination thereof. In other examples, the backing includes polypropylene film or polyethylene terephthalate (PET) film.

The backing 701 may optionally have at least one of a saturant, a presize layer or a backsize layer. The purpose of these layers is typically to seal the backing or to protect yarn or fibers in the backing. If the backing is a cloth material, at least one of these layers is typically used. The addition of the presize layer or backsize layer may additionally result in a "smoother" surface on either the front or the back side of the backing. Other optional layers known in the art can also be used (for example, a tie layer; see U.S. Pat. No. 5,700,302 (Stoetzel et al.), the disclosure of which is incorporated by reference).

An antistatic material may be included in a cloth treatment material. The addition of an antistatic material can reduce the tendency of the coated abrasive article to accumulate static electricity when sanding wood or wood-like materials. Additional details regarding antistatic backings and backing treatments can be found in, for example, U.S. Pat. No. 5,108,463 (Buchanan et al.); U.S. Pat. No. 5,137,542 (Buchanan et al.); U.S. Pat. No. 5,328,716 (Buchanan);

and U.S. Pat. No. 5,560,753 (Buchanan et al.), the disclosures of which are incorporated herein by reference.

The backing may be a fibrous reinforced thermoplastic such as described, for example, in U.S. Pat. No. 5,417,726 (Stout et al.), or an endless spliceless belt, as described, for example, in U.S. Pat. No. 5,573,619 (Benedict et al.), the disclosures of which are incorporated herein by reference. Likewise, the backing may be a polymeric substrate having hooking stems projecting therefrom such as that described, for example, in U.S. Pat. No. 5,505,747 (Chesley et al.), the disclosure of which is incorporated herein by reference. Similarly, the backing may be a loop fabric such as that described, for example, in U.S. Pat. No. 5,565,011 (Follett et al.), the disclosure of which is incorporated herein by reference.

Abrasive Layer

The abrasive layer 707 may be formed from one or more coats and a plurality of abrasive grains. For example, the abrasive layer includes a make coat 709 and can optionally include a size coat 715 or a supersize coat. Abrasive layers generally include abrasive grains 711 disposed on, embedded within, dispersed, or combinations thereof, in a binder.

Abrasive Grains

The abrasive grains 711 can include essentially single phase inorganic materials, such as alumina, silicon carbide, silica, ceria, and harder, high performance superabrasive grains such as cubic boron nitride and diamond. Additionally, the abrasive grains can include composite particulate materials. Such materials can include aggregates, which can be formed through slurry processing pathways that include removal of the liquid carrier through volatilization or evaporation, leaving behind green aggregates, optionally followed by high temperature treatment (i.e., firing) to form usable, fired aggregates. Further, the abrasive regions can include engineered abrasives including macrostructures and particular three-dimensional structures.

In an exemplary embodiment, the abrasive grains are blended with the binder formulation to form abrasive slurry. Alternatively, the abrasive grains are applied over the binder formulation after the binder formulation is coated on the backing. Optionally, a functional powder may be applied over the abrasive regions to prevent the abrasive regions from sticking to a patterning tooling. Alternatively, patterns may be formed in the abrasive regions absent the functional powder.

The abrasive grains may be formed of any one of or a combination of abrasive grains, including silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive grains may be selected from a group consisting of silica, alumina, zirconia, silicon carbide, silicon nitride, boron nitride, garnet, diamond, co-fused alumina zirconia, ceria, titanium diboride, boron carbide, flint, emery, alumina nitride, and a blend thereof. Particular embodiments have been created by use of dense abrasive grains comprised principally of alpha-alumina.

The abrasive grain may also have a particular shape. An example of such a shape includes a rod, a triangle, a pyramid, a cone, a solid sphere, a hollow sphere, or the like. Alternatively, the abrasive grain may be randomly shaped.

In an embodiment, the abrasive grains can have an average grain size not greater than 800 microns, such as not greater than about 700 microns, not greater than 500 microns, not greater than 200 microns, or not greater than 100 microns. In another embodiment, the abrasive grain size is at least 0.1 microns, at least 0.25 microns, or at least 0.5 microns. In another embodiment, the abrasive grains size is from about 0.1 microns to about 200 microns and more typically from about 0.1 microns to about 150 microns or from about 1 micron to about 100 microns. The grain size of the abrasive grains is typically specified to be the longest dimension of the abrasive grain. Generally, there is a range distribution of grain sizes. In some instances, the grain size distribution is tightly controlled.

Make Coat—Binder

The binder of the make coat or the size coat may be formed of a single polymer or a blend of polymers. For example, the binder may be formed from epoxy, acrylic polymer, or a combination thereof. In addition, the binder may include filler, such as nano-sized filler or a combination of nano-sized filler and micron-sized filler. In a particular embodiment, the binder is a colloidal binder, wherein the formulation that is cured to form the binder is a colloidal suspension including particulate filler. Alternatively, or in addition, the binder may be a nanocomposite binder including sub-micron particulate filler.

The binder generally includes a polymer matrix, which binds abrasive grains to the backing or compliant coat, if present. Typically, the binder is formed of cured binder formulation. In one exemplary embodiment, the binder formulation includes a polymer component and a dispersed phase.

The binder formulation may include one or more reaction constituents or polymer constituents for the preparation of a polymer. A polymer constituent may include a monomeric molecule, a polymeric molecule, or a combination thereof. The binder formulation may further comprise components selected from the group consisting of solvents, plasticizers, chain transfer agents, catalysts, stabilizers, dispersants, curing agents, reaction mediators and agents for influencing the fluidity of the dispersion.

The polymer constituents can form thermoplastics or thermosets. By way of example, the polymer constituents may include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents are typically curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The binder formulation may include a monomer, an oligomer, a polymer, or a combination thereof. In a particular embodiment, the binder formulation includes monomers of at least two types of polymers that when cured may crosslink. For example, the binder formulation may include epoxy constituents and acrylic constituents that when cured form an epoxy/acrylic polymer.

Additives—Grinding Aid

The abrasive layer may further include a grinding aid to increase the grinding efficiency and cut rate. A useful grinding aid can be inorganic based, such as a halide salt, for example, sodium cryolite, and potassium tetrafluoroborate; or organic based, such as a chlorinated wax, for example, polyvinyl chloride. A particular embodiment includes cryolite and potassium tetrafluoroborate with particle size ranging from 1 micron to 80 microns, and most typically from 5 microns to 30 microns. The supersize coat can be a polymer layer applied over the abrasive grains to provide anti-glazing and anti-loading properties.

Back Coat—Compliant Coat

The coated abrasive article may optionally include compliant and back coats (not shown). These coats may function as described above and may be formed of binder compositions.

Back-Up Pad

In an embodiment, a back-up pad can comprise a plurality of air flow paths disposed in a pattern. The pattern of air flow paths can comprise regular polygons, irregular polygons, ellipsoids, arcs, spirals, phyllotactic patterns, or combinations thereof. The pattern of air flow paths can comprise radiating arcurate paths, radiating spiral paths, or combinations thereof. The pattern of air flow paths can comprise a combination of inner radiating spiral paths and outer radiating spiral paths. The pattern of air flow paths can comprise a combination of clock-wise radiating spiral paths and counter clock-wise radiating spiral paths. The air flow paths can be discrete, or discontinuous, from each other. Alternatively, one or more of the air flow paths can be can be fluidly connected.

The number of radiating arcurate paths ("arcs"), radiating spiral paths, or combinations thereof can vary. In an embodiment, the number of radiating arcurate paths, radiating spiral paths, or combinations thereof can be not greater than 1000, such as not greater than 750, not greater than 500, not greater than 250, not greater than 100, not greater than 90, not greater than 80, or not greater than 75. In an embodiment, the number of radiating arcurate paths, radiating spiral paths, or combinations thereof can be not less than 2, such as not less than 3, not less than 5, not less than 7, not less than 9, not less than 11, not less than 15, or not less than 20. In an embodiment, the number of radiating arcurate paths, radiating spiral paths, or combinations thereof can be from 2 to 500, such as 2 to 100.

In another embodiment, a back-up pad can have a pattern of air flow paths further comprising an annular airflow path that intersects the air flow paths. In a specific embodiment, an annular airflow path can intersect radiating arcurate paths or radiating spiral paths, or combinations thereof.

The air flow paths can vary in width. The width of the air flow paths can be constant or varying, or combinations thereof. In an embodiment, the width of the air flow paths can be within a range of fixed lengths. In an embodiment, the width of the air flow paths can vary from 0.1 mm to 10 cm. In another embodiment, the width of the air flow paths will be related to the size of the apertures of a coated abrasive with which the back-up pad is being used. In an embodiment, the width of the air flow paths is not less than $\frac{1}{10}$ the size of the apertures of the coated abrasive, such as not less than $\frac{1}{8}$, $\frac{1}{6}$, $\frac{1}{5}$, $\frac{1}{4}$, $\frac{1}{3}$, or $\frac{1}{2}$ the size of the apertures of the coated abrasive. In an embodiment, the width of the air flow paths is not greater than 10 times the size of the apertures of the coated abrasive, such as not greater than 8 times, not greater than 6 times, not greater than 5 times, not greater than 4 times, not greater than 3 times, not greater than 2 times the size of the apertures of the coated abrasive. In an embodiment, the width of the air-flow paths is about equal to the size of the apertures of the coated abrasive.

The air flow paths can have one or more cavities, orifices, passages, holes, openings, or combinations thereof disposed along or within air flow paths, such as a branching of the airflow path, that extend through the through the body of the back-up pad. In an embodiment, each air flow path will have at least one hole disposed within the air flow path that that extend through the through the body of the back-up pad.

It will be appreciated that back-up pads designed to correspond to coated abrasives having controlled non-uniform distributions of apertures can be successfully used in conjunction with conventional coated abrasives as well as particular coated abrasive having controlled non-uniform distributions of apertures. The inventors have surprisingly discovered that back-up pad embodiments can provide superior swarf removal and promote improved abrasive performance for conventional abrasives.

In an embodiment, the back-up pad can have a pattern of air flow paths that is cooperatively adapted to operate with coated abrasives having a controlled non-uniform distribution pattern. As stated previously, such a back-up can be used in conjunction with a conventional perforated coated abrasive to promote swarf removal and abrasive performance.

In an embodiment, a back-up pad can comprise a pattern of air flow paths, wherein the pattern of air flow paths is generated from x and y co-ordinates of a controlled non-uniform distribution pattern. The controlled non-uniform distribution pattern used to generate the back-up pad air flow pattern can be the same or different than the aperture pattern of the coated abrasive being used with the back-up pad. In an embodiment, the controlled non-uniform distribution pattern is the same as the aperture pattern of the coated abrasive being used with the back-up pad. In another embodiment, the controlled non-uniform distribution pattern is different than the aperture pattern of the coated abrasive being used with the back-up pad.

In an embodiment, a back-up pad can be cooperatively adapted to operate with coated abrasives having phyllotactic patterns according to the coated abrasive embodiments described herein. A back-up pad is co-operative with a coated abrasive having phyllotactic patterns when the back-up pad includes a plurality of openings, a plurality of cavities, a plurality of channels, plurality of passages, or combinations thereof, that are configured in a pattern designed to promote suction and swarf removal away from the work surface during the abrasion process through the apertures of a coated abrasive having a phyllotactic pattern. The openings, cavities, channels, passages, or combinations thereof can define air-flow paths that are located along, within, or though the back-up pad, or combinations thereof. The air-flow paths promote improved suction and swarf removal through the apertures of a coated abrasive and away from the work surface during the abrasion process. In an embodiment, the pattern of openings, cavities, channels, passages or combinations thereof can be in the form of a regular polygons, irregular polygons, ellipsoids, arcs, spirals, phyllotactic patterns, or combinations thereof. In another embodiment, the air-flow paths can be in the form of a regular polygons, irregular polygons, ellipsoids, arcs, spirals, phyllotactic patterns, or combinations thereof.

In an embodiment, a suitable spiral or phyllotactic pattern can be generated from the x and y co-ordinates of any phyllotactic aperture pattern of the abrasive article embodiments described above. In an embodiment, the x and y co-ordinates of a spiral or phyllotactic pattern are transposed and rotated to determine the x' and y' co-ordinates of the spiral or phyllotactic back-up air flow pattern, wherein θ is equal to π/n in radians and n is any integer according to the following equation:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

Figure 9:
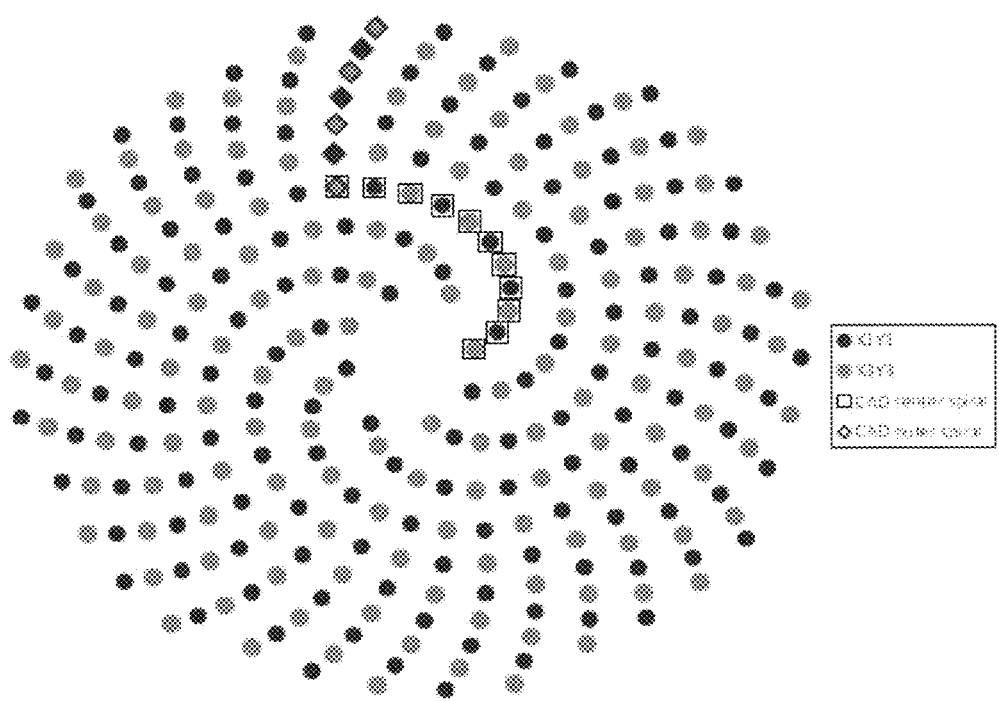
FIG. 9 is an illustration of an exemplary embodiment according to the present invention of a transpose of the aperture pattern of FIG. 8

The transposed and rotated co-ordinates produced (x' and y') can be plotted, such as by the use of computer aided drafting (CAD) software, to generate a suitable air flow pattern, such as a spiral or phyllotactic pattern. Particular embodiments of transposed phyllotactic patterns are shown in FIG. 9, 12, 15.

Figure 10:
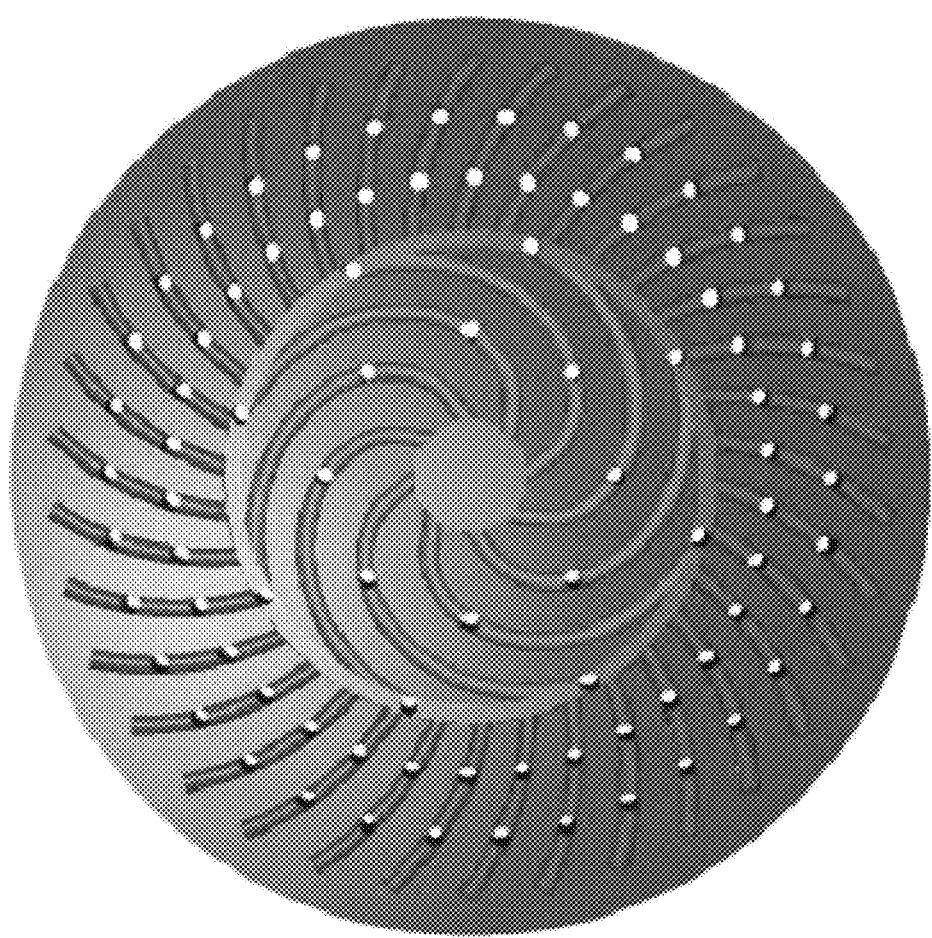
FIG. 10 is an illustration of an exemplary embodiment according to the present invention of a back-up pad that is co-operative with the aperture pattern of FIG. 8
Figure 11:
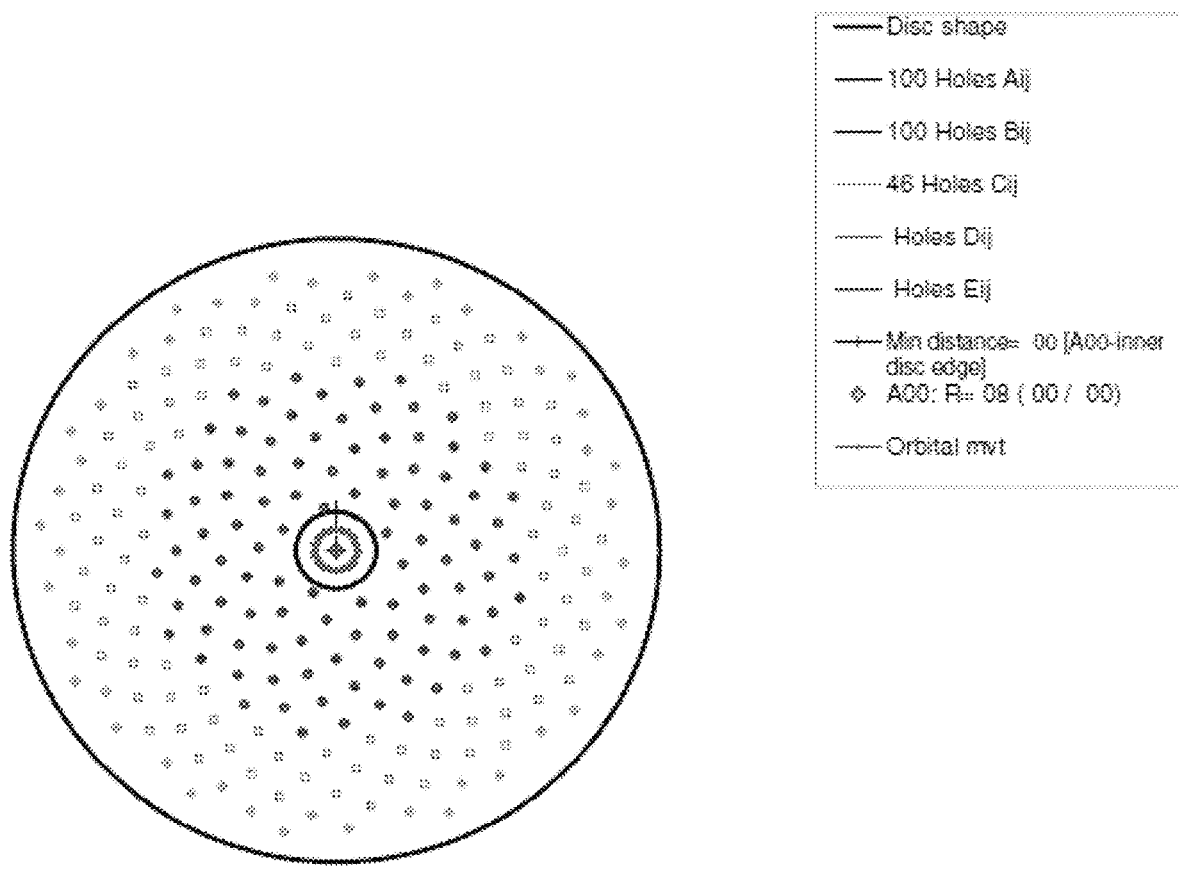
FIG. 11 is a graphical image of an exemplary embodiment of an aperture pattern having 246 apertures according to the present invention
Figure 12:
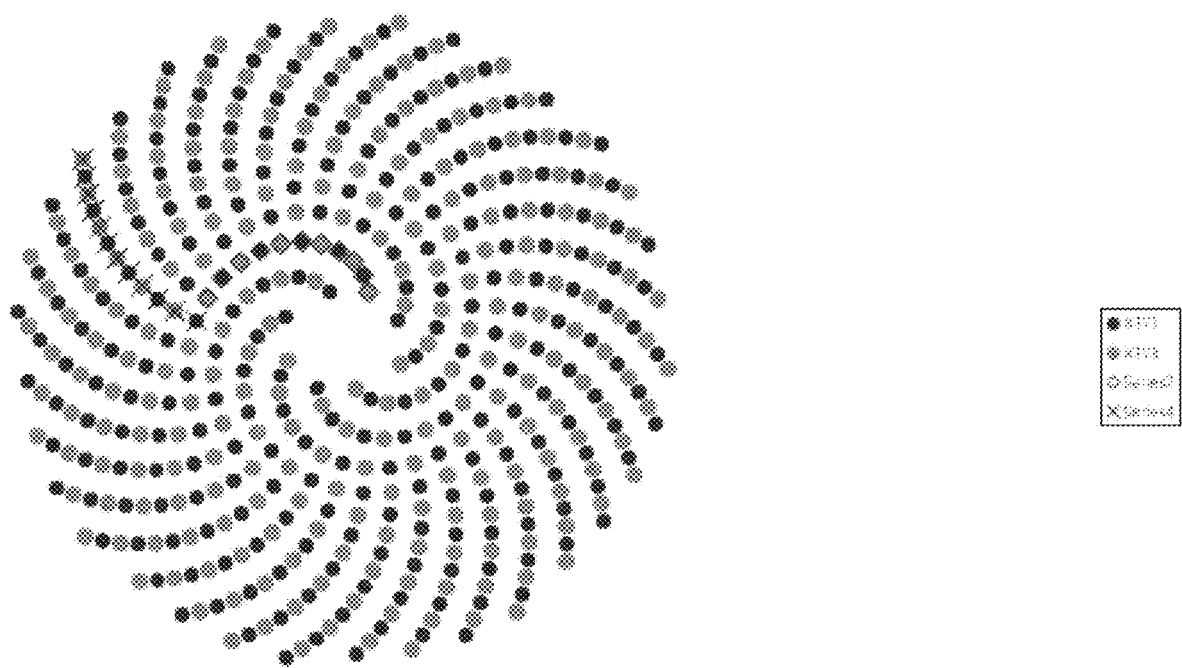
FIG. 12 is an illustration of an exemplary embodiment according to the present invention of a transpose of the aperture pattern of FIG. 11
Figure 13:
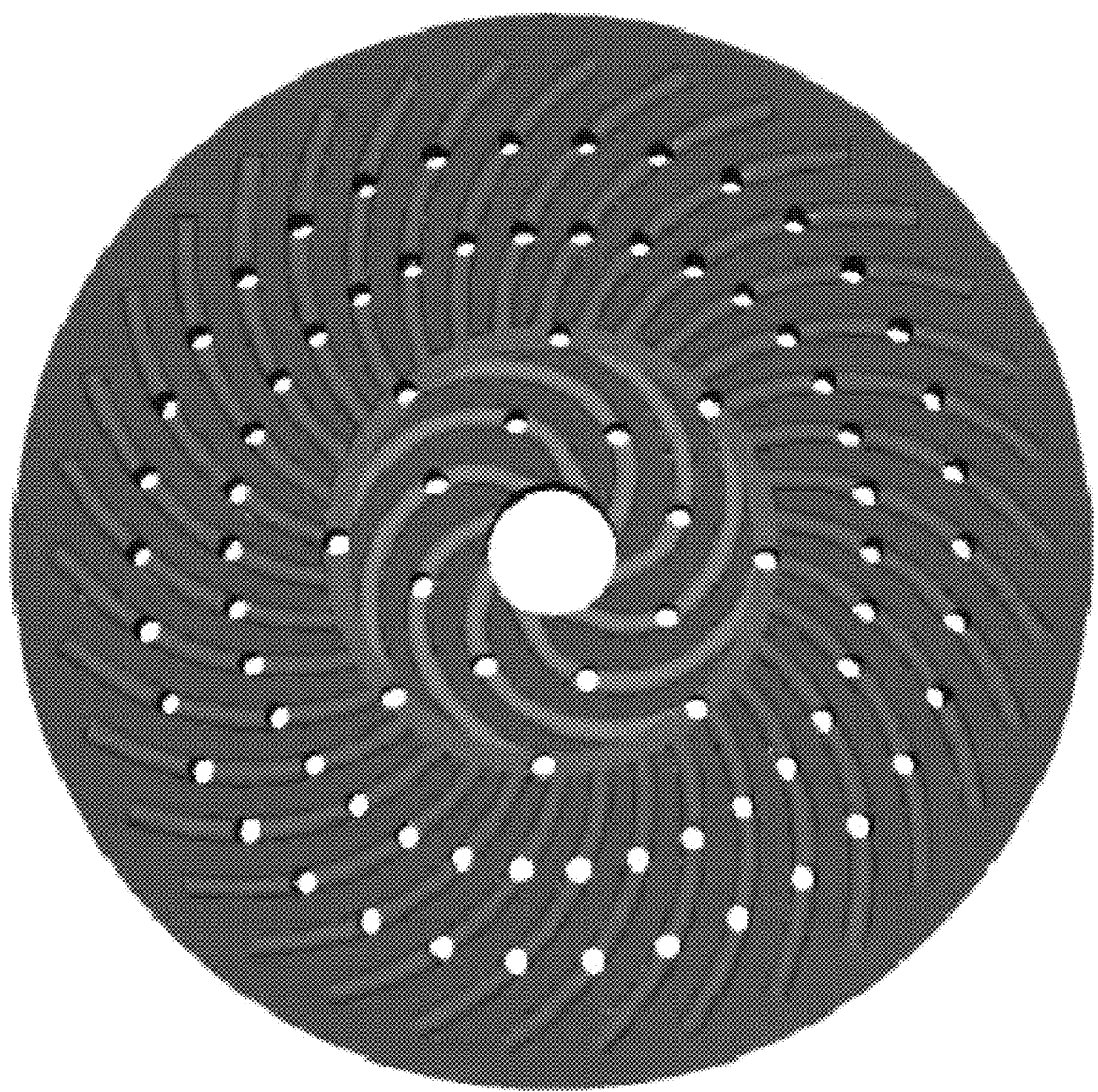
FIG. 13 is an illustration of an exemplary embodiment according to the present invention of a back-up pad that is co-operative with the aperture pattern of FIG. 11
Figure 14:
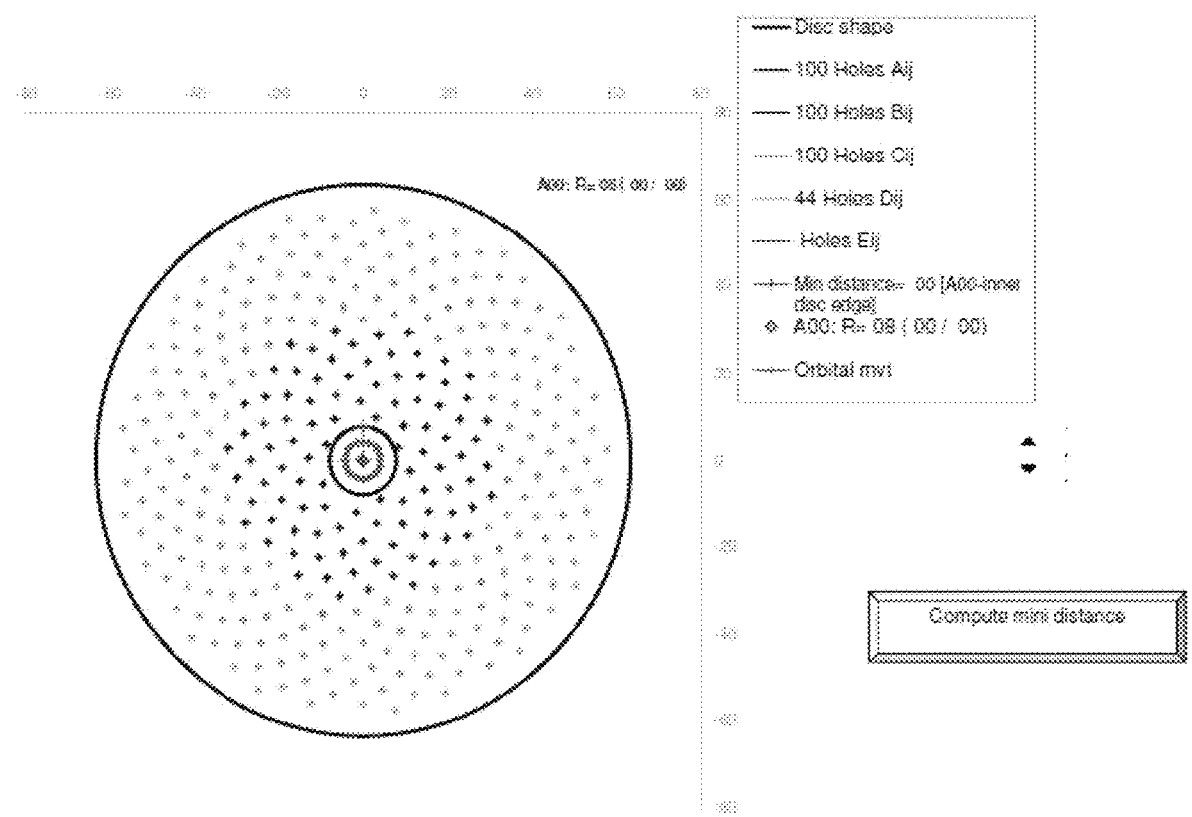
FIG. 14 is a graphical image of an exemplary embodiment of an aperture pattern having 344 apertures according to the present invention
Figure 15:
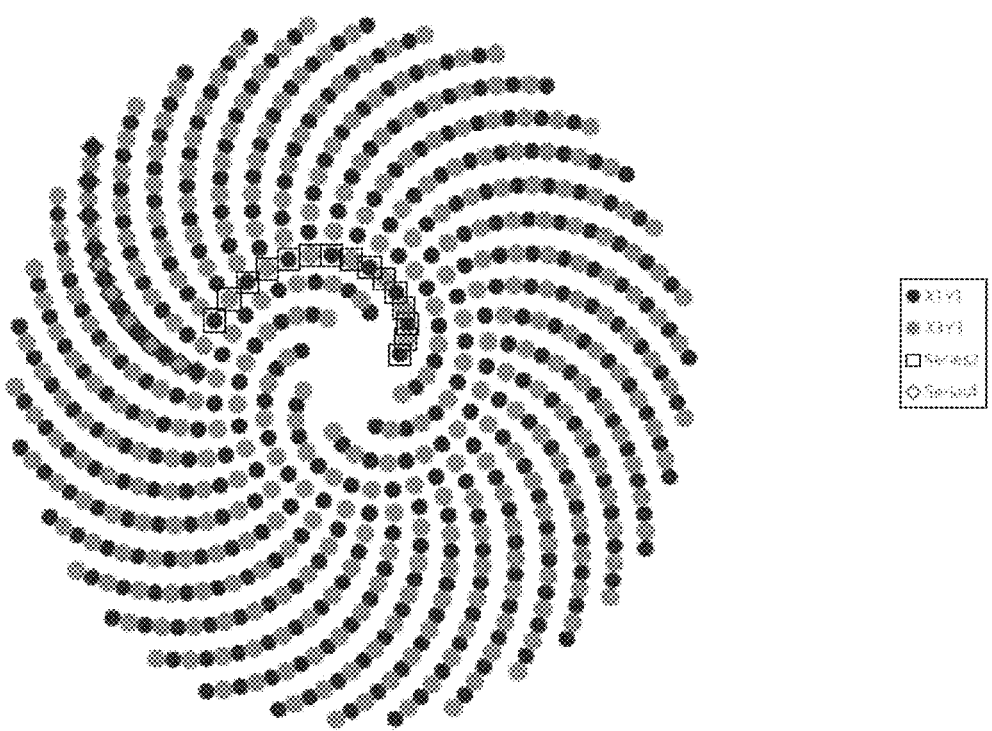
FIG. 15 is an illustration of an exemplary embodiment according to the present invention of a transpose of the aperture pattern of FIG. 14
Figure 16:
FIG. 16 is an illustration of an exemplary embodiment according to the present invention of a back-up pad that is co-operative with the aperture pattern of FIG. 14
Figure 17A:
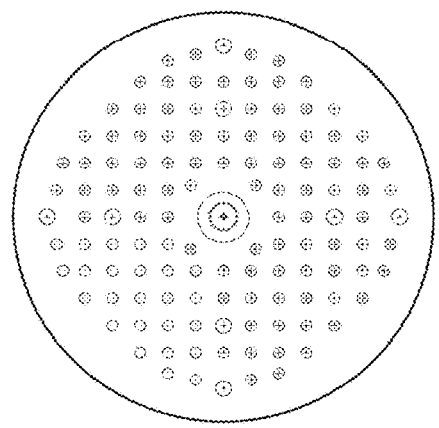
FIG. 17A-17D are graphical representations of aperture coverage during orbital rotation for given aperture patterns, of which 17B-17D are exemplary embodiments according to the present invention
Figure 17A:
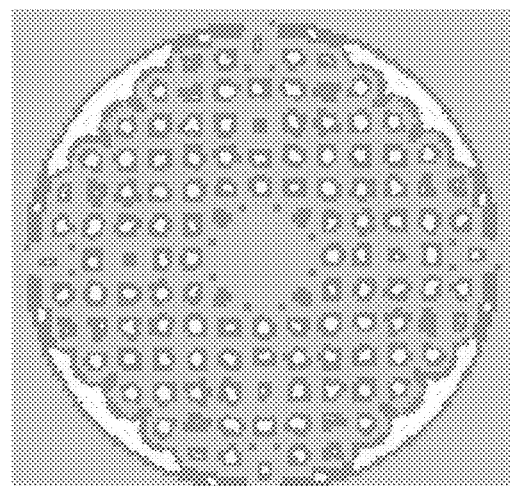
Figure 17A:
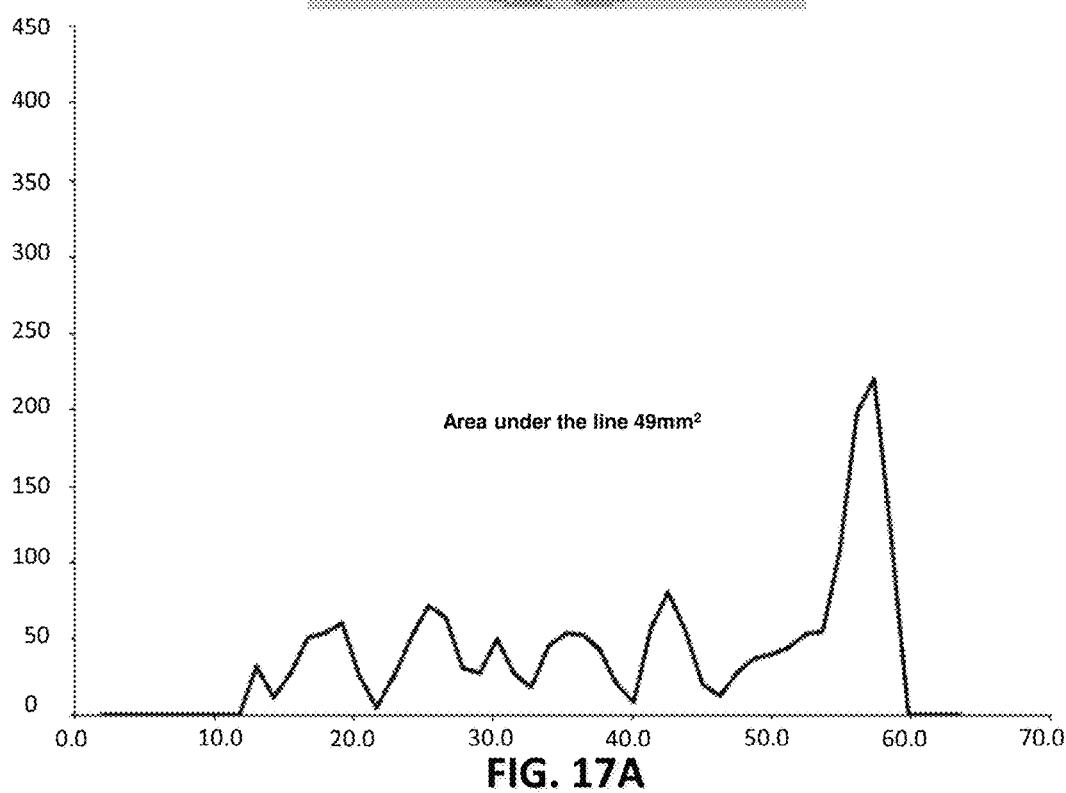
Figure 17B:
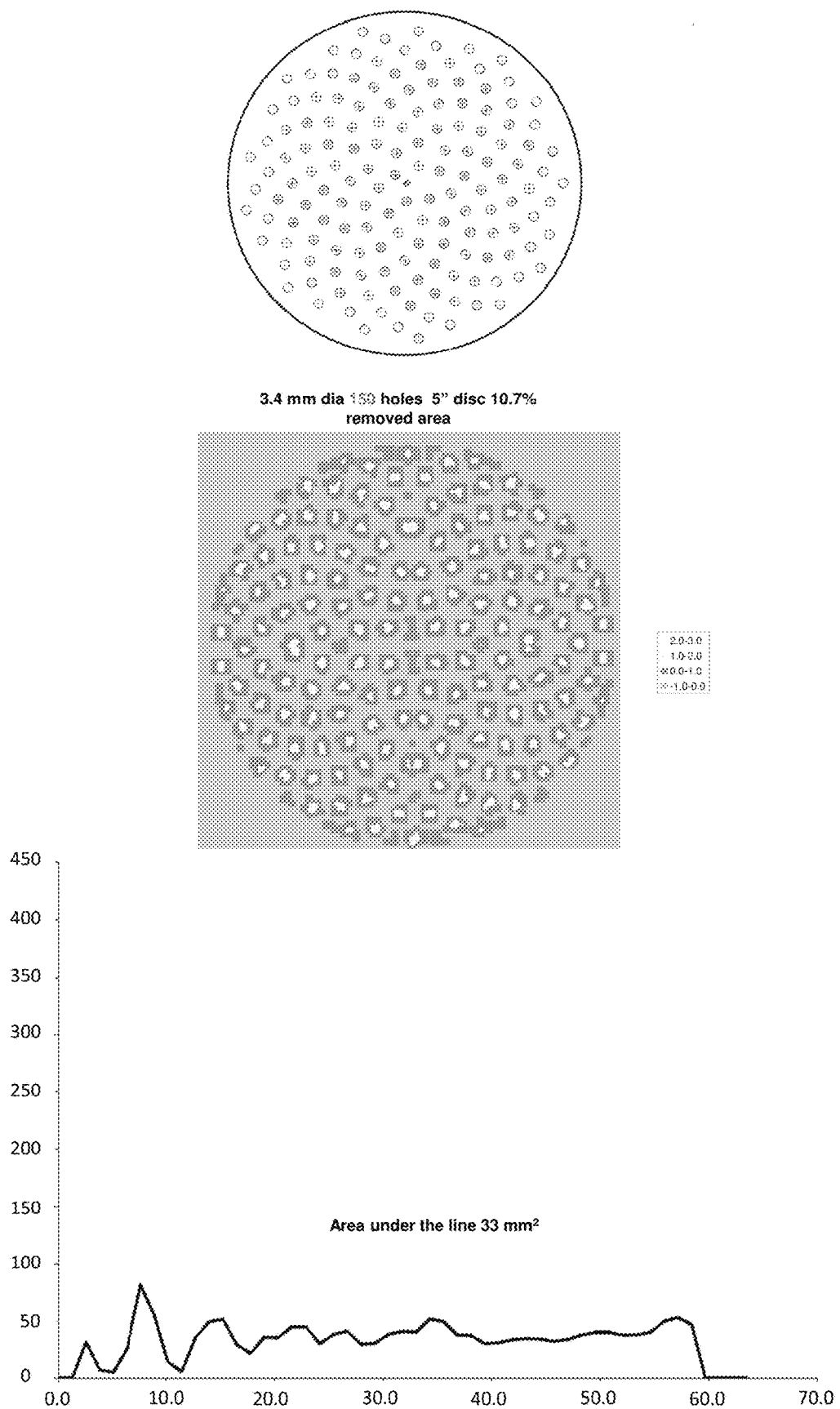
Figure 17C:
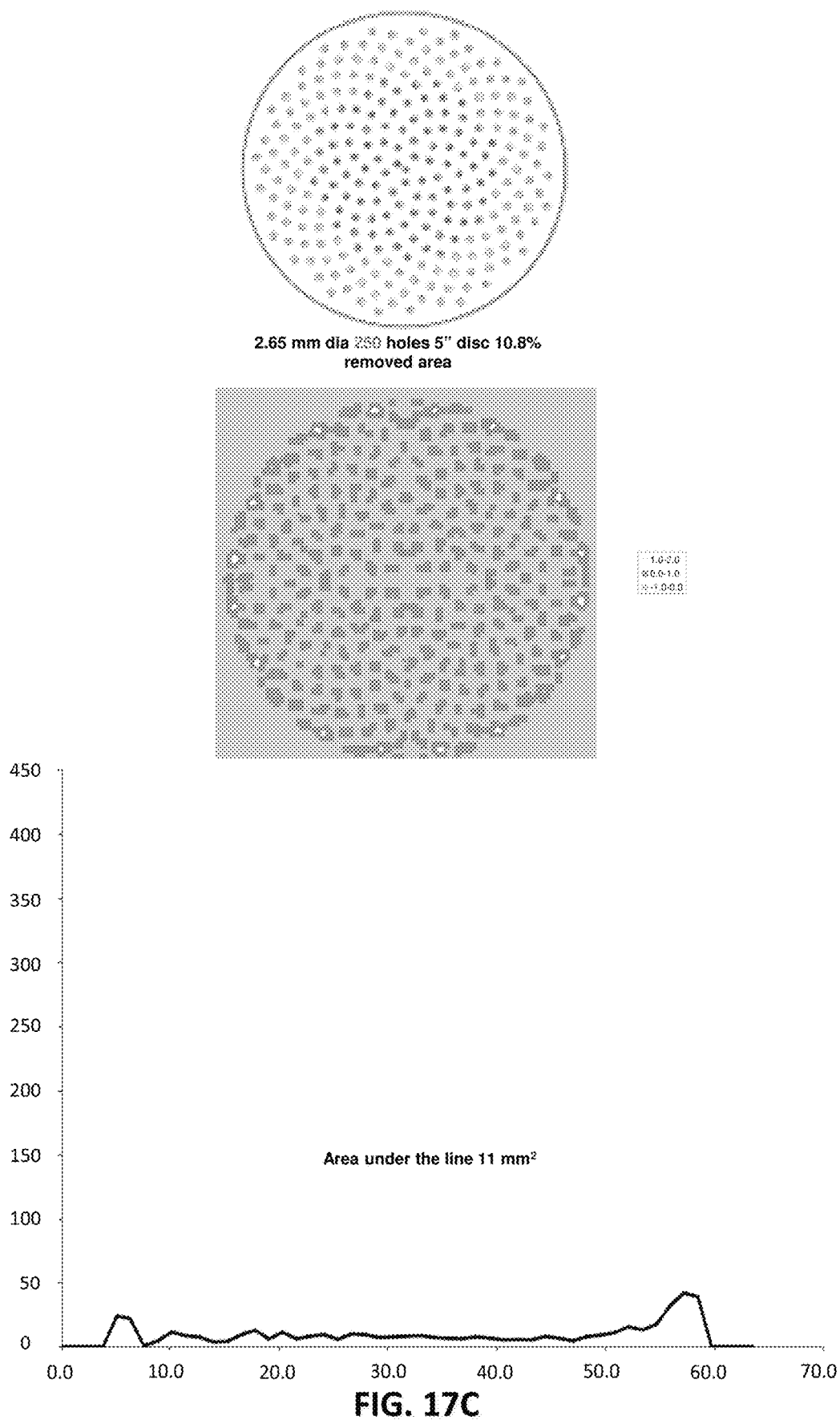
Figure 17D:
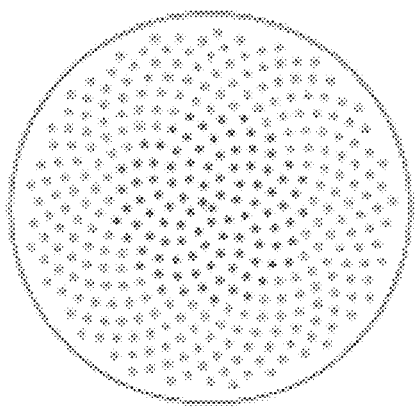
Figure 17D:
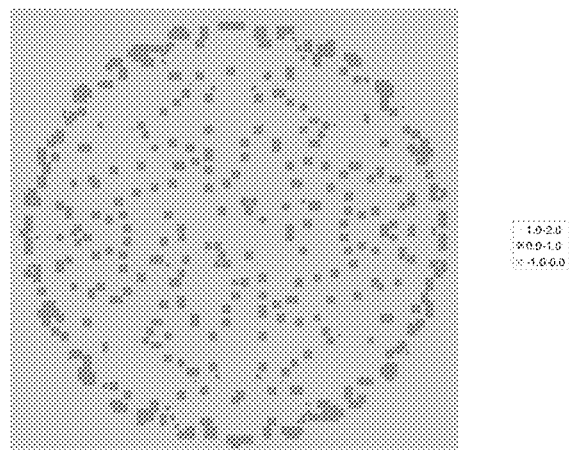
Figure 17D:
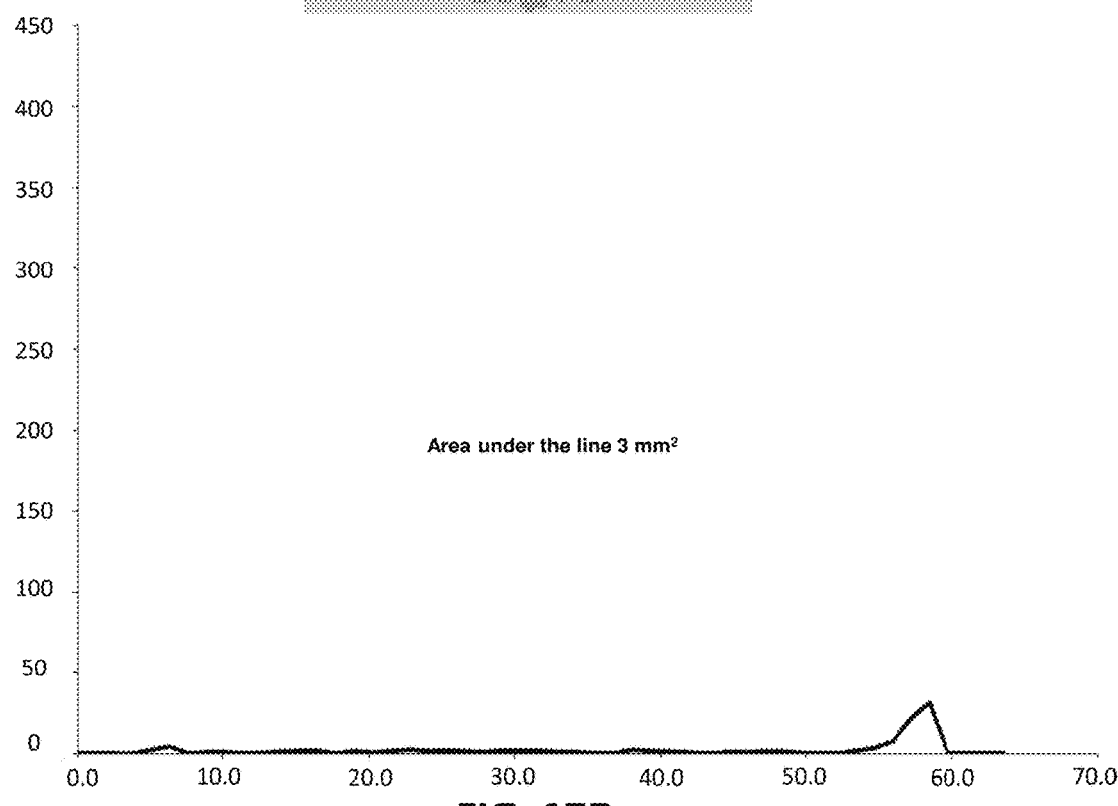
Figure 18A:
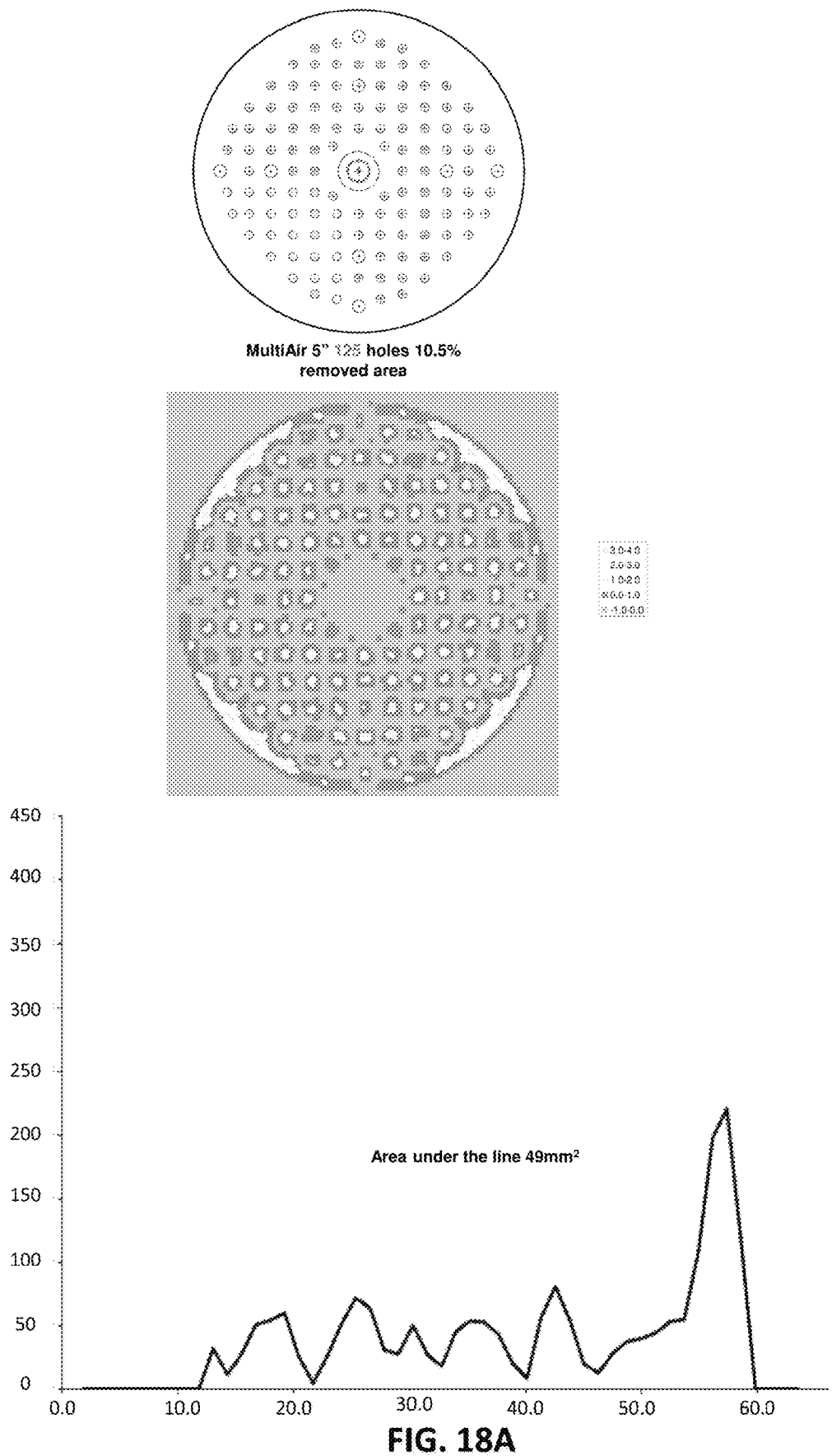
FIG. 18A-18D are graphical representations of aperture coverage during orbital rotation for given aperture patterns, of which 18B-18D are exemplary embodiments according to the present invention
Figure 18B:
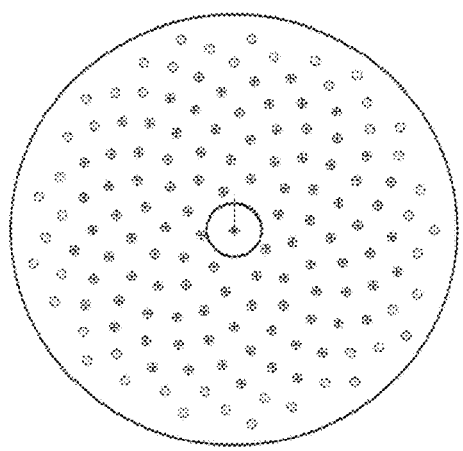
Figure 18B:
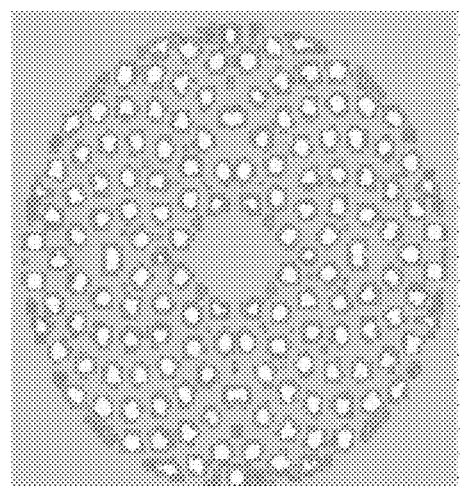
Figure 18B:
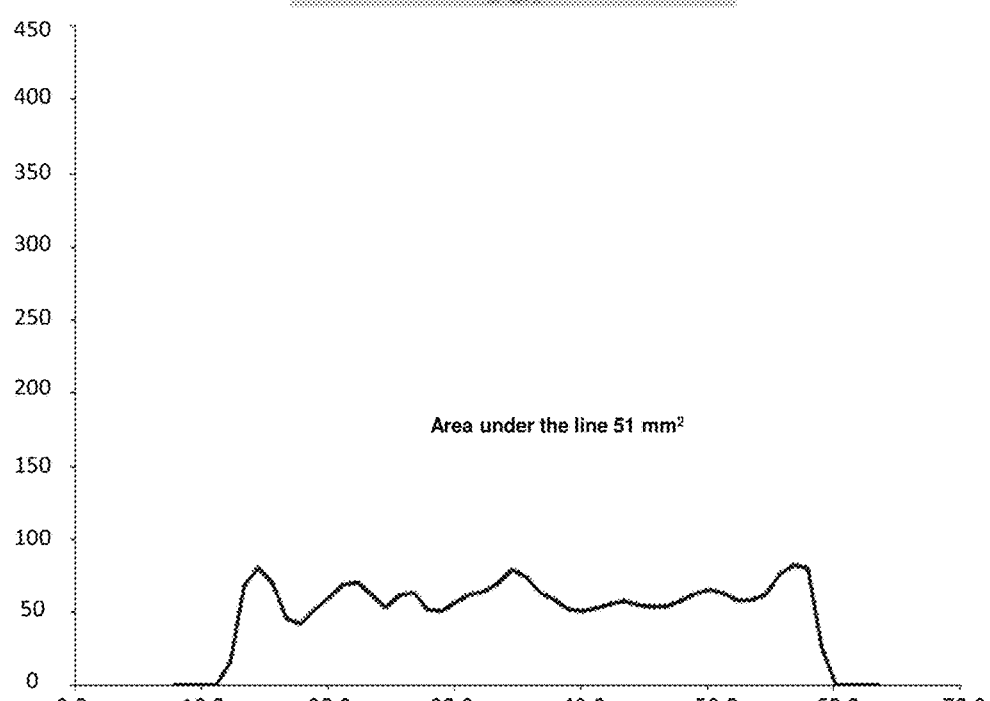
Figure 18C:
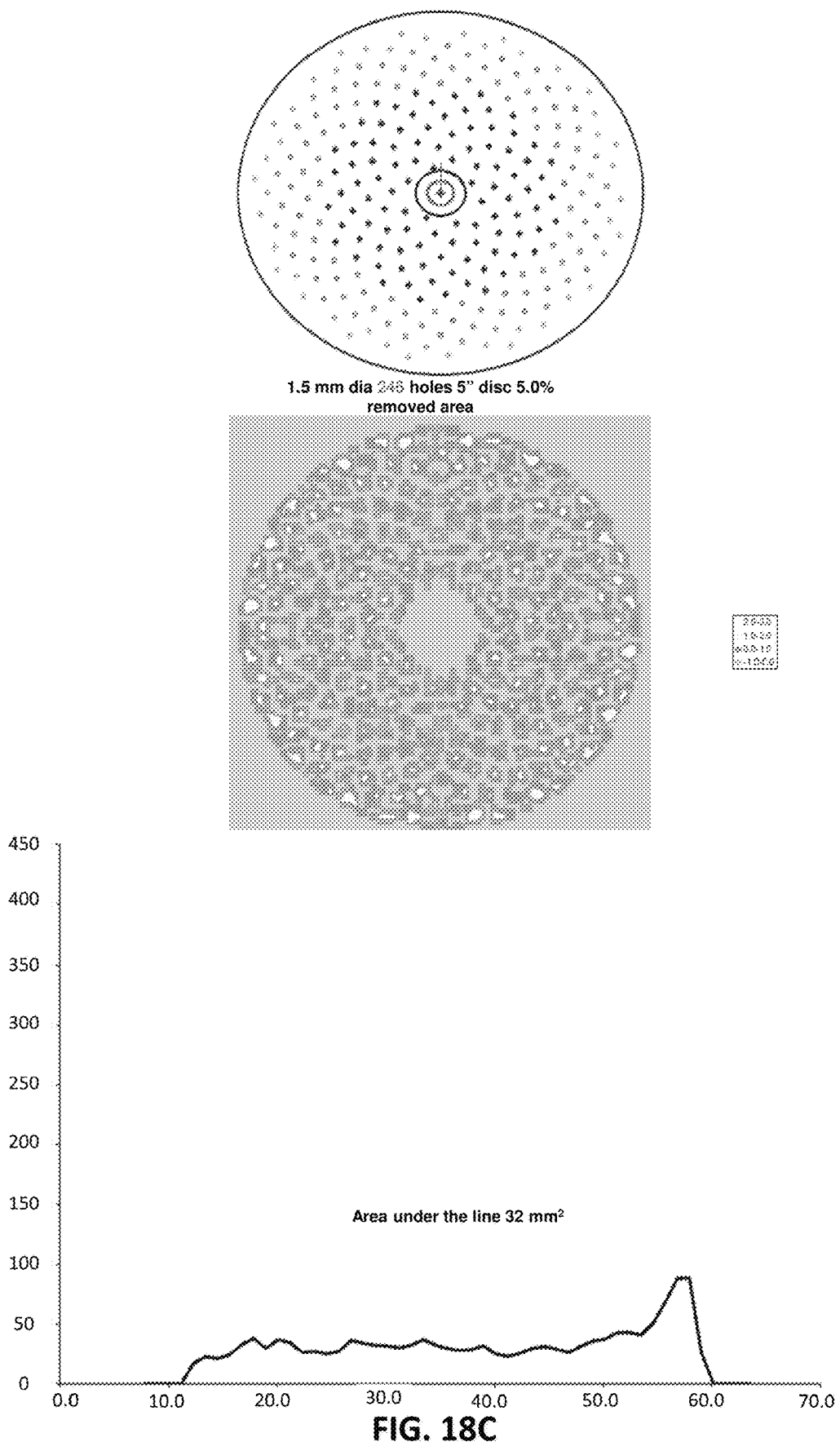
Figure 18D:
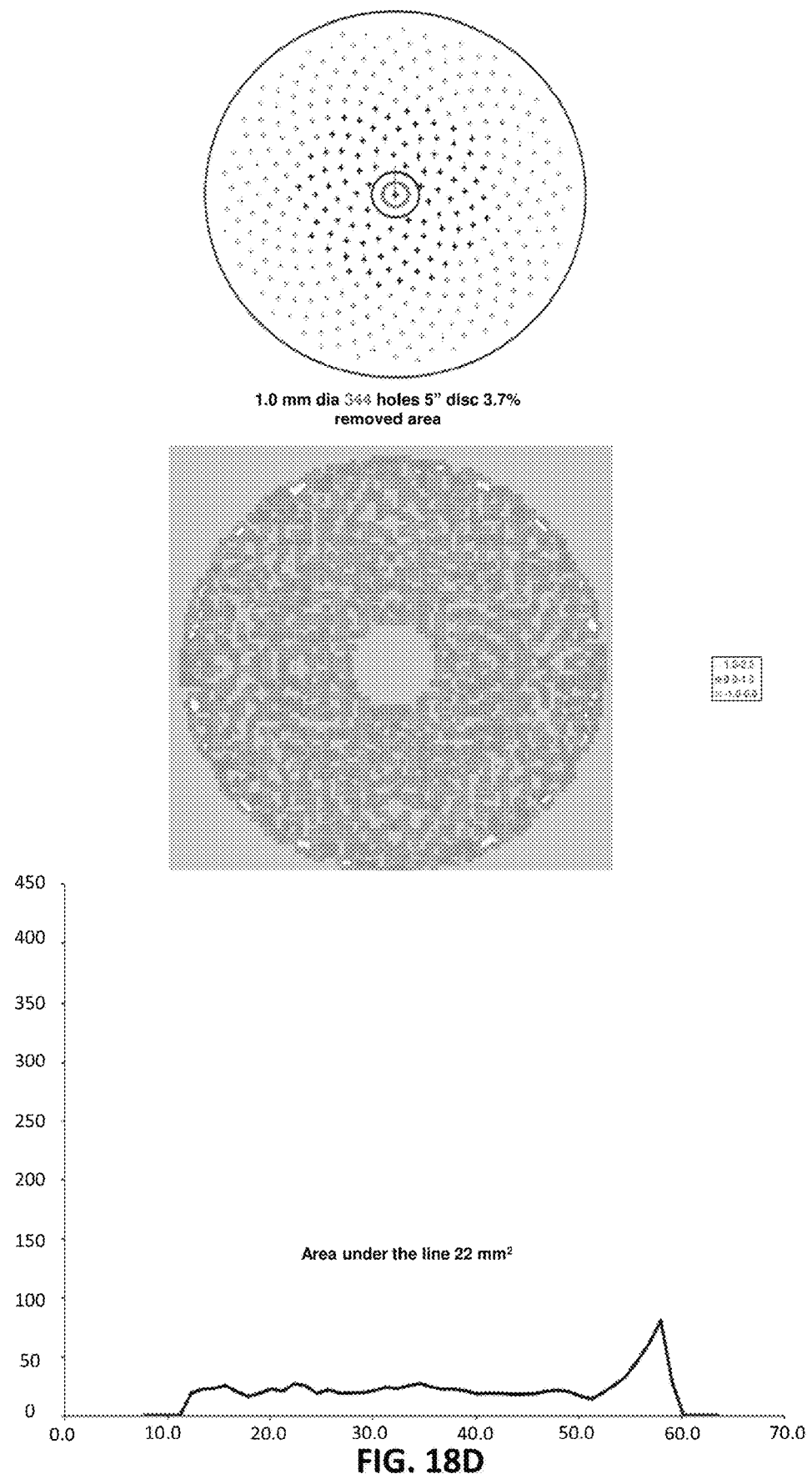
Figure 19:
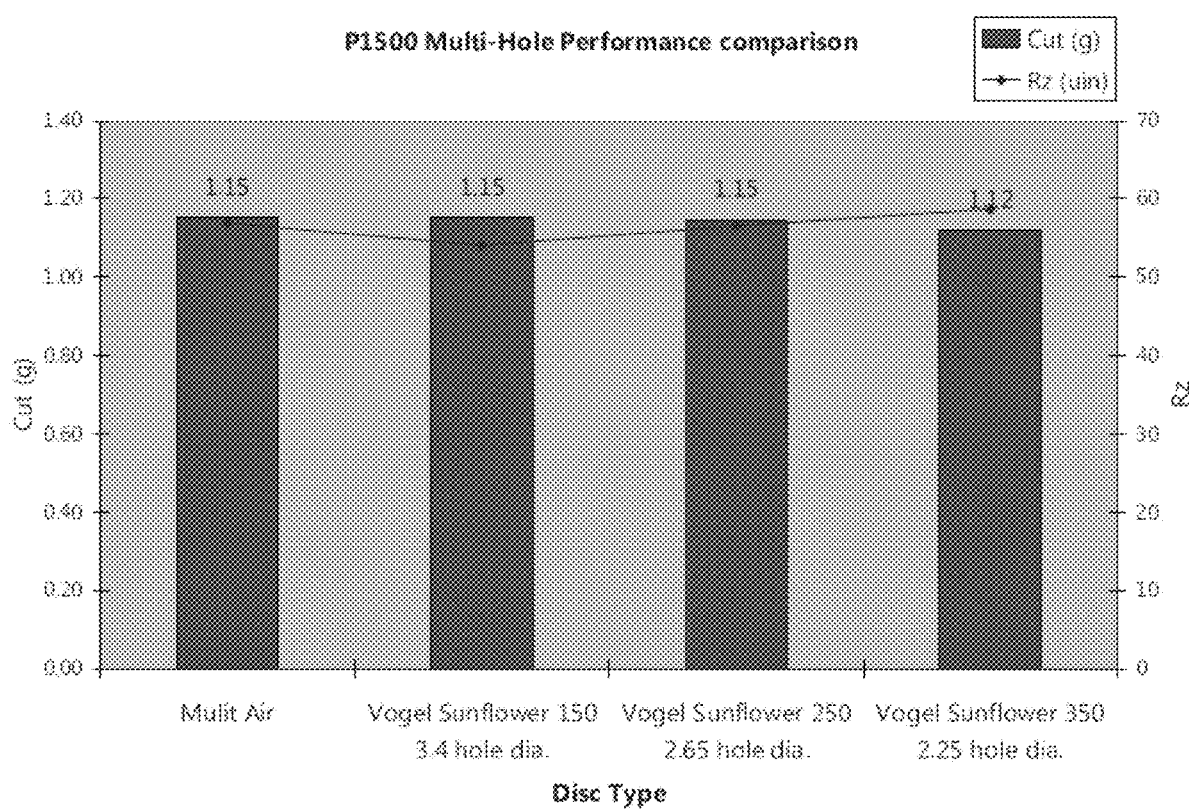
FIG. 19 is a chart comparing abrasive performance of exemplary aperture patterns according to the present invention with a state-of-the art aperture pattern

The patterns can then be used to define radiating accurate and spiral channels, as well as, annular channels that can intersect the arcurate and spiral channels, or combinations thereof. The annular, arcurate, spiral, or combination channels can then be cut into a suitable material, such as in the form of grooves, cavities, orifices, passages, or other pathways to form a co-operative back-up pad. Particular embodiments of channel patterns that are based on transposed phyllotactic patterns are shown in FIG. 10, 13, 16. Additional embodiments of back-up pads based on transposed phyllotactic patterns are shown in FIGS. 28, 29, 30, 31, 32, 33, 46, and 47.

In certain embodiments, the air-flow paths of the back-up pad will partially, to fully, match-up with the apertures of the coated abrasive. It will be understood that an air-flow path matches-up with an aperture when at least a portion of the area of an aperture coincides with, or is aligned with, a portion of the air-flow path. In an embodiment, the air-flow paths of the corresponding back-up pad will match-up with at least 5%, at least 10%, at least 15%, at least 20%, at least 25% of the apertures. In an embodiment, the air-flow paths of the corresponding back-up pad can match-up with at least 5%, at least 10%, at least 15%, at least 20%, at least 25%, at least 30%, at least 35%, at least 40%, at least 55%, at least 50%, at least 55%, at least 60%, at least 65%, at least 70%, at least 75%, at least 80%, at least 85%, at least 90%, at least 95%, or at least 100% of the apertures of the coated abrasive.

Figure 46:
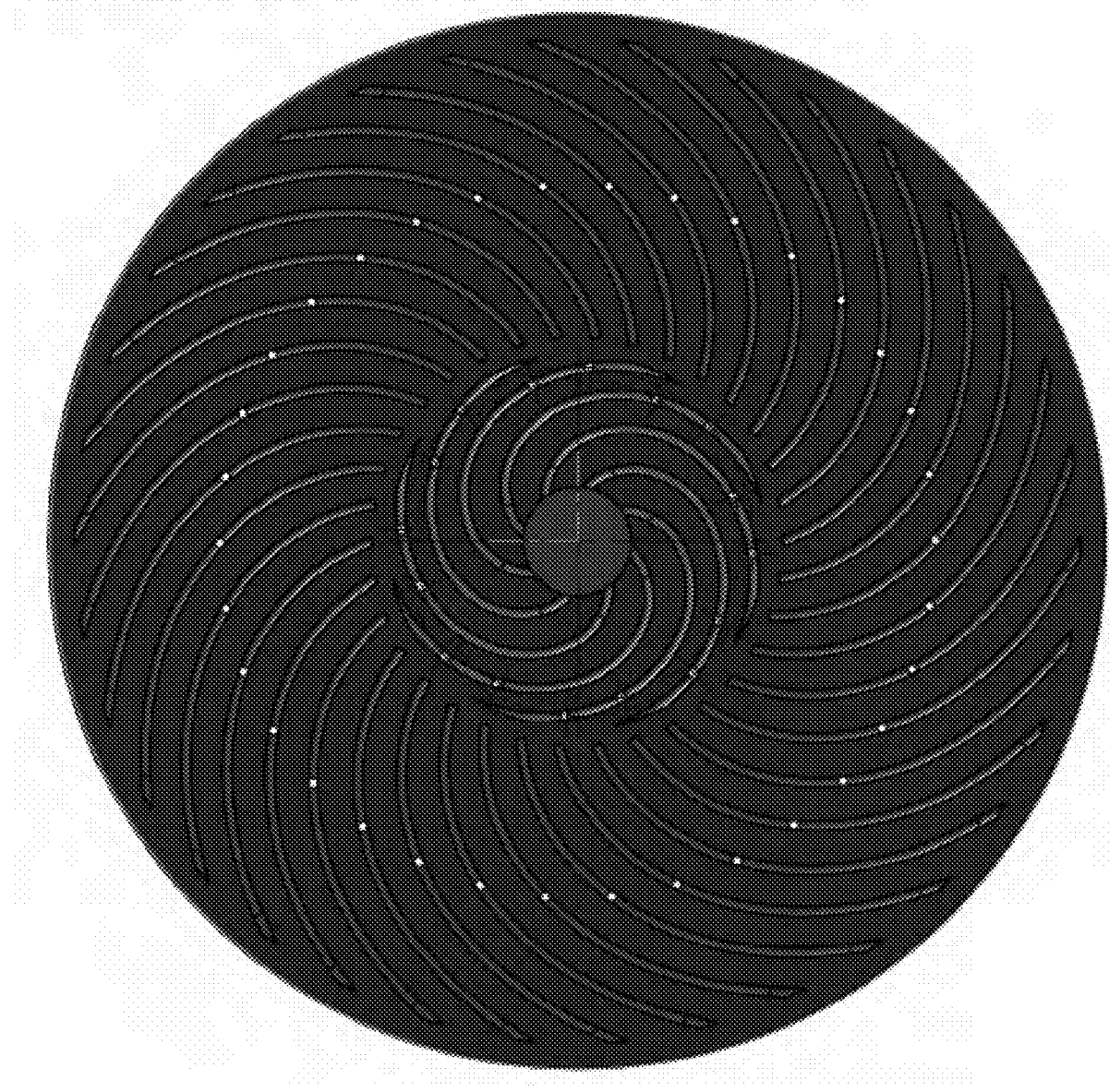
FIG. 46 is an illustration of an embodiment of a single alignment (also called a 2-fold alignment) back-up pad having 34 outer spiral paths and 8 inner spiral paths according to the present invention
Figure 47:
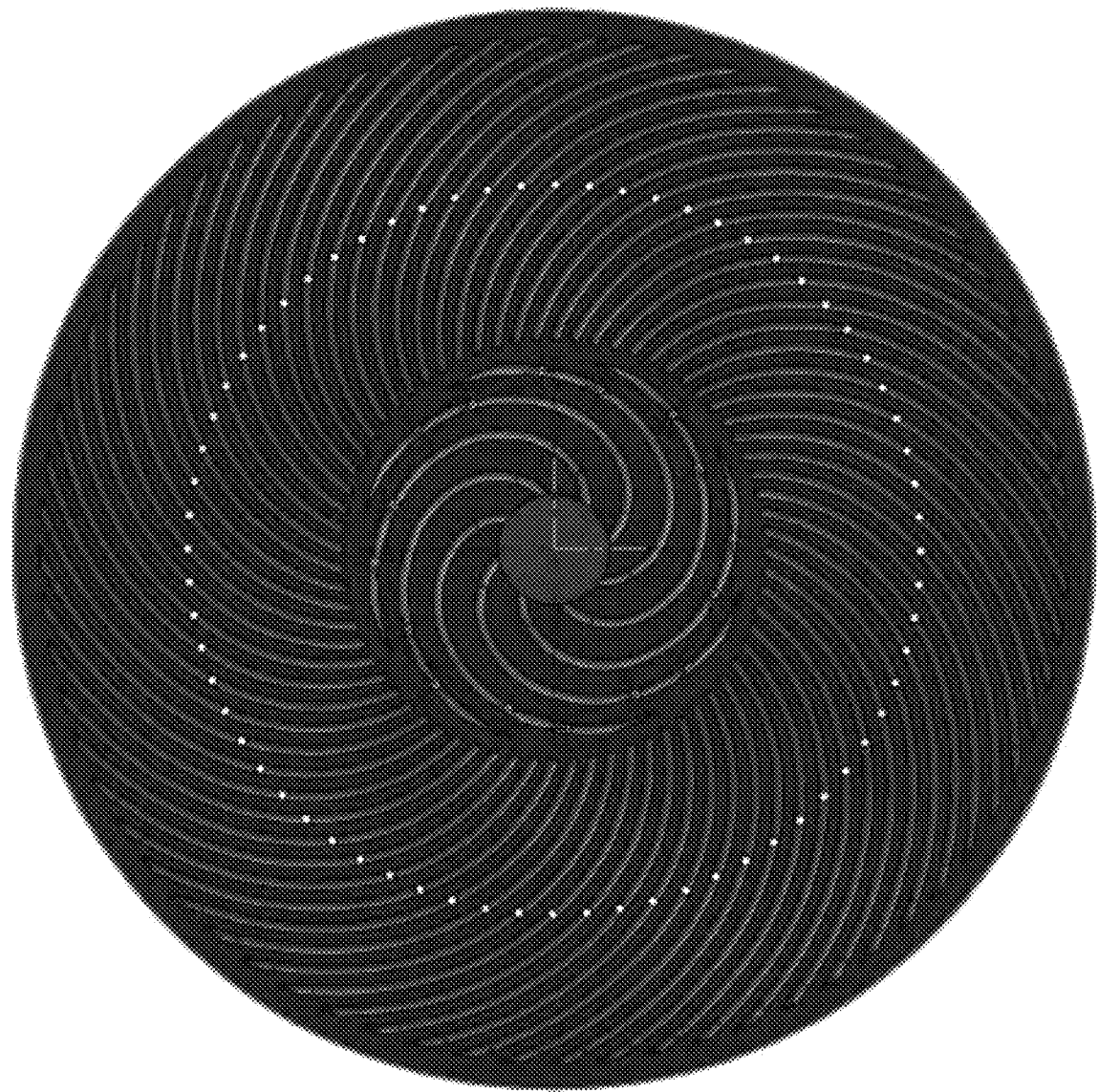
FIG. 47 is an illustration of an embodiment of a double alignment (also called a 4-fold alignment) back-up pad having 68 outer spiral paths and 8 inner spiral paths according to the present invention
Figure 48:
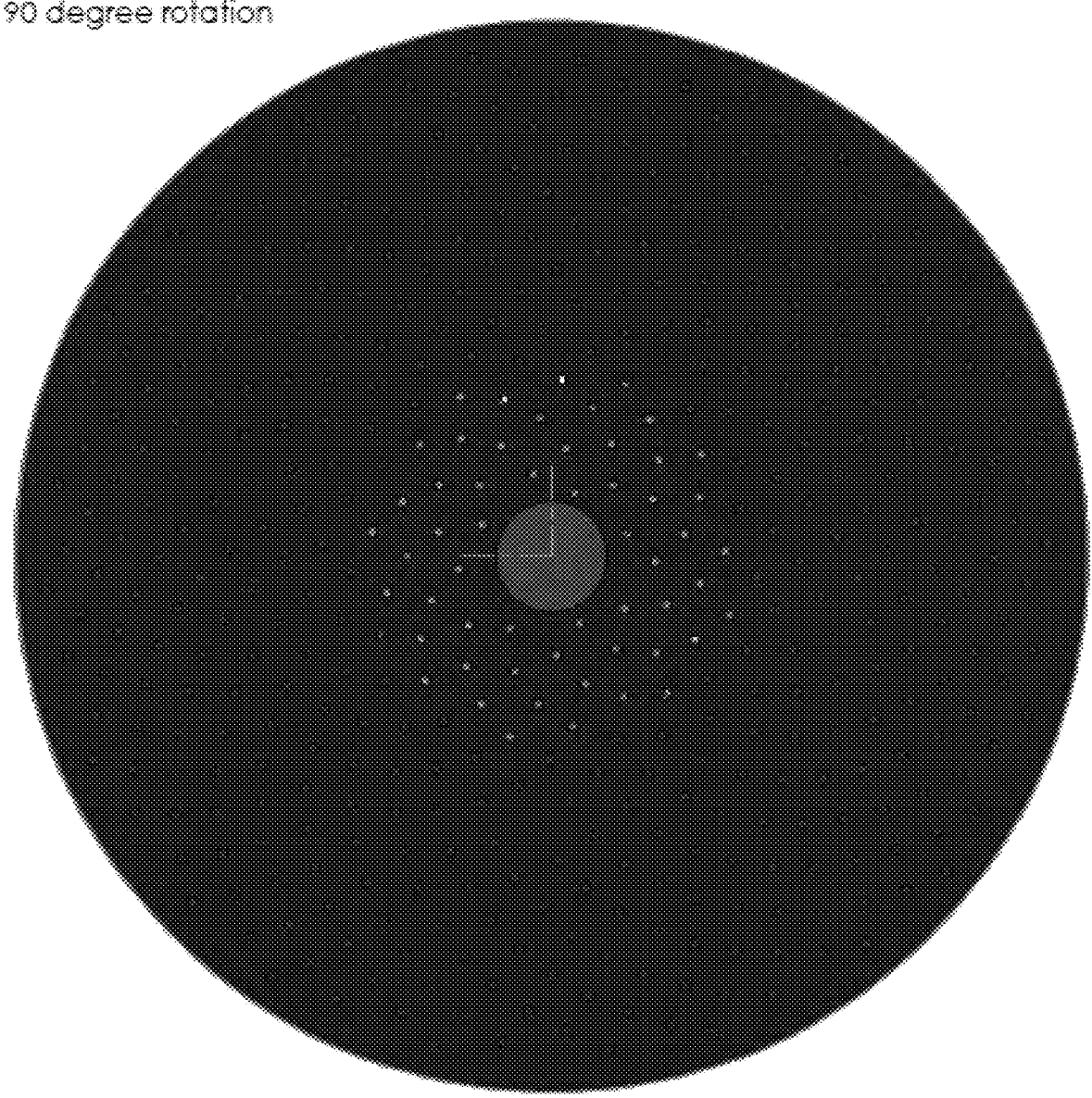
FIG. 48 is an illustration of an embodiment of a coated abrasive having 442 apertures (441 surrounding a central aperture) according to the Vogel equation overlaying the single alignment back-up pad of FIG. 46, wherein the coated abrasive is rotated 90 degrees out of phase with the back-up such that no apertures of the coated abrasive correspond to any of the outer spirals of the back-up pad.
Figure 49:
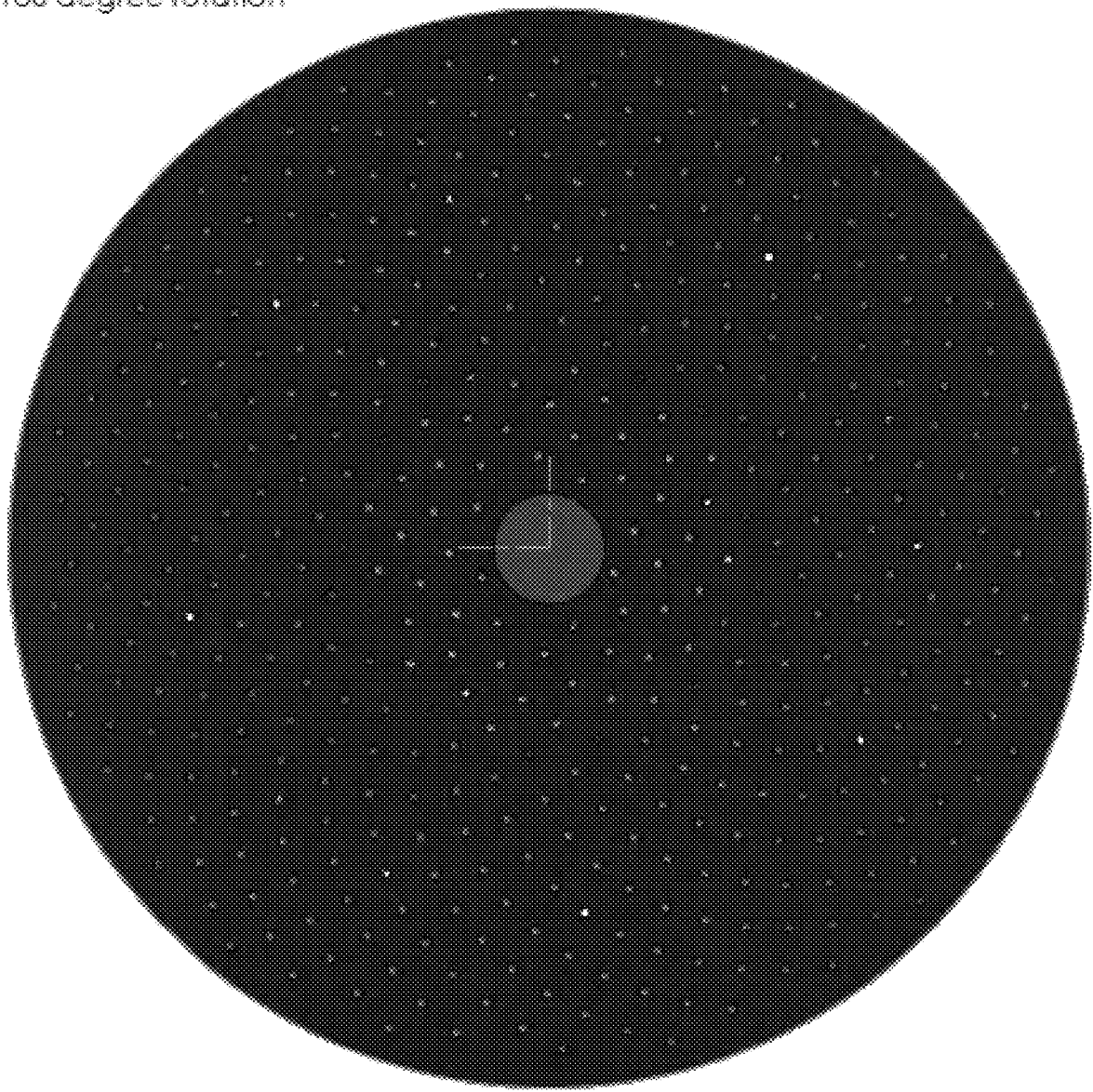
FIG. 49 is an illustration of an embodiment of a coated abrasive having 442 apertures (441 surrounding a central aperture) according to the Vogel equation overlaying the single alignment back-up pad of FIG. 46, wherein the coated abrasive is rotated 180 degrees out of phase with the back-up such that almost all apertures of the coated abrasive correspond to at least one of the outer spirals of the back-up pad.
Figure 50:
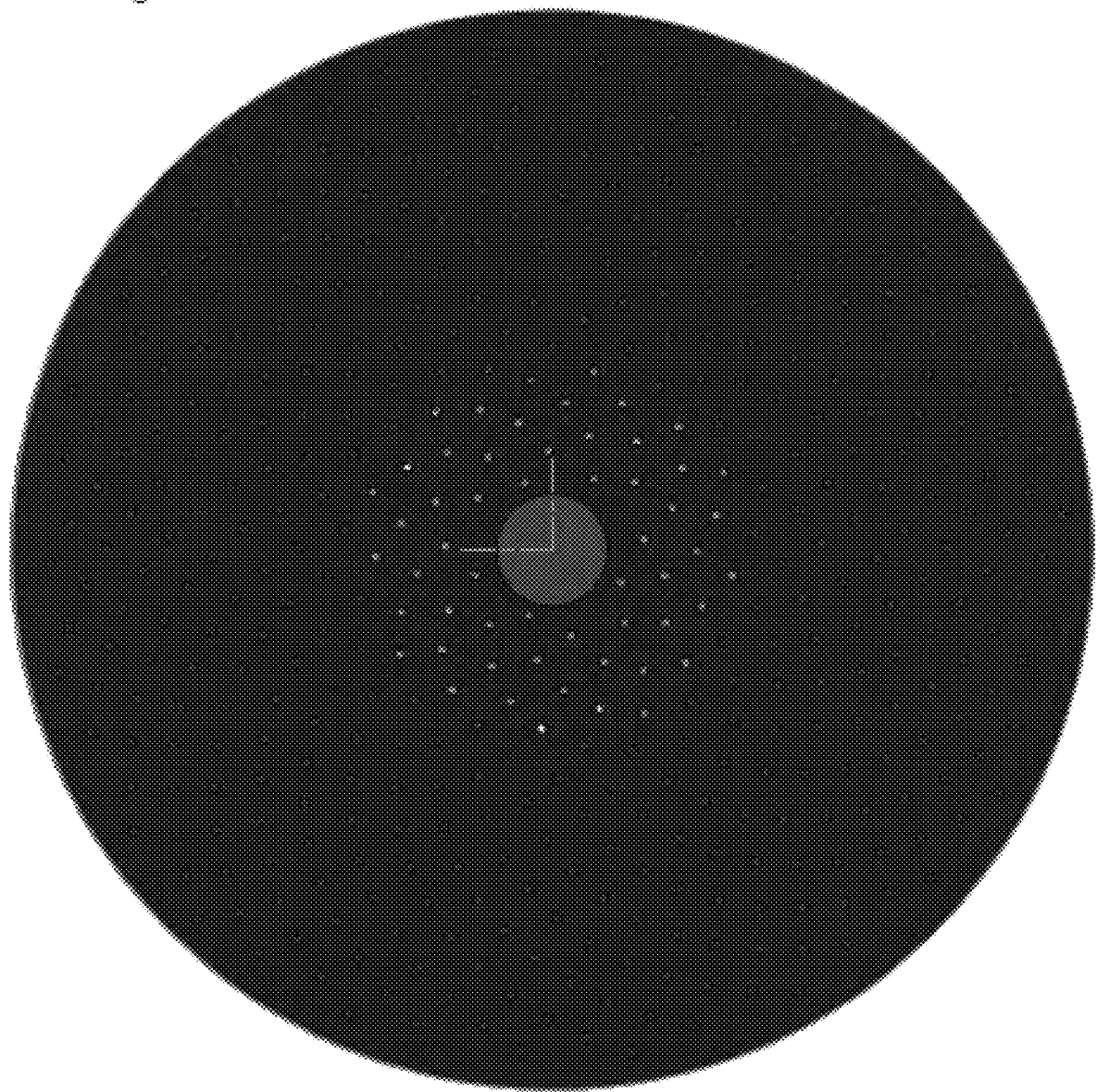
FIG. 50 is an illustration of an embodiment of a coated abrasive having 442 apertures (441 surrounding a central aperture) according to the Vogel equation overlaying the single alignment back-up pad of FIG. 46, wherein the coated abrasive is rotated 270 degrees out of phase with the back-up such that such that no apertures of the coated abrasive correspond to any of the outer spirals of the back-up pad.
Figure 51:
FIG. 51 is an illustration of an embodiment of a coated abrasive having 442 apertures (441 surrounding a central aperture) according to the Vogel equation overlaying the single alignment back-up pad of FIG. 46, wherein the coated abrasive is rotated 0 degrees out of phase with the back-up such that almost all apertures of the coated abrasive correspond to at least one of the outer spirals of the back-up pad.
Figure 52:
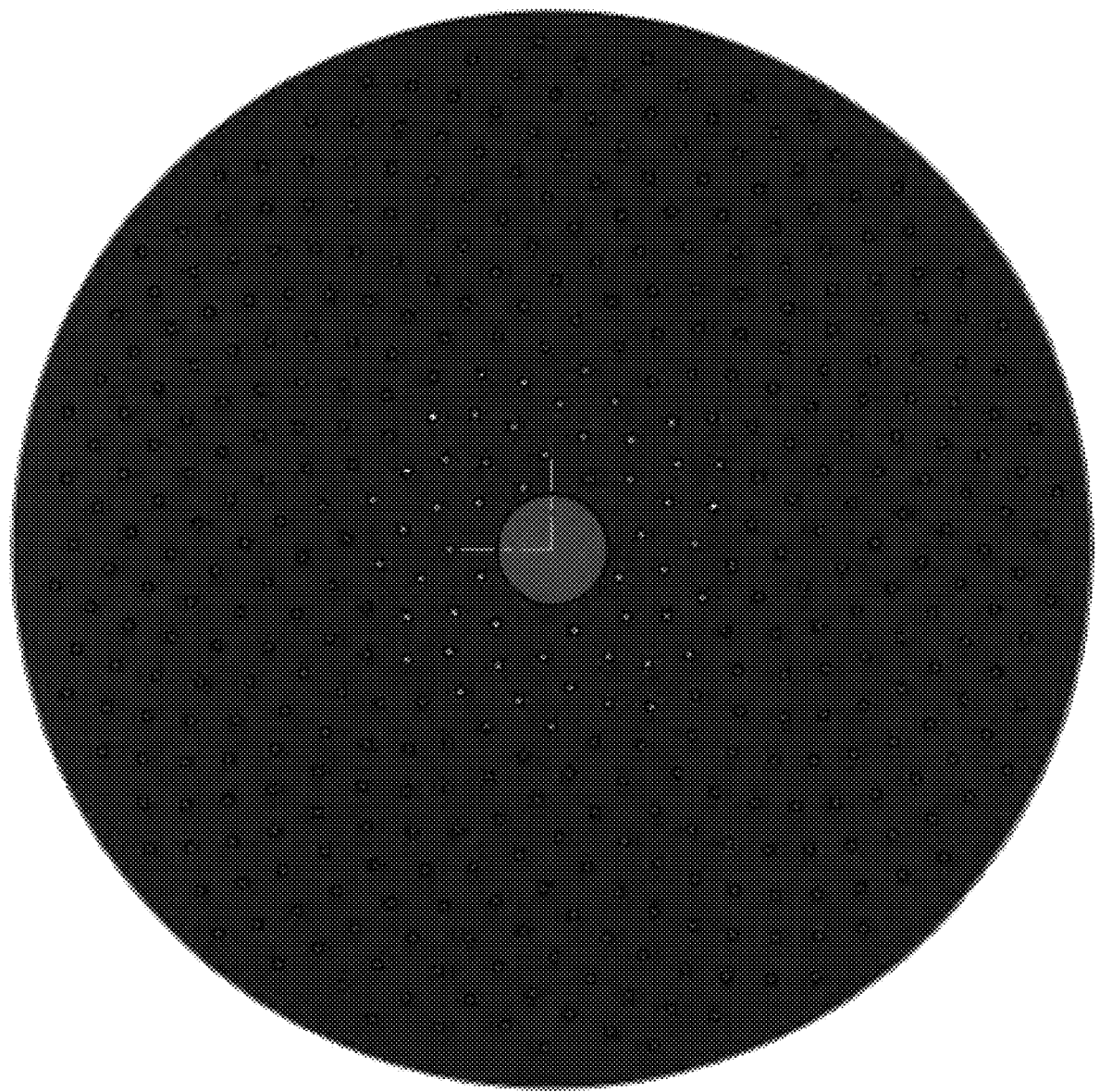
FIG. 52 is an illustration of an embodiment of a coated abrasive having 442 apertures (441 surrounding a central aperture) according to the Vogel equation overlaying the double alignment back-up pad of FIG. 47, wherein the coated abrasive is rotated 45 degrees out of phase with the back-up such that such that no apertures of the coated abrasive correspond to any of the outer spirals of the back-up pad.
Figure 53:
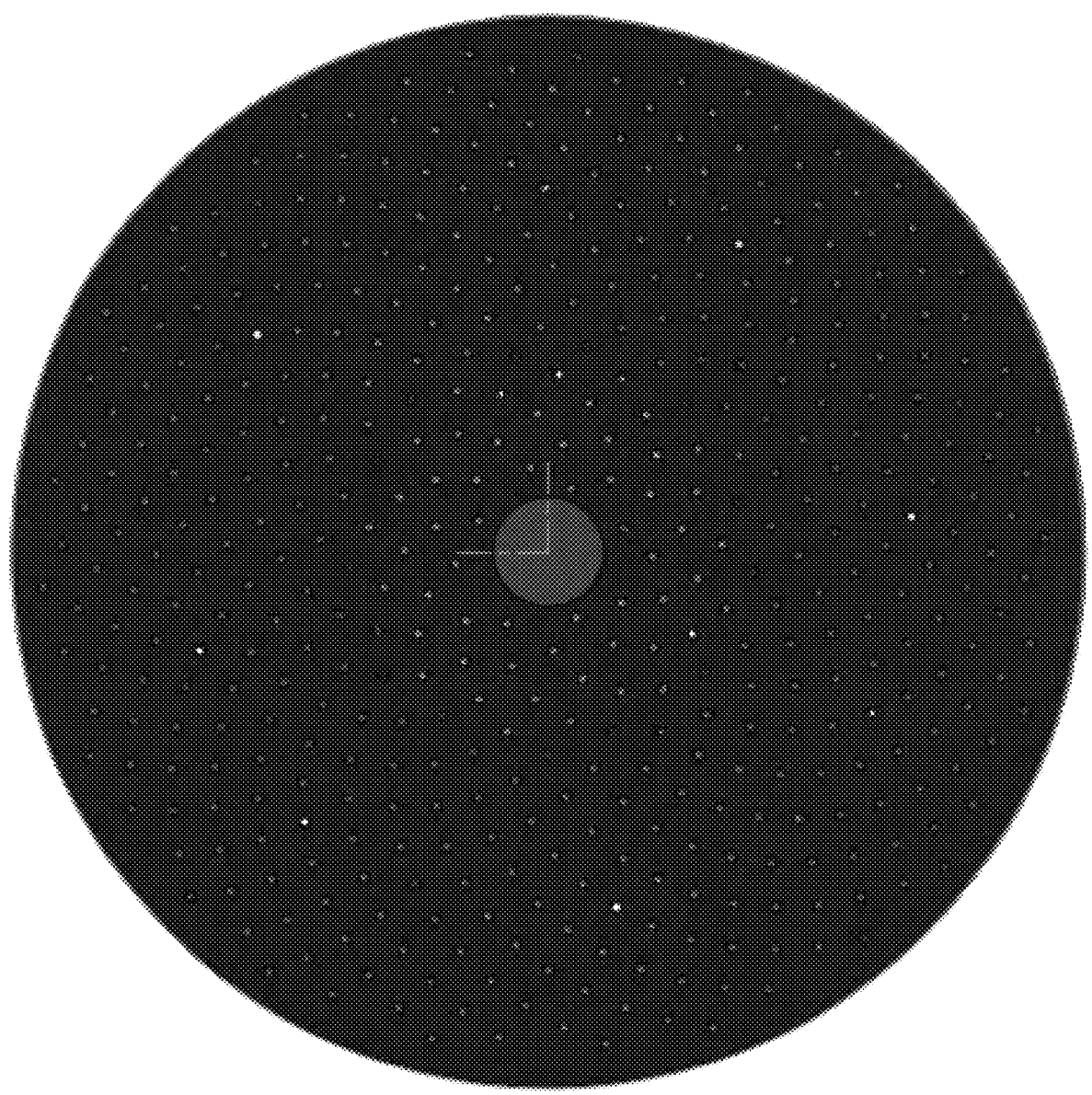
FIG. 53 is an illustration of an embodiment of a coated abrasive having 442 apertures (441 surrounding a central aperture) according to the Vogel equation overlaying the double alignment back-up pad of FIG. 47, wherein the coated abrasive is rotated 90 degrees out of phase with the back-up such that almost all apertures of the coated abrasive correspond to at least one of the outer spirals of the back-up pad.
Figure 54:
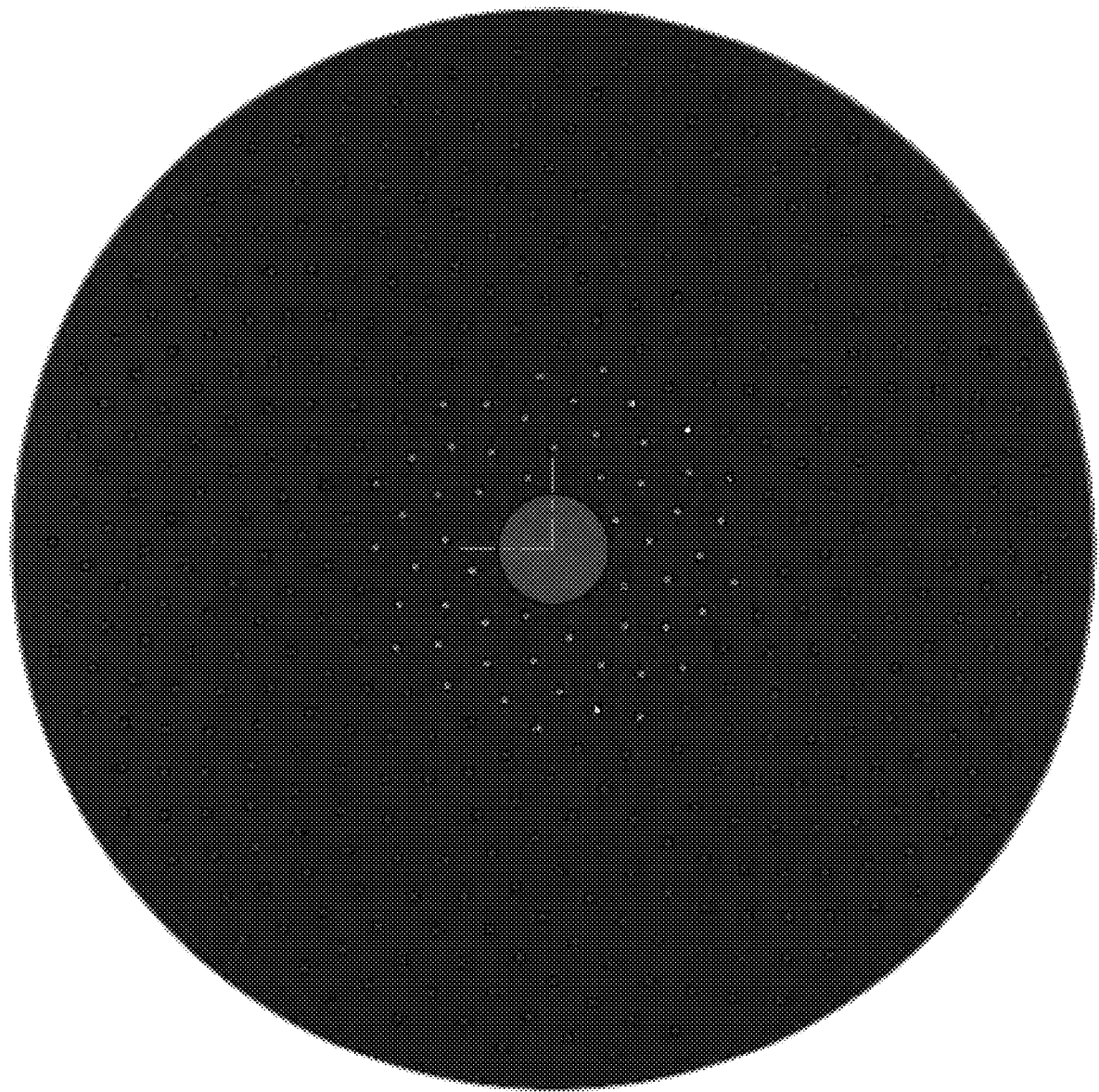
FIG. 54 is an illustration of an embodiment of a coated abrasive having 442 apertures (441 surrounding a central aperture) according to the Vogel equation overlaying the double alignment back-up pad of FIG. 47, wherein the coated abrasive is rotated 135 degrees out of phase with the back-up such that such that no apertures of the coated abrasive correspond to any of the outer spirals of the back-up pad.
Figure 55:
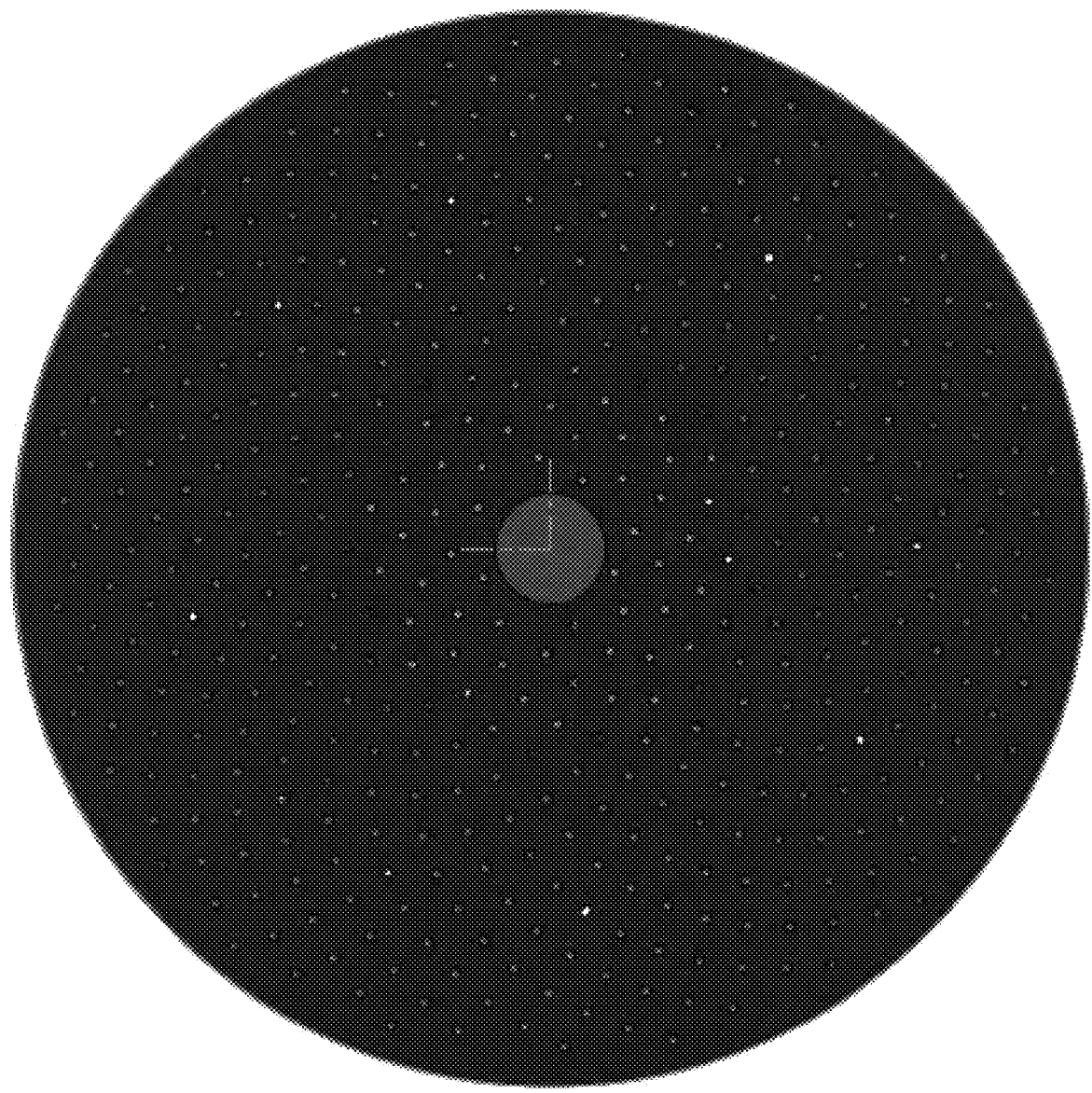
FIG. 55 is an illustration of an embodiment of a coated abrasive having 442 apertures (441 surrounding a central aperture) according to the Vogel equation overlaying the double alignment back-up pad of FIG. 47, wherein the coated abrasive is rotated 180 degrees out of phase with the back-up such that almost all apertures of the coated abrasive correspond to at least one of the outer spirals of the back-up pad.
Figure 56:
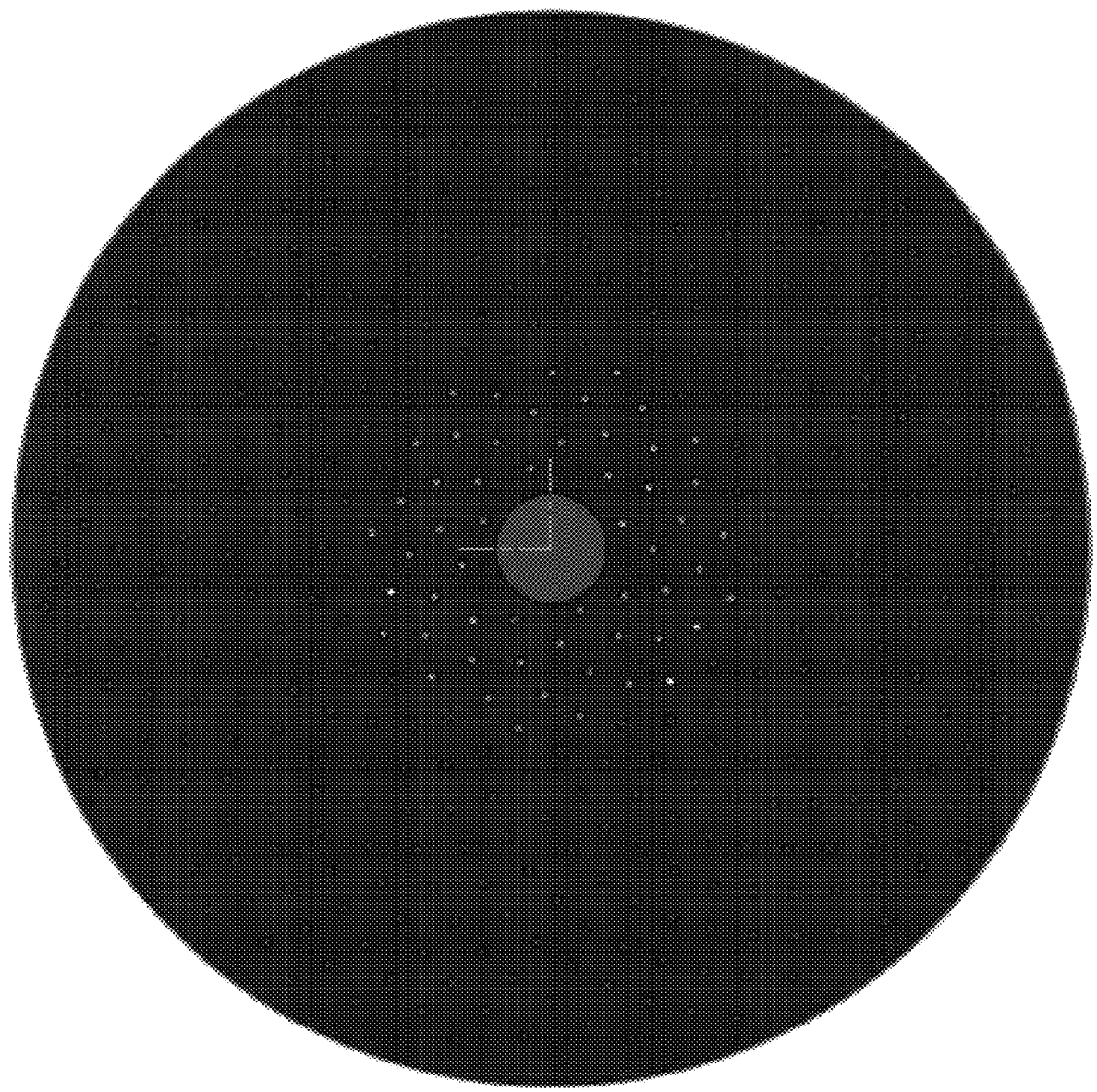
FIG. 56 is an illustration of an embodiment of a coated abrasive having 442 apertures (441 surrounding a central aperture) according to the Vogel equation overlaying the double alignment back-up pad of FIG. 47, wherein the coated abrasive is rotated 225 degrees out of phase with the back-up such that such that no apertures of the coated abrasive correspond to any of the outer spirals of the back-up pad.
Figure 57:
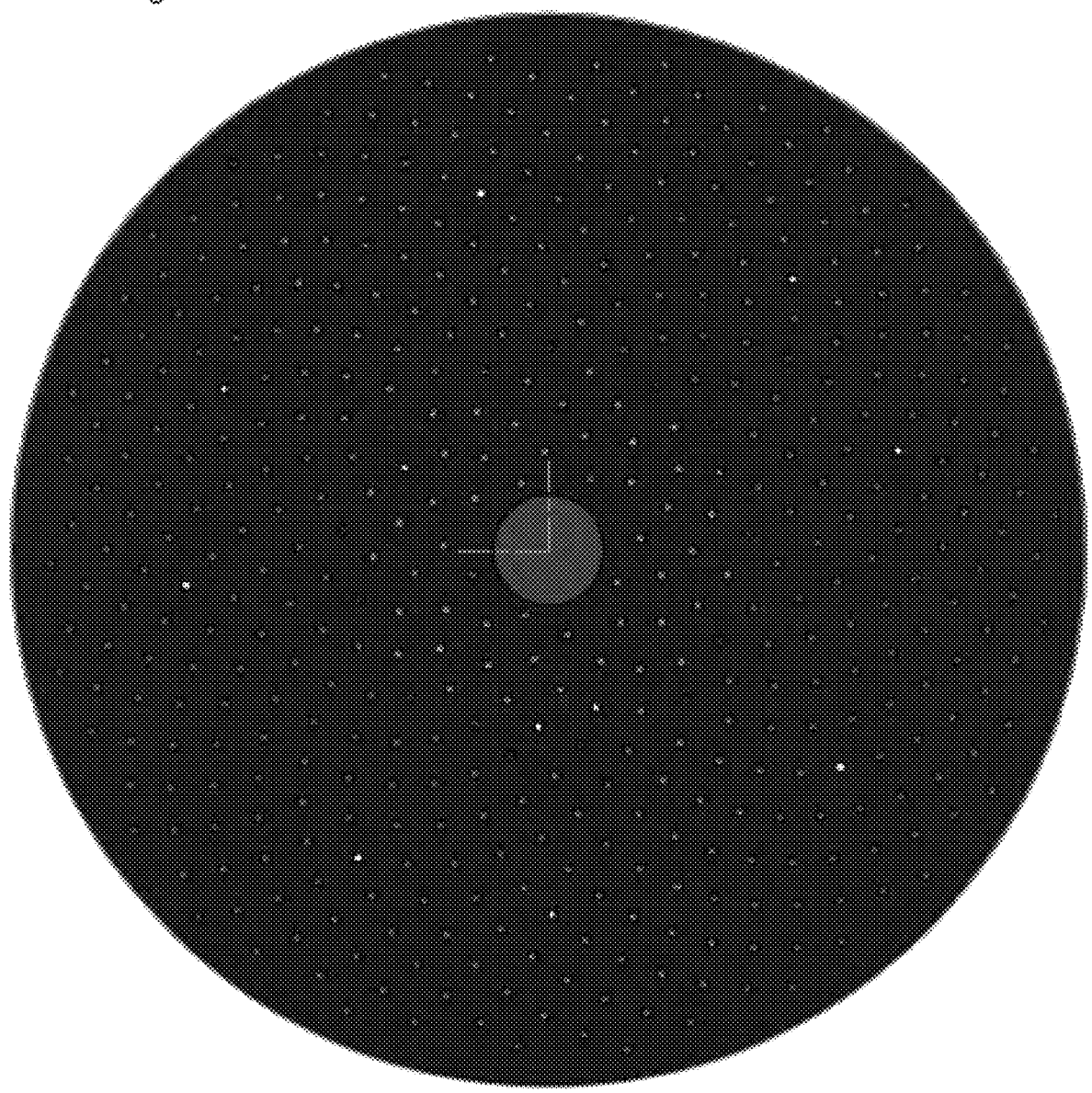
FIG. 57 is an illustration of an embodiment of a coated abrasive having 442 apertures (441 surrounding a central aperture) according to the Vogel equation overlaying the double alignment back-up pad of FIG. 47, wherein the coated abrasive is rotated 270 degrees out of phase with the back-up such that almost all apertures of the coated abrasive correspond to at least one of the outer spirals of the back-up pad.
Figure 58:
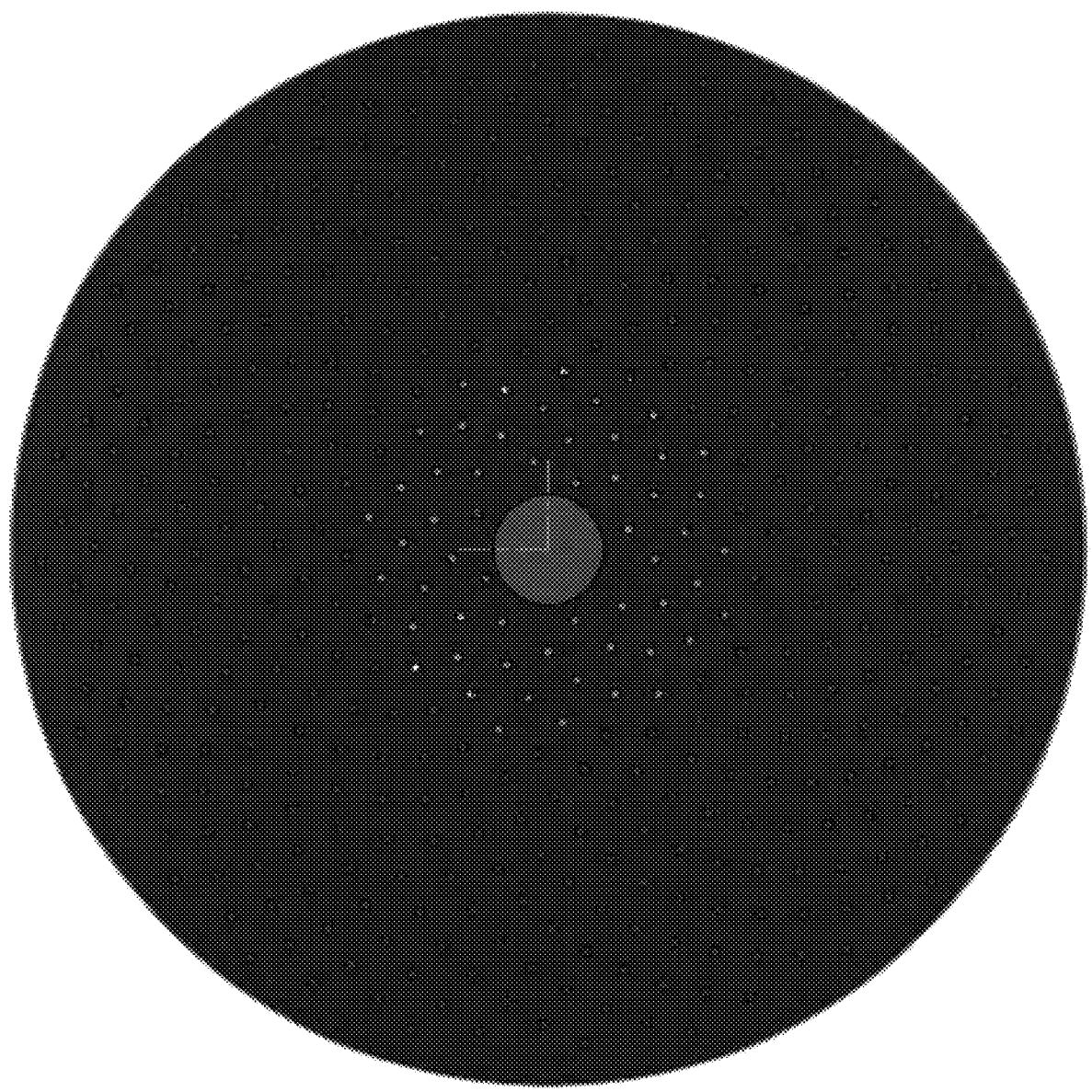
FIG. 58 is an illustration of an embodiment of a coated abrasive having 442 apertures (441 surrounding a central aperture) according to the Vogel equation overlaying the double alignment back-up pad of FIG. 47, wherein the coated abrasive is rotated 315 degrees out of phase with the back-up such that such that no apertures of the coated abrasive correspond to any of the outer spirals of the back-up pad.
Figure 59:
FIG. 59 is an illustration of an embodiment of a coated abrasive having 442 apertures (441 surrounding a central aperture) according to the Vogel equation overlaying the double alignment back-up pad of FIG. 47, wherein the coated abrasive is rotated 0 degrees out of phase with the back-up such that almost all apertures of the coated abrasive correspond to at least one of the outer spirals of the back-up pad.

It will be appreciated that certain of the back-up pad spiral and phyllotactic air-flow patterns will exhibit a certain quality of alignment with an aperture pattern of a coated abrasive, particularly when the air-flow pattern is based on a transpose and rotation of the co-ordinates of the apertures of the coated abrasive. In an embodiment, the air-flow pattern of the back-up pad will match up with a majority, to nearly all, of the coated abrasive apertures when the back-up pad is in a particular phase, or degrees of rotation, with respect to the coated abrasive. A back-up pad is said to be a single-alignment (also called a 2-fold alignment) back-up pad when the air-flow paths of the back-up pad match up with the apertures of the coated abrasive when the back-up pad is rotated 90° or 180° compared to the coated abrasive and a majority to nearly all of the apertures of the coated abrasive match-up with at least one of the air-flow paths of the back-up pad. FIG. 46 illustrates an embodiment of a single-alignment back-up pad. FIG. 48-51 show an illustration of an embodiment of a coated abrasive having 442 apertures (441 surrounding a central aperture) according to the Vogel equation overlaying a single alignment back-up pad of FIG. 46, wherein the coated abrasive is rotated 90° out of phase, 180° out of phase, 270° degrees out of phase, and 0° out of phase with the back-up pad, such that the apertures of the coated abrasive alternate between none of the apertures of the coated abrasive corresponding to any of the outer spirals of the back-up pad to having almost all the apertures of the coated abrasive correspond to at least one of the outer spirals of the back-up pad. A double-alignment (also called a 4-fold alignment) back-up pad is illustrated in FIG. 47. FIG. 52-59 show an illustration of an embodiment of a coated abrasive having 442 apertures (441 surrounding a central aperture) according to the Vogel equation overlaying the double-alignment back-up pad of FIG. 47, wherein the coated abrasive is rotated 45°, 90°, 135°, 180°, 225°, 270°, 315°, and 0° out of phase with the back-up pad. It is again shown that the apertures of the coated abrasive alternate between having none of the apertures of the coated abrasive correspond to any of the outer spirals of the back-up pad (45°, 135°, 225°, and)315° to having almost all the apertures of the coated abrasive correspond to at least one of the outer spirals of the back-up pad (90°, 180°, 270°, and 0°).

In an embodiment, the back-up pad can include or be adapted to include an alignment indicator. An alignment indicator can be a marking, device, notch, attachment, collar, protrusion, or combination thereof to indicate the degree of alignment of the back-up pad with the coated abrasive. In a specific embodiment, the alignment indicator can be marking.

Although described as co-operative with the embodiments of the abrasive articles described herein, such back-up pads can also be used with standard state-of-the art perforated coated abrasives. It has been unexpectedly found that back-up pads having a plurality of openings, a plurality of cavities, a plurality of channels, or combinations thereof that form suitable spiral or phyllotactic pattern air-flow paths have improved swarf removal, can promote abrasive cutting performance, and abrasive lifespan for both standard state-of-the art perforated coated abrasives and coated abrasives having phyllotactic patterns of perforations.

A back-up pad can be flexible or rigid. The back-up pad can be made of any number of various materials, or combinations of materials, including those conventionally used in the manufacture of back-up pads. The back-up pad can be made of single piece, unitary construction, or multi-piece construction, such as multi-layer construction or concentric layer construction. The back-up pad is preferably a resilient material such as a flexible foam. Suitable foams can be polyurethane, polyester, polyester-urethane, polyetherurethane; a natural or artificial rubber such as a polybutadiene, polyisoprene, EPDM polymer, polyvinylchloride (PVC), polychroloprene, or styrene/butadiene copolymer; or combinations thereof. The foam can be open or closed cell. Additives, such as coupling agents, toughening agents, curing agents, antioxidants, reinforcing materials, and the like can be added to the foam formulation to achieve desired characteristics. Dyes, pigments, fillers, anti-static agents, fire retardants, and scrim can also be added to the foam or other resilient material used to make the back-up pad.

Particularly useful foams include TDI (toluene diisocyanate)/polyester and MDI (methylene diphenyl diisocyanate)/polyester foams. In an embodiment, the back-up pad is made of resilient, open cell polyurethane foam formed as the reaction product of a polyether polyol and an aromatic polyisocyanate. In another embodiment, the back-up pad can be a foam, a vulcanized rubber, or any combination thereof.

Method of Making—Coated Abrasive Article

Turning to a method of making a coated abrasive article having an aperture pattern, a backing can be distributed from a roll, the backing can be coated with a binder formulation dispensed from a coating apparatus. An exemplary coating apparatus includes a drop die coater, a knife coater, a curtain coater, a vacuum die coater or a die coater. Coating methodologies can include either contact or non-contact methods. Such methods include two roll, three roll reverse, knife over roll, slot die, gravure, extrusion or spray coating applications.

In an embodiment, the binder formulation can be provided in a slurry including the formulation and abrasive grains. In an alternative embodiment, the binder formulation can be dispensed separate from the abrasive grains. The abrasive grains may be provided following coating of the backing with the binder, after partial curing of the binder formulation, after patterning of the binder formulation, if any, or after fully curing the binder formulation. The abrasive grains may, for example, be applied by a technique, such as electrostatic coating, drop coating, or mechanical projection.

In another embodiment, the backing, coated with the binder and abrasive grains, can be stamped, die-cut, laser cut, or combinations thereof to form the pattern of apertures. The apertures can be substantially free of backing material, binder, and abrasive grains.

In another embodiment, the backing can be selectively coated with the binder to leave uncoated regions that are then cut to form the apertures. For example, the binder can be printed onto the backing, such as by screen printing, offset printing, or flexographic printing. In another example, the binder can be selectively coated using gravure coating, slot die coating, masked spray coating, or the like. Alternatively, a photoresist or UV curable mask can be applied to the backing and developed, such as by photolithography, to mask portions of the backing. In another example, a dewetting compound can be applied to the backing prior to applying the binder.

Turning to a method of abrading a work piece, the work piece can be contacted with a coated abrasive. The coated abrasive can be rotated relative to the work piece. For example, the coated abrasive can be mounted on an orbital sander and contacted to the work piece. While abrading the work piece, material abraded from the work piece can accumulate in the apertures. The accumulated material can be ejected from the apertures by the movement of the coated abrasive during use. Alternately, a vacuum system can be equipped to the abrasive article, which can include a back-up pad that is configured to cooperatively function with the abrasive article.

EXAMPLES

Example 1

Swarf Extraction Efficiency

Figure 20:
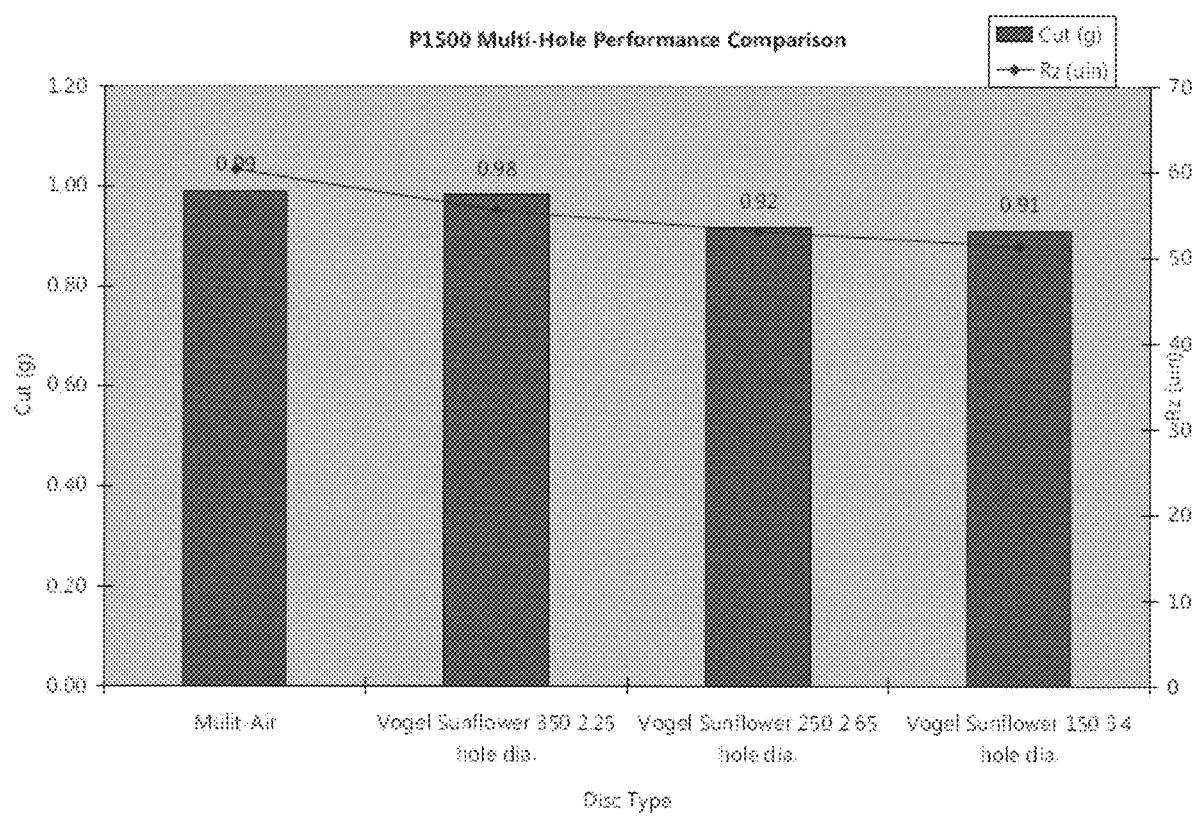
FIG. 20 is a chart comparing abrasive performance of exemplary aperture patterns according to the present invention with a state-of-the art aperture pattern

The potential swarf extraction efficiency of an abrasive disc aperture pattern can be quantified by determining the averaged distance from an aperture for any point on a notional surface defined by the rotation of the abrasive disc in a selected orbital. The abrasive surfaces (i.e., the abrasive disc patterns) for Comparative Sample 1 (FIG. 20A) and inventive Samples 1 to 3 (FIG. 20B-D) are shown in the top portions of FIG. 20A-D. The averaged distance from an aperture for any point on the notional surface defined by the rotation of the abrasive disc was determined using simulation software. An orbital corresponding to a standard orbital for a powered hand held orbital sander was used. The averaged distances for each abrasive pattern were plotted as shown in the center portions of FIG. 20A-D. The averaged distances from an aperture were graphed as a function of radius in the lower portion of FIG. 20A-D and the area under the curve was integrated and the values for each aperture pattern were compared. A lower integrated value indicates a better aperture coverage and thus a better swarf extraction efficiency. All of the inventive aperture patterns had a lower integrated value, and thus a swarf extraction efficiency superior to that of the comparative sample. This was surprising considering that all of the samples have an almost equal amount of aperture area. This indicates that the distribution of the apertures about the surface of the abrasive disc is superior. Inventive sample 3 had a particularly dramatic decrease (a 93% reduction) in the integrated value.

Comparative Sample 1 was a 5" MultiAir abrasive disc pattern with 125 holes. and an aperture area (i.e., removed area) of 10.5%. The maximum averaged distance for any given point from an aperture was in a range of 3-4 mm. The integrated averaged distance from an aperture was 49 mm$^2$.

Sample 1 was a 5" Vogel Sunflower abrasive disc pattern with 150 holes and an aperture area (i.e., removed area) of 10.7%. The maximum averaged distance for any given point from an aperture was in a range of 2-3 mm. The integrated averaged distance from an aperture was 33 mm$^2$ (a 32% reduction).

Sample 2 was 5" Vogel Sunflower abrasive disc pattern with 250 holes and an aperture area (i.e., removed area) of 10.8%. The maximum averaged distance for any given point from an aperture was in a range of 1-2 mm. The integrated averaged distance from an aperture was 11 mm$^2$ (a 77% reduction).

Sample 3 was a 5" Vogel Sunflower abrasive disc pattern with 350 holes and an aperture area (i.e., removed area) of 10.7%. The maximum averaged distance for any given point from an aperture was in a range of 1-2 mm. The integrated averaged distance from an aperture was 3 mm$^2$ (a 93% reduction).

TABLE 1

Integrated Averaged Distance From An Aperture

| | No. of Apertures | Aperture Area (% of total potential surface area) | Integrated Averaged Distance From An Aperture During Rotation (mm$^2$) |
|---|---|---|---|
| Comp. 1 | 125 | 10.5 | 49 |
| Sample 1 | 150 | 10.7 | 33 |
| Sample 2 | 250 | 10.8 | 11 |
| Sample 3 | 350 | 10.7 | 3 |

Example 2

Improved Extraction Efficiency with Improved Abrasive Area

Figure 21:
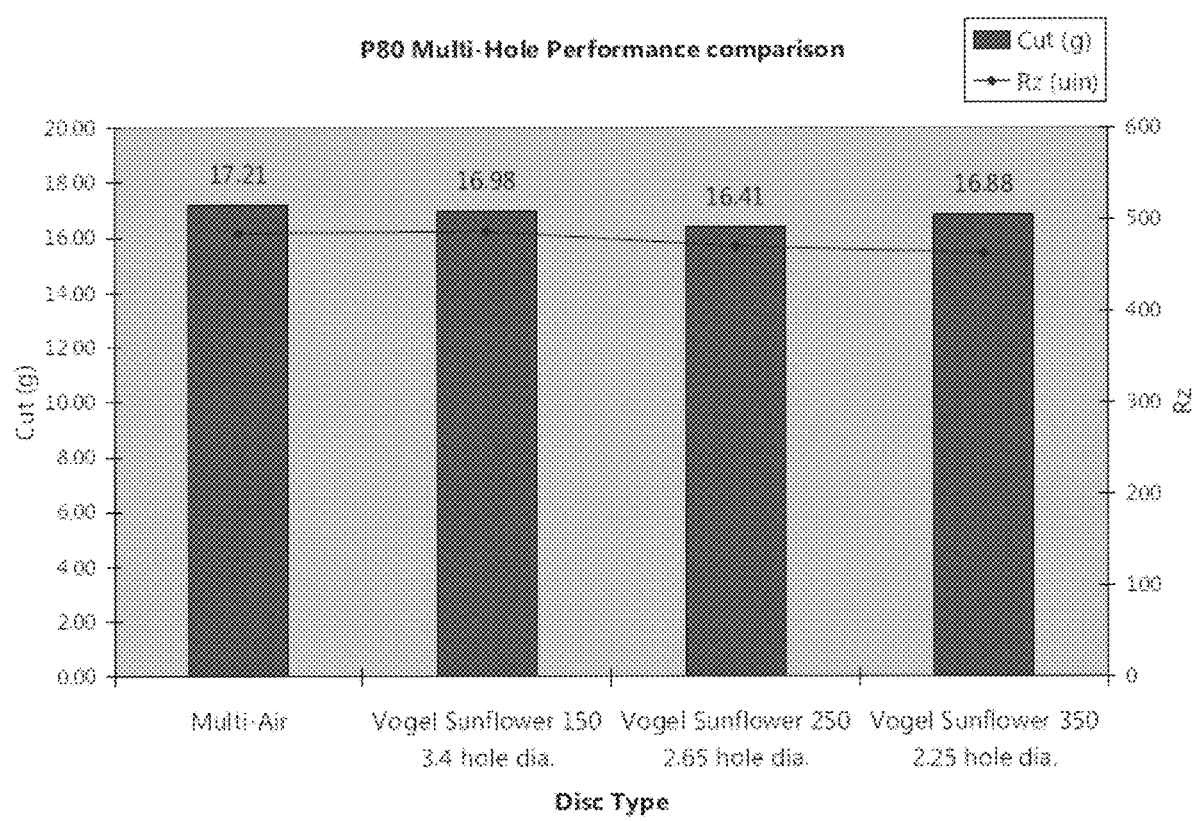
FIG. 21 is a chart comparing abrasive performance of exemplary aperture patterns according to the present invention with a state-of-the art aperture pattern

Additional inventive abrasive aperture patterns were examined with respect to potential swarf extraction efficiency using the same procedure as above. The abrasive disc patterns for Comparative Sample 1 (FIG. 21A) and inventive Samples 1 to 3 (FIG. 21B-D) are shown in the top portions of FIG. 21A-D. The averaged distances for each abrasive pattern were plotted as shown in the center portions of FIG. 21A-D. The averaged distances from an aperture graphed as a function of radius in shown in the lower portion of FIG. 20A-D. The area under the curve was integrated and the values for each aperture pattern were compared. Surprisingly, all the inventive samples achieved a comparable to better integrated value even while having an aperture area that was from 2.7% to 6.3% less than the comparative sample. This indicates that the distribution of the apertures about the surface of the inventive abrasive discs is desirable because a very high swarf extraction efficiency can be maintained while increasing the amount of available abrasive area. Inventive sample 3 had the most dramatic decrease in the integrated value, yet also had the largest increase in available abrasive area.

Comparative Sample 1 was a 5" MultiAir abrasive disc pattern with 125 holes and an aperture area (i.e., removed area) of 10.5%. The maximum averaged distance for any given point from an aperture was in a range of 3-4 mm. The integrated averaged distance from an aperture was 49 mm².
Sample 1 was a 5" Vogel Sunflower abrasive disc pattern with 148 holes and an aperture area (i.e., removed area) of 7.8% (2.7% increased abrasive area). The maximum averaged distance for any given point from an aperture was in a range of 2-3 mm. The integrated averaged distance from an aperture was 51 mm² (a 4% increase).
Sample 2 was 5" Vogel Sunflower abrasive disc pattern with 246 holes and an aperture area (i.e., removed area) of 5.0% (5.5% increased abrasive area). The maximum averaged distance for any given point from an aperture was in a range of 2-3 mm. The integrated averaged distance from an aperture was 32 mm² (a 34% reduction).
Sample 3 was a 5" Vogel Sunflower abrasive disc pattern with 344 holes and an aperture area (i.e., removed area) of 3.7%. The maximum averaged distance for any given point from an aperture was in a range of 1-2 mm. The integrated averaged distance from an aperture was 22 mm² (a 55% reduction).

TABLE 2

Integrated Averaged Distance From An Aperture

|  | No. of Apertures | Aperture Area (% of total potential surface area) | Integrated Averaged Distance From An Aperture During Rotation (mm²) |
|---|---|---|---|
| Comp. 1 | 125 | 10.5 | 49 |
| Sample 1 | 148 | 7.8 | 51 |
| Sample 2 | 246 | 5.0 | 32 |
| Sample 3 | 344 | 3.7 | 22 |

Example 3

Abrasive Performance—With Vacuum, Non-Specific Back-Up Pad 5-inch coated abrasive discs were tested by abrading a cast acrylic panel using a hand-held orbital sander. Each coated abrasive disc was moved in a straight line across the length of the cast acrylic panel. The amount of material removed was determined by measuring the weight of the cast acrylic panel before and after each grinding cycle using a scale. The average material removed was determined by summing the weight loss over six grinds. The average material removal was determined by averaging over three trials.

The surface finish (Rz) of the cast acrylic panel was measured after the first grind at three points along the length of the cut. The average Rz was taken over three trials.

Figure 22:
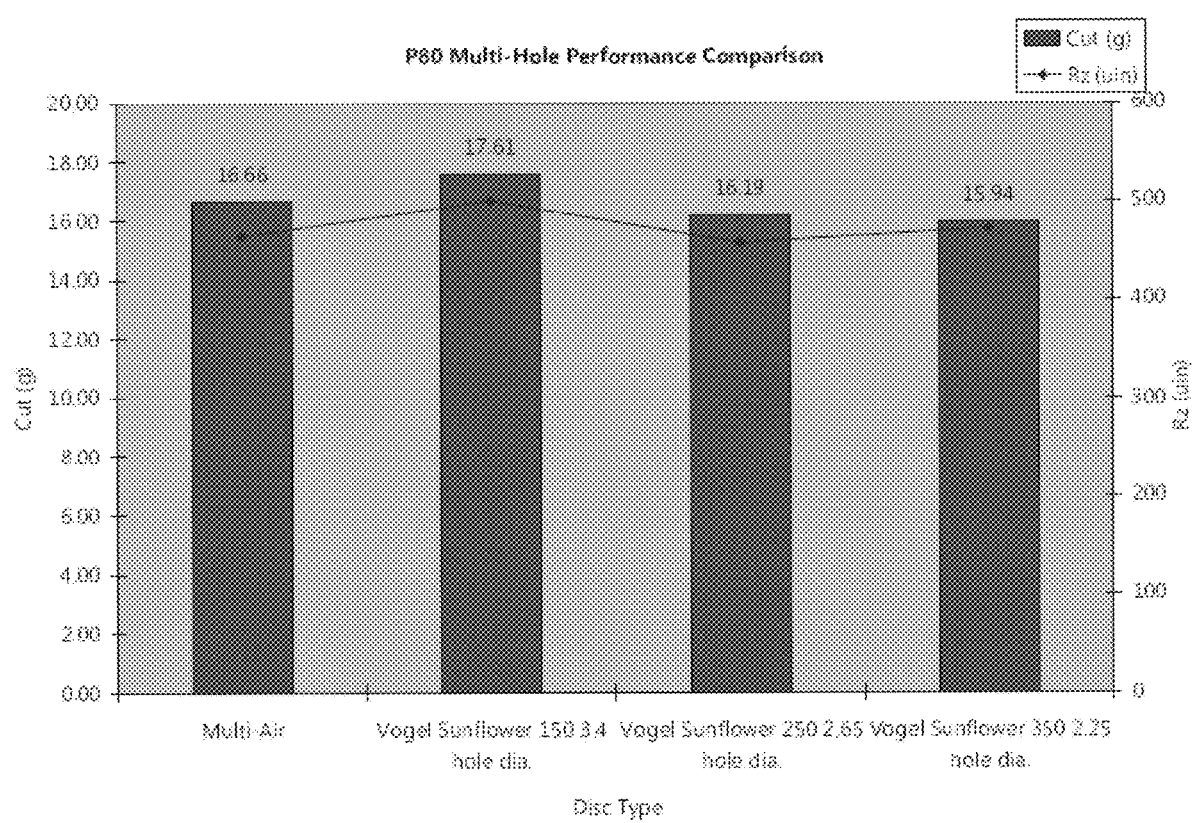
FIG. 22 is a chart comparing abrasive performance of exemplary aperture patterns according to the present invention with a state-of-the art aperture pattern

FIG. 22 shows a chart comparing the cumulative cut and the surface finish for Comparative Sample 1 and three inventive samples.

A comparison of coated abrasive discs having a grit size of P1500 (average abrasive grain size of about 12.6 microns) was conducted. Each grind of the test was performed for a duration of 30 seconds with a vacuum applied unless specified otherwise. A Dynabrade 54-hole back-up pad ("hard" pad) was used with all samples.

Comparative Sample 1 was a Norton MultiAir 5" diameter disc with a P1500 grit size with 125 holes distributed in a grid pattern. The total amount of aperture area was 10.5% of the disc.

Sample 1 was a 5" diameter abrasive disc with P1500 grit size and a phyllotactic aperture pattern based on the Vogel equation. The number of apertures was 150. The total amount of aperture area was 10.5%.

Sample 2 was the same as Sample 1 except that the number of apertures was 250. The total amount of aperture area was 10.8%.

Sample 3 was the same as Sample 1 except that the number of apertures was 350. The total amount of aperture area was 10.7%.

TABLE 3

Abrasive Performance

|  | No. of Apertures | Aperture Area (% of total potential surface area) | Cumulative Material Removed (g) | Rz (µ inch) |
|---|---|---|---|---|
| Comp. 1 | 125 | 10.5 | 1.15 | 57 |
| Sample 1 | 150 | 10.7 | 1.15 | 54 |
| Sample 2 | 250 | 10.8 | 1.15 | 57 |
| Sample 3 | 350 | 10.7 | 1.12 | 59 |

Example 4

Abrasive Performance—With Vacuum, Non-Specific Back-Up Pad

Figure 23:
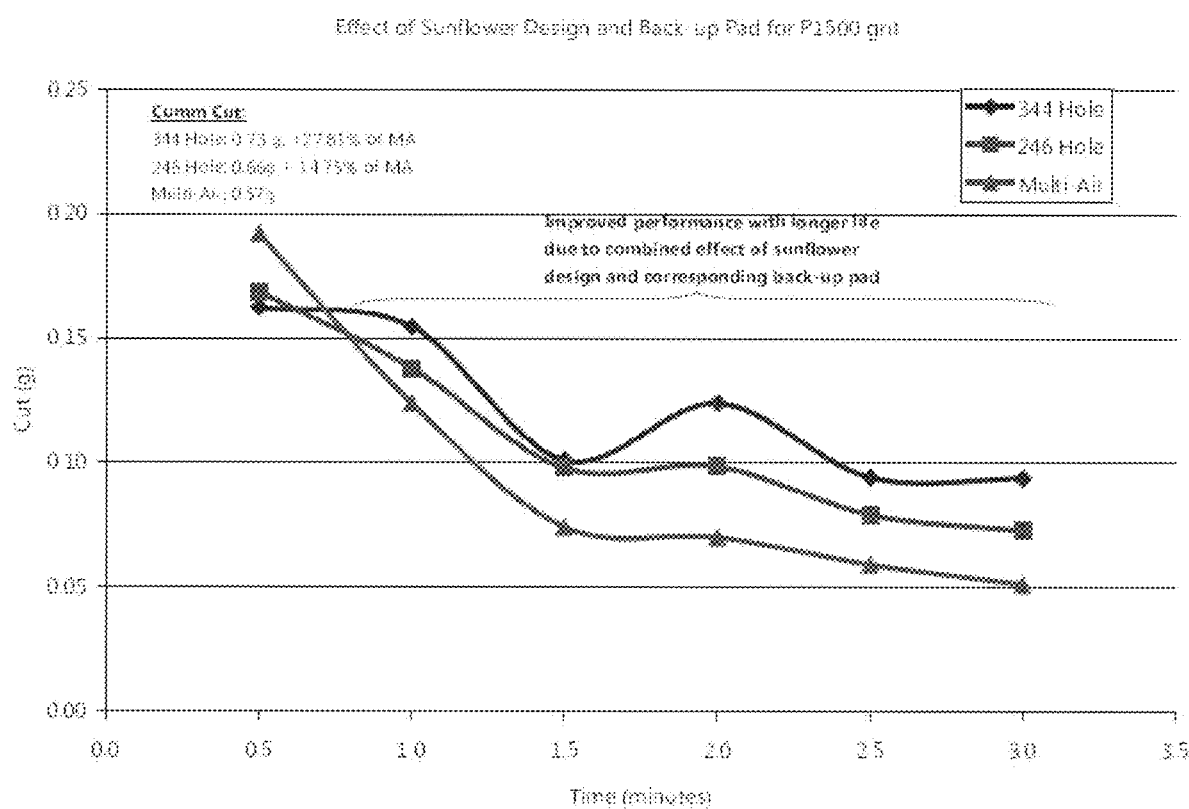
FIG. 23 is a graph comparing abrasive performance of exemplary aperture patterns and co-operative back-up pads according to the present invention with a state-of-the art aperture pattern and state-of-the art back-up pad

FIG. 23 shows a chart comparing the cumulative cut and the surface finish for Comparative Sample 1 and three inventive samples.

The abrasive performance test was conducted the same as above in Example 3, except that a Norton Multi-Air 125 hole back-up pad ("soft" pad) was used with all samples.

Comparative Sample 1 and inventive Samples 1-3 were the same as above in Example 3.

TABLE 4

Abrasive Perormance

|  | No. of Apertures | Aperture Area (% of total potential surface area) | Cumulative Material Removed (g) | Rz (µ inch) |
|---|---|---|---|---|
| Comp. 1 | 125 | 10.5 | .99 | 60 |
| Sample 1 | 150 | 10.7 | .98 | 56 |

TABLE 4-continued

Abrasive Performance

|  | No. of Apertures | Aperture Area (% of total potential surface area) | Cumulative Material Removed (g) | Rz (μ inch) |
|---|---|---|---|---|
| Sample 2 | 250 | 10.8 | .92 | 53 |
| Sample 3 | 350 | 10.7 | .91 | 51 |

Example 5

Abrasive Performance—With Vacuum, Non-Specific Back-Up Pad

Figure 24:
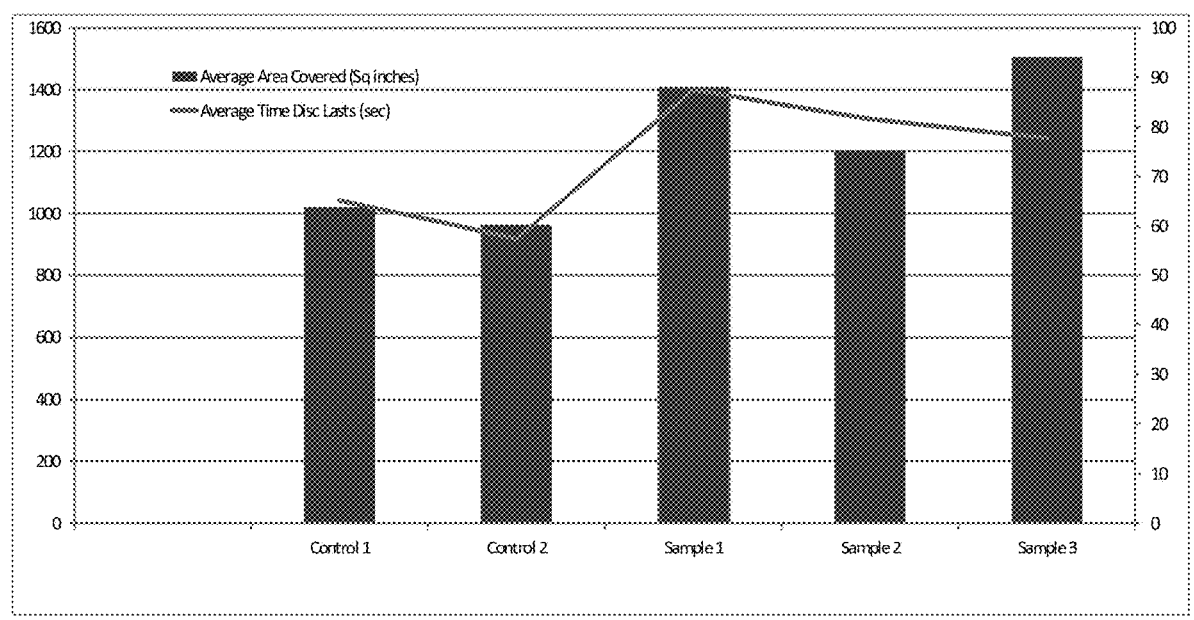
FIG. 24 is a graph comparing abrasive performance of pairings of exemplary coated abrasive discs and back-up pads according to the present invention with combinations of state-of-the art coated abrasives and back-up pads

FIG. 24 shows a chart comparing the cumulative cut and the surface finish for Comparative Sample 1 and three inventive samples.

The abrasive performance test was conducted the same as above in Example 3, except that each of the six grind cycles was for 2 minutes.

Comparative Sample 1 and inventive Samples 1-3 were the same as above in Example 3, except that an abrasive grit size of P80 (average abrasive grain size of about 201 microns) was used for all samples.

TABLE 5

Abrasive performance

|  | No. of Apertures | Aperture Area (% of total potential surface area) | Cumulative Material Removed (g) | Rz (μ inch) |
|---|---|---|---|---|
| Comp. 1 | 125 | 10.5 | 17.2 | 485 |
| Sample 1 | 150 | 10.7 | 16.98 | 487 |
| Sample 2 | 250 | 10.8 | 16.41 | 471 |
| Sample 3 | 350 | 10.7 | 16.88 | 464 |

Example 6

Abrasive Performance—With Vacuum, Non-Specific Back-Up Pad

Figure 25:
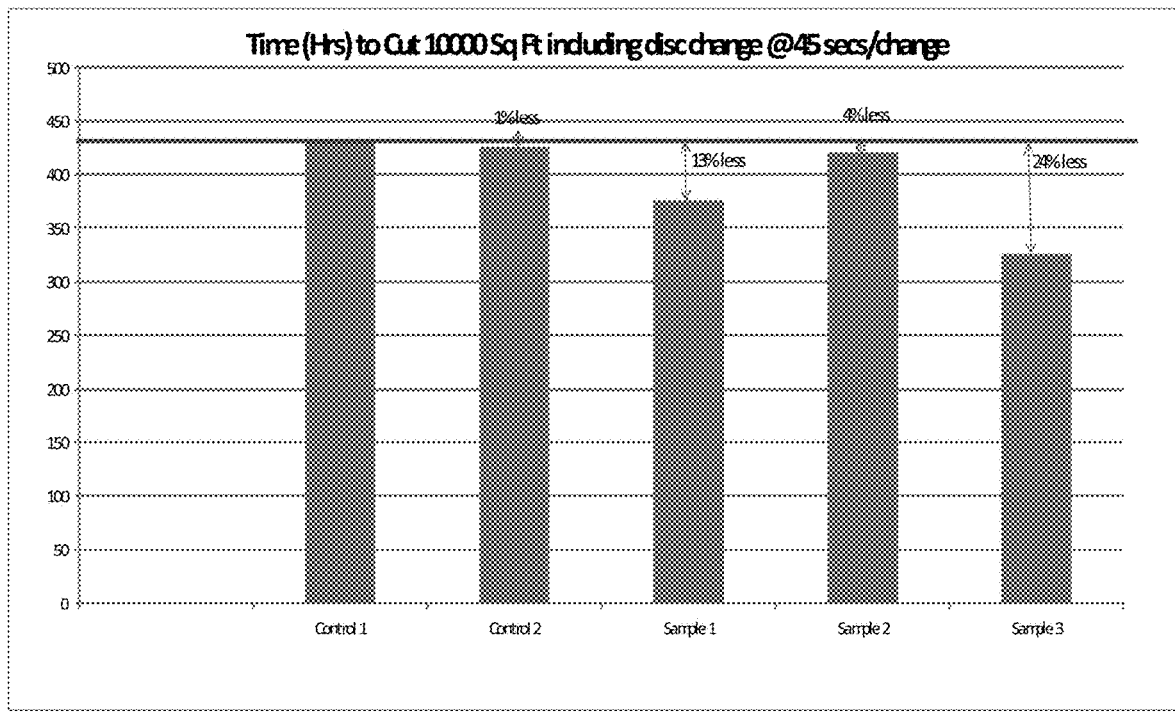
FIG. 25 is a graph comparing calculated times to abrade 10,000 square feet of vehicle paneling using exemplary coated abrasive discs and back-up pads according to the present invention with combinations of state-of-the art coated abrasives and back-up pads

FIG. 25 shows a chart comparing the cumulative cut and the surface finish for Comparative Sample 1 and three inventive samples.

The abrasive performance test was conducted the same as above in Example 4, except that each of the six grind cycles was for 2 minutes.

Comparative Sample 1 and inventive Samples 1-3 were the same as above in Example 4, except that an abrasive grit size of P80 (average abrasive grain size of about 201 microns) was used for all samples.

TABLE 6

Abrasive Performance

|  | No. of Apertures | Aperture Area (% of total potential surface area) | Cumulative Material Removed (g) | Rz (μ inch) |
|---|---|---|---|---|
| Comp. 1 | 125 | 10.5 | 16.66 | 464 |
| Sample 1 | 150 | 10.7 | 17.61 | 500 |

TABLE 6-continued

Abrasive Performance

|  | No. of Apertures | Aperture Area (% of total potential surface area) | Cumulative Material Removed (g) | Rz (μ inch) |
|---|---|---|---|---|
| Sample 2 | 250 | 10.8 | 16.19 | 457 |
| Sample 3 | 350 | 10.7 | 15.94 | 472 |

Example 7

Abrasive Performance—With Vacuum, Co-Operative Back-Up Pad

Figure 26:
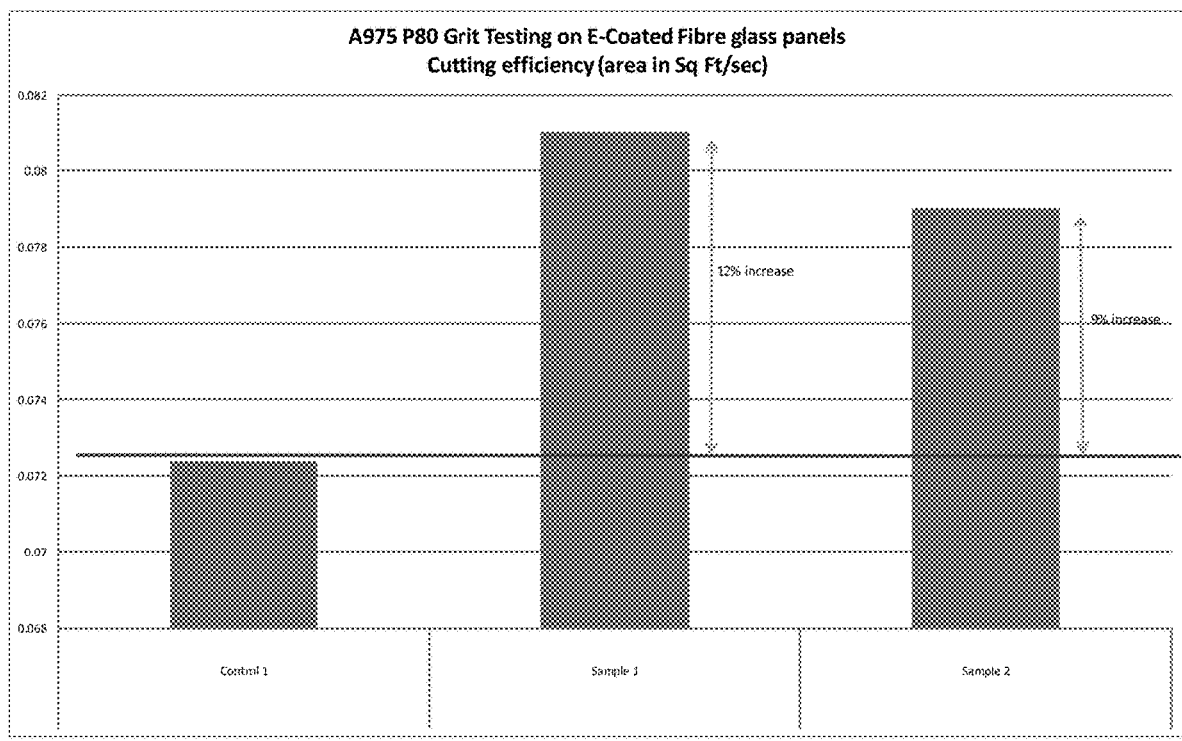
FIG. 26 is a graph comparing cutting efficiency on vehicle paneling using exemplary coated abrasive discs and back-up pads according to the present invention with combinations of state-of-the art coated abrasives and back-up pads

FIG. 26 shows a graph of material cut at progressive time intervals for Comparative Sample 1 and two inventive samples.

The abrasive performance test was conducted the same as above in Example 1, using six grind cycles of 30 seconds each. Three replicates were conducted and the average value recorded.

Comparative Sample 1 was a Norton MultiAir 5" diameter disc with a P1500 grit size and 125 holes distributed in a grid pattern. A co-operative MultiAir back-up pad ("soft" pad) was used in conjunction. The total amount of aperture area was 10.5% of the disc.

Sample 1 was a 5" diameter abrasive disc with P1500 grit size and a phyllotactic aperture pattern based on the Vogel equation. The number of apertures was 246 and a co-operative back-up pad ("soft" pad) based on the transpose image of the 246 Vogel aperture pattern was also used in conjunction. The total amount of aperture area for the abrasive disc was 5%.

Sample 2 was a 5" diameter abrasive disc with P1500 grit size and a phyllotactic aperture pattern based on the Vogel equation. The number of apertures was 344 and a co-operative back-up pad ("soft" pad) based on the transpose image of the 344 Vogel aperture pattern was used in conjunction. The total amount of aperture area of the abrasive disk was 3.7%.

As can be seen in the graph, the initial cut (for the first cycle) was marginally low but the rate of deterioration of the cut was significantly improved compared with the control Multi-Air pattern. The rate of deterioration is an indication of the loading of the disc. The higher the loading, the faster the cut rate falls off. The improvement in mitigating the rate of loss of cut is a clear indication that the aperture patterns of the inventive samples are an improvement over the comparative aperture pattern. Additionally, the inventive samples have a higher cumulative cut rate than the comparative sample. The percent increase in cumulative cut for Sample 1 (+14.75%) and for Sample 2 (+27.81) disproportionally exceeds the amount of greater abrasive area for Sample 1 (+5%) and Sample 2 (+6.8), which appears to indicate a synergistic abrasive performance effect due to increased swarf removal efficiency of the inventive aperture patterns and the use of a co-operative back-up pad. Further, the surface finish of the inventive samples is the same as or better (lower values indicate lower average roughness) than for the comparative samples.

TABLE 7

Abrasive Performance

| | No. of Apertures | Aperture Area (% of total potential surface area) | Cumulative Material Removed (g) | % Change (%) |
|---|---|---|---|---|
| Comp. 1 | 125 | 10.5 | .57 | 0 |
| Sample 1 | 246 | 5.0 | .66 | 14.75 |
| Sample 2 | 344 | 3.7 | .73 | 27.81 |

TABLE 8

Abrasive Performance

| | Average Rz Finish of 3 repeats after 1st Grind cycle | Average Rz Finish of 3 repeats after 6th Grind cycle |
|---|---|---|
| Comp. 1 | 64 | 58 |
| Sample 1 | 59 | 53 |
| Sample 2 | 64 | 54 |

Example 8

Abrasive Performance Test—With Vacuum and Corresponding Back-Up Pad

An abrasive performance test was conducted on vehicle side panels. The side panels were fiberglass and electro-deposition coated with primer. The vehicle side panels were abraded using a hand-held orbital sander fitted with a 6-inch abrasive disc, a back-up pad, and a vacuum attachment. Two control samples and three inventive samples were tested. The combinations of abrasive discs and back-up pads for the control samples and inventive samples are provided in Table and described in greater detail below.

For all testing, the vehicle side panels were abraded using a side to side motion covering successive rows across the surface of the vehicle side panel. Multiple runs were conducted for each pairing of the abrasive discs and back-up pads. The average life span of the abrasive discs and the average surface area abraded during the lifespan of the abrasive discs were measured. FIG. 24 shows a chart comparing the average lifespan and average area abraded during the lifespan for each of the Control and Inventive Samples.

The average lifespan and average area abraded during the lifespan of each sample was used to estimate and compare the time required to abrade 10,000 square feet of vehicle panel. The calculation assumes a time of 45 seconds to change an abrasive disc. FIG. 25 shows a chart comparing the time in hours needed to abrade 10,000 square feet of vehicle panel for the Control and Inventive samples.

Control Sample 1 used a Norton MultiAir 6" diameter coated abrasive disc with aluminum oxide grit of size P320 and had 181 die-cut apertures distributed in a grid pattern (one 7.8 mm radius aperture in the center of the disc plus 180 1.65 mm apertures surrounding the center aperture)(referred to hereinafter as "Die-Cut MultiAir Disc"). The total amount of aperture area was approximately 10% of the total area of the disc. A corresponding Norton MultiAir 6" diameter back-up pad (referred to hereinafter as "MultiAir Back-Up Pad") made of polyurethane foam and having 181 apertures in the same pattern as the Die-Cut MultiAir Disc was used during testing.

Control Sample 2 used a Norton MultiAir 6" coated abrasive disc the same as Control Sample 1 except that the apertures of the coated abrasive disc were laser cut apertures (referred to hereinafter as "Laser Cut MultiAir Disc"). A MultiAir Back-up Pad the same as in Control Sample 1 was used.

Figure 36:
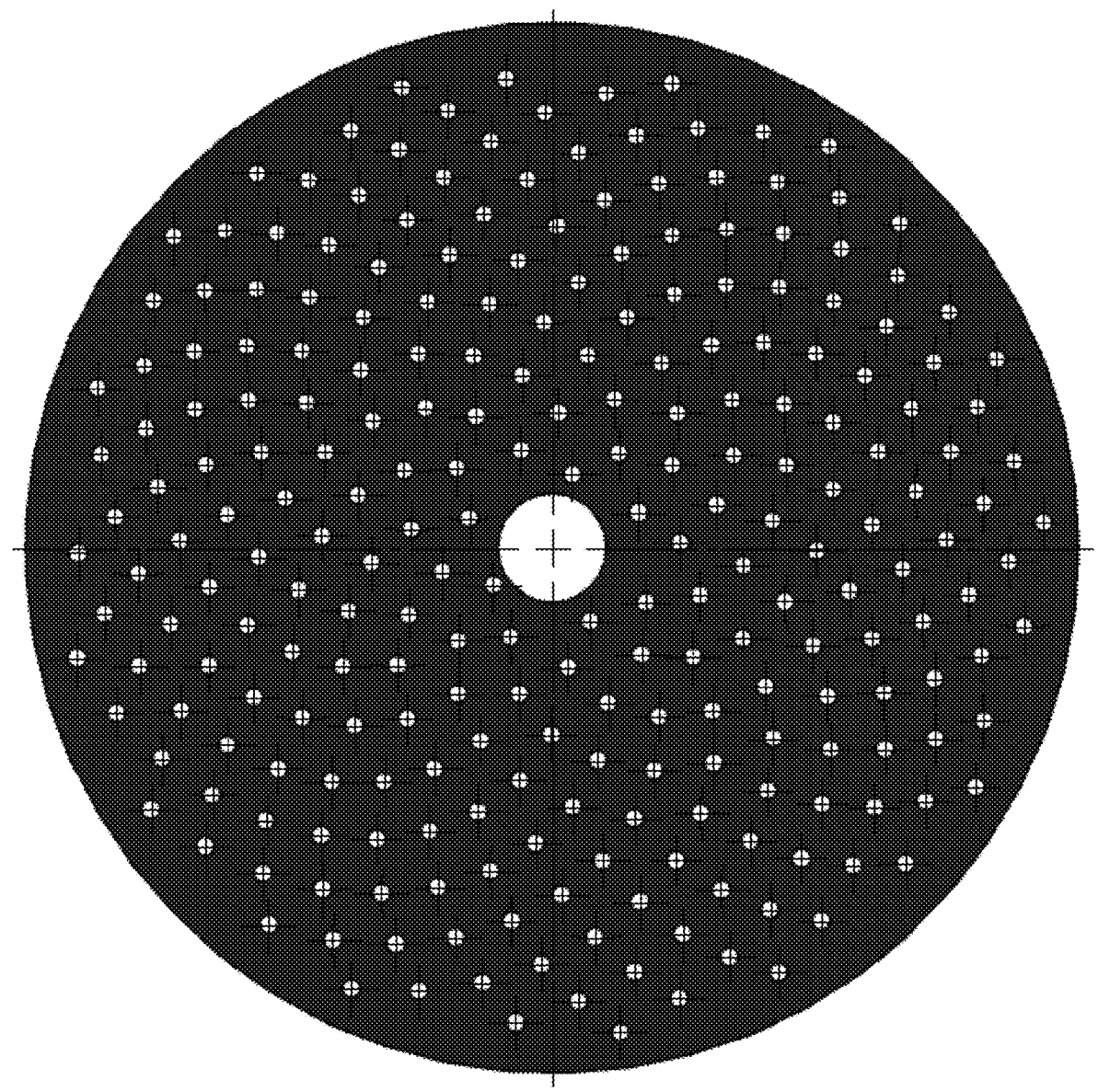
FIG. 36 is an illustration of the abrasive side of an embodiment of a coated abrasive having 247 apertures, 246 apertures around a central aperture, according to the present invention
Figure 37:
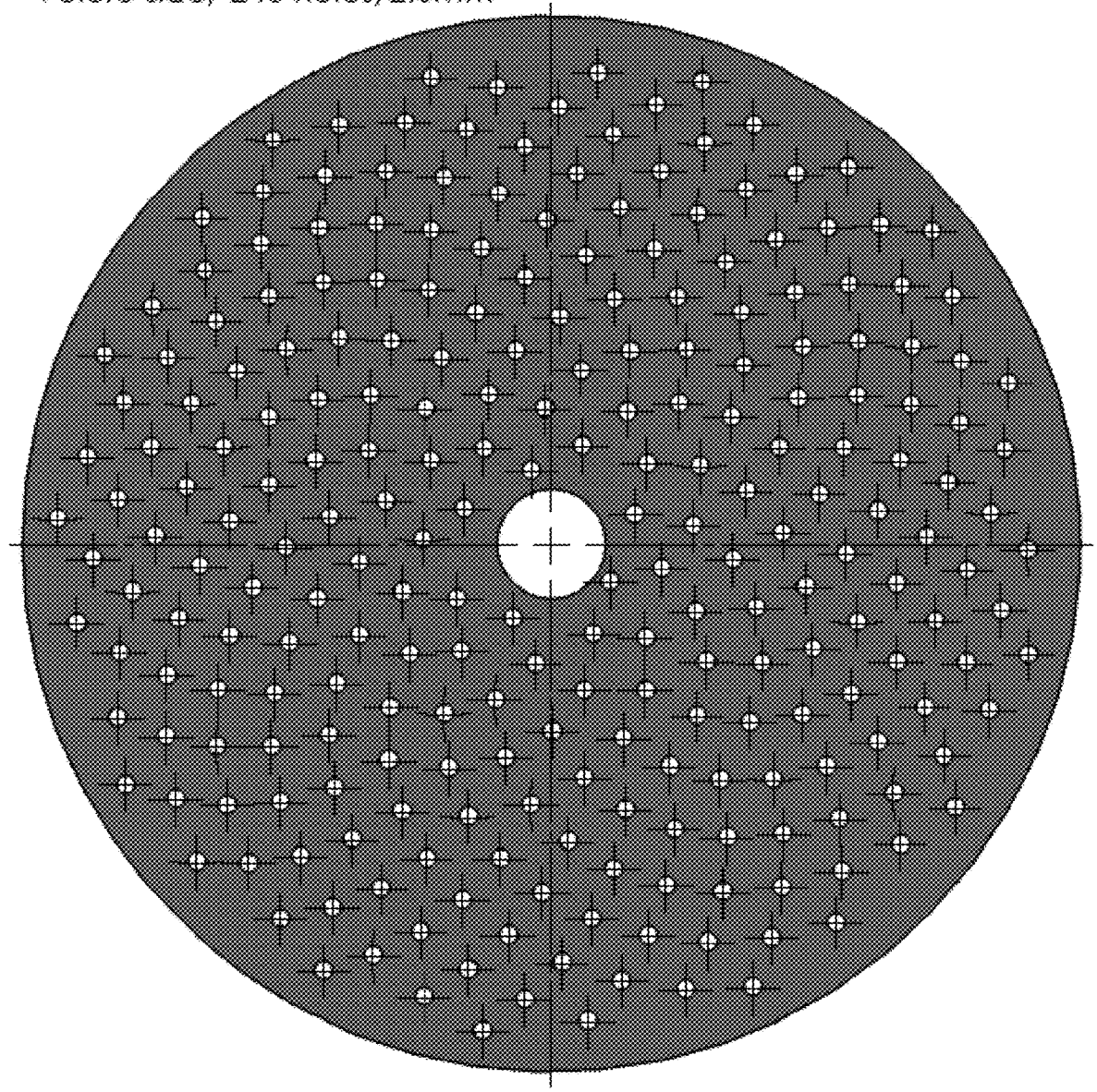
FIG. 37 is an illustration of the reverse side of the same embodiment shown in FIG. 36.
Figure 38:
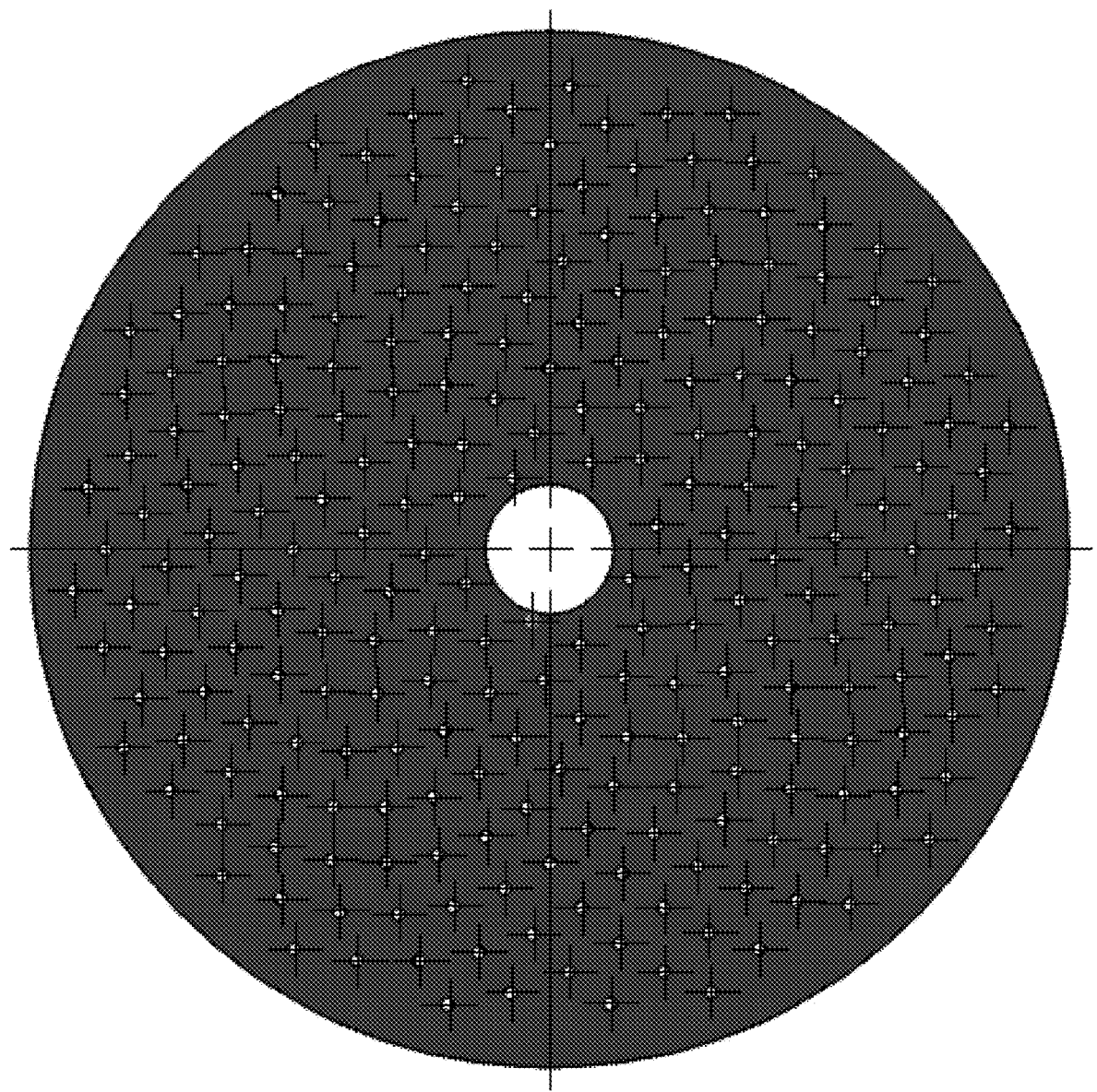
FIG. 38 is an illustration of the abrasive side of an embodiment of a coated abrasive having 251 apertures, 250 apertures around a central aperture, according to the present invention
Figure 39:
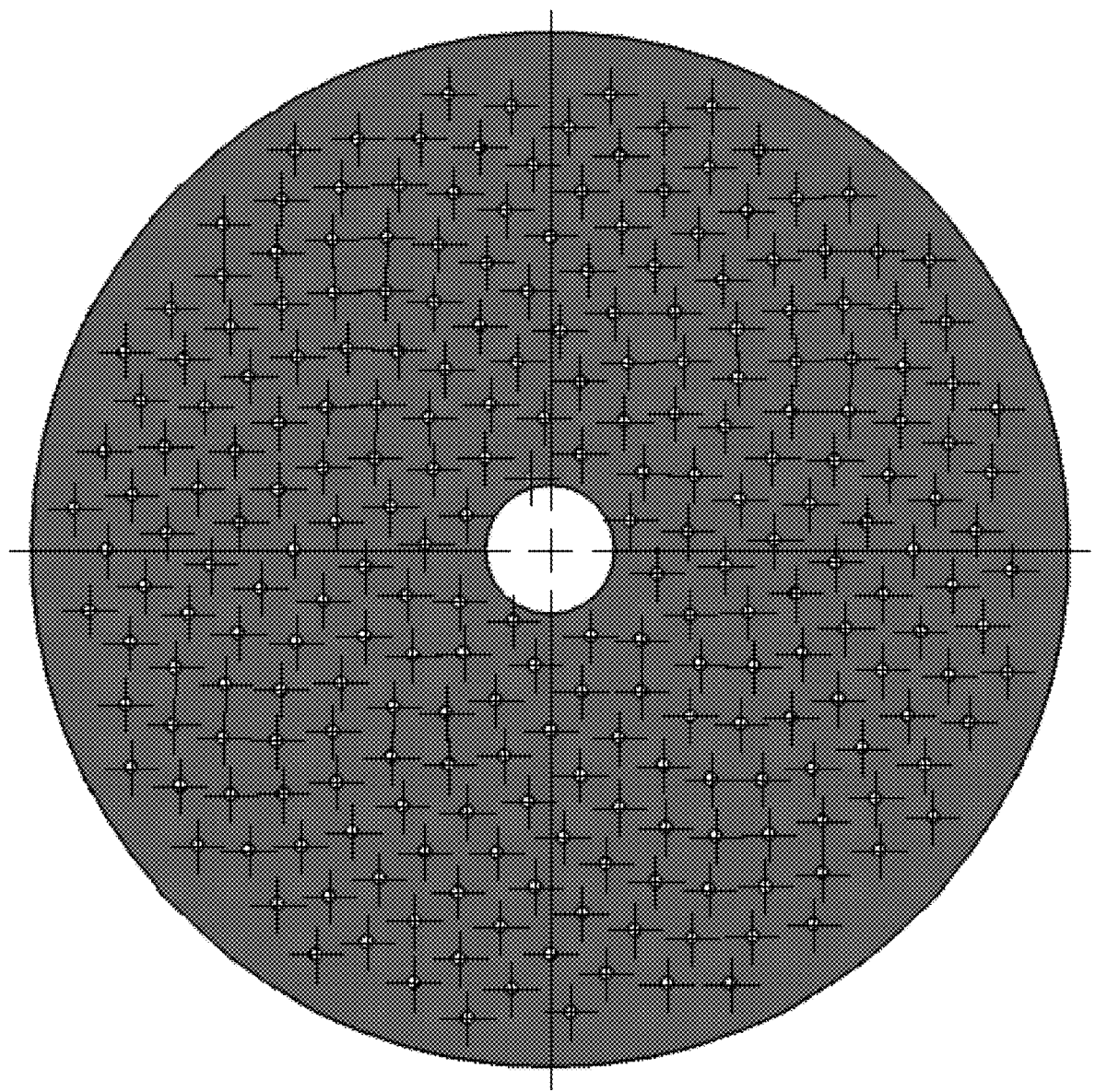
FIG. 39 is an illustration of the reverse side of the same embodiment shown in FIG. 38.
Figure 40:
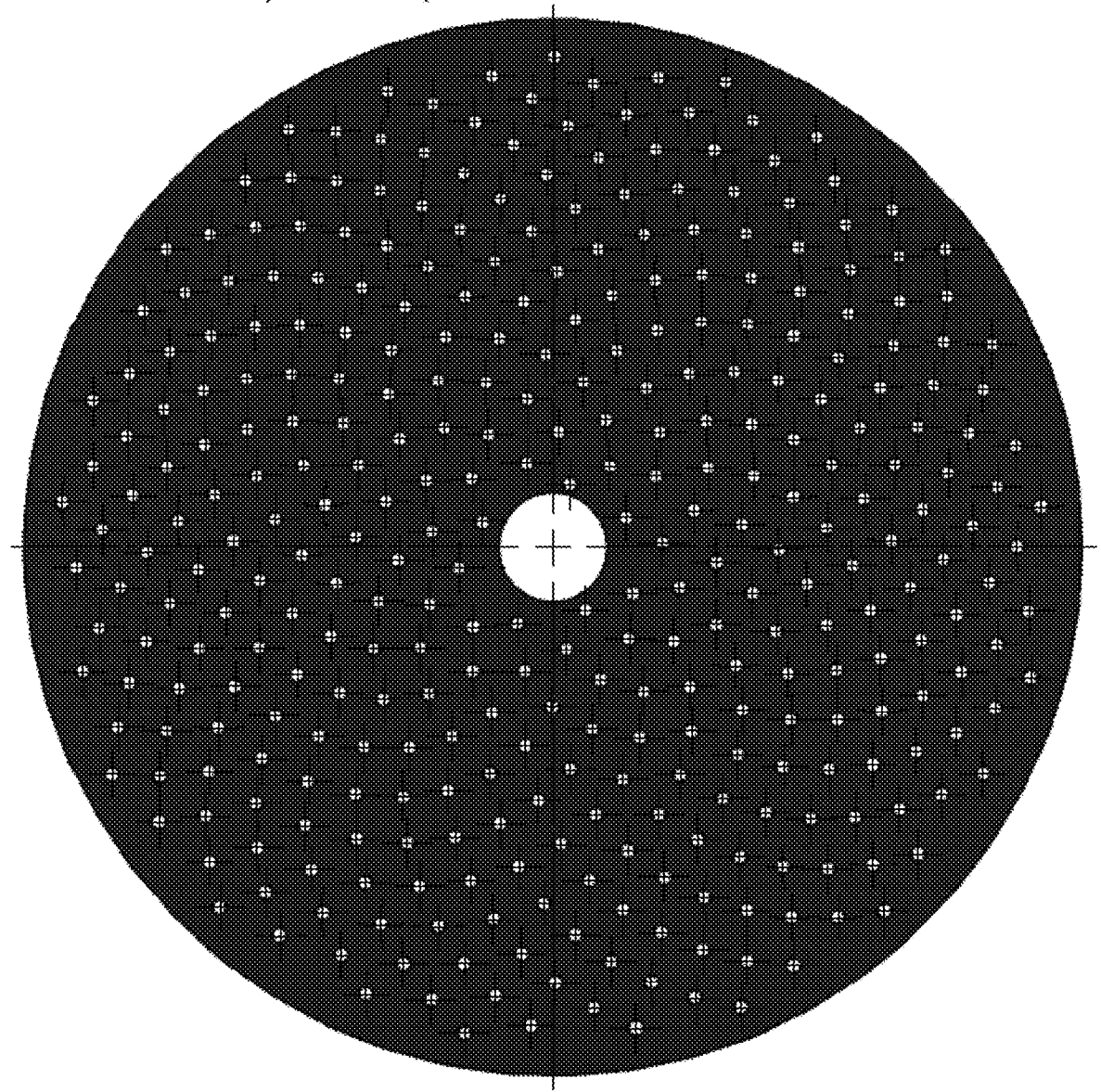
FIG. 40 is an illustration of the abrasive side of an embodiment of a coated abrasive having 346 apertures, 345 apertures around a central aperture, according to the present invention
Figure 41:
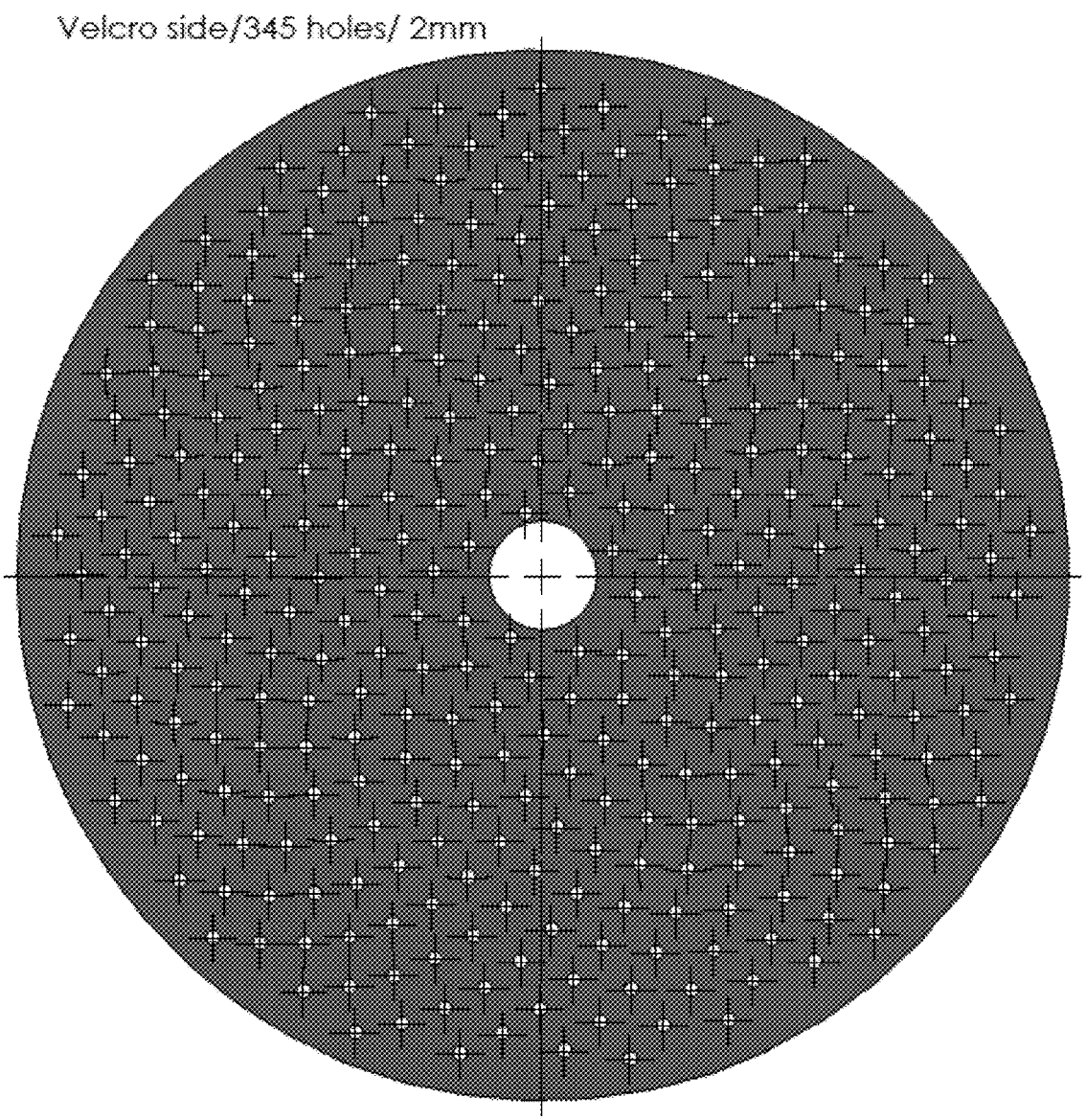
FIG. 41 is an illustration of the reverse side of the same embodiment shown in FIG. 40.
Figure 42:
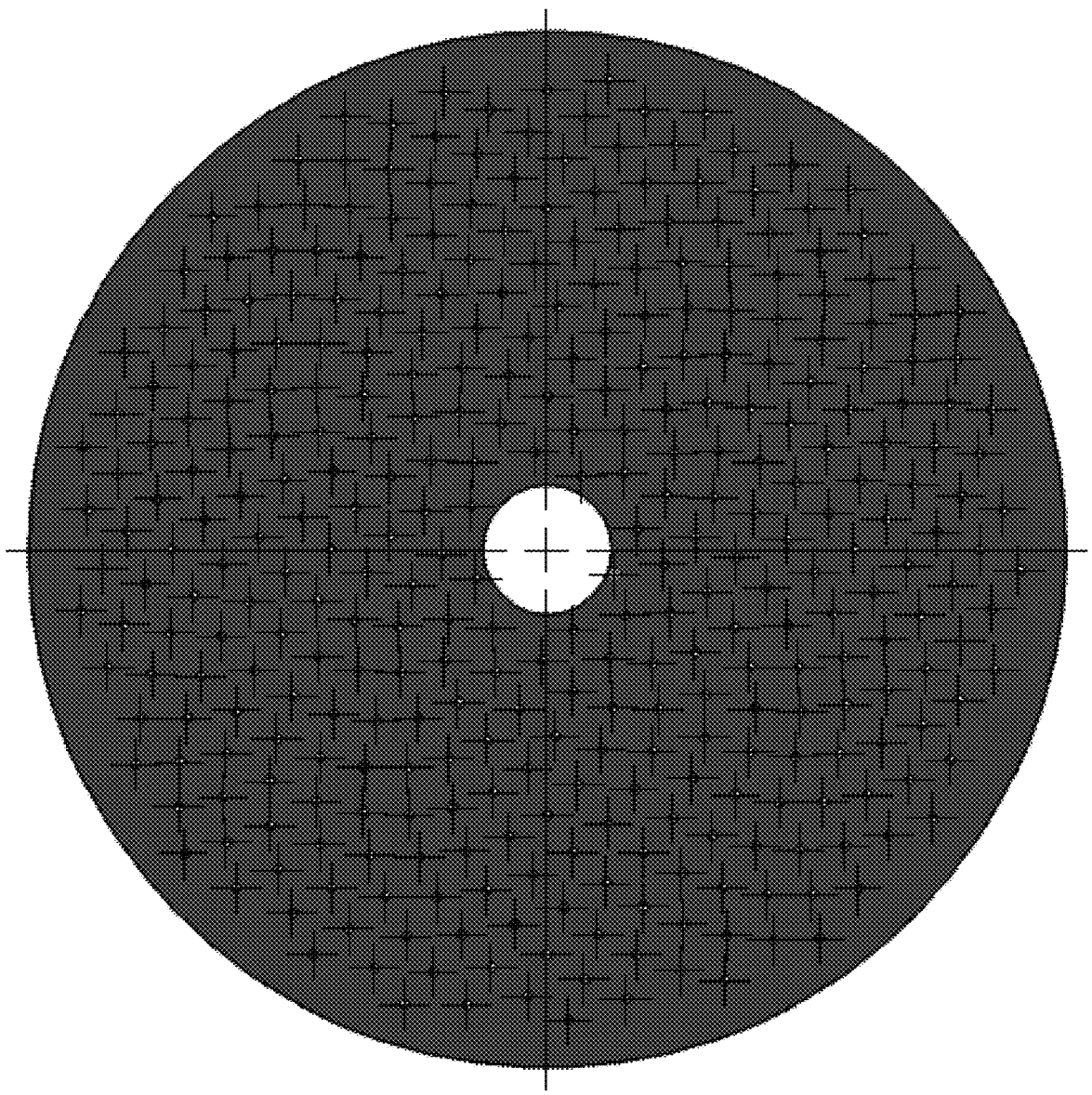
FIG. 42 is an illustration of the abrasive side of an embodiment of a coated abrasive having 351 apertures, 350 apertures around a central aperture, according to the present invention
Figure 43:
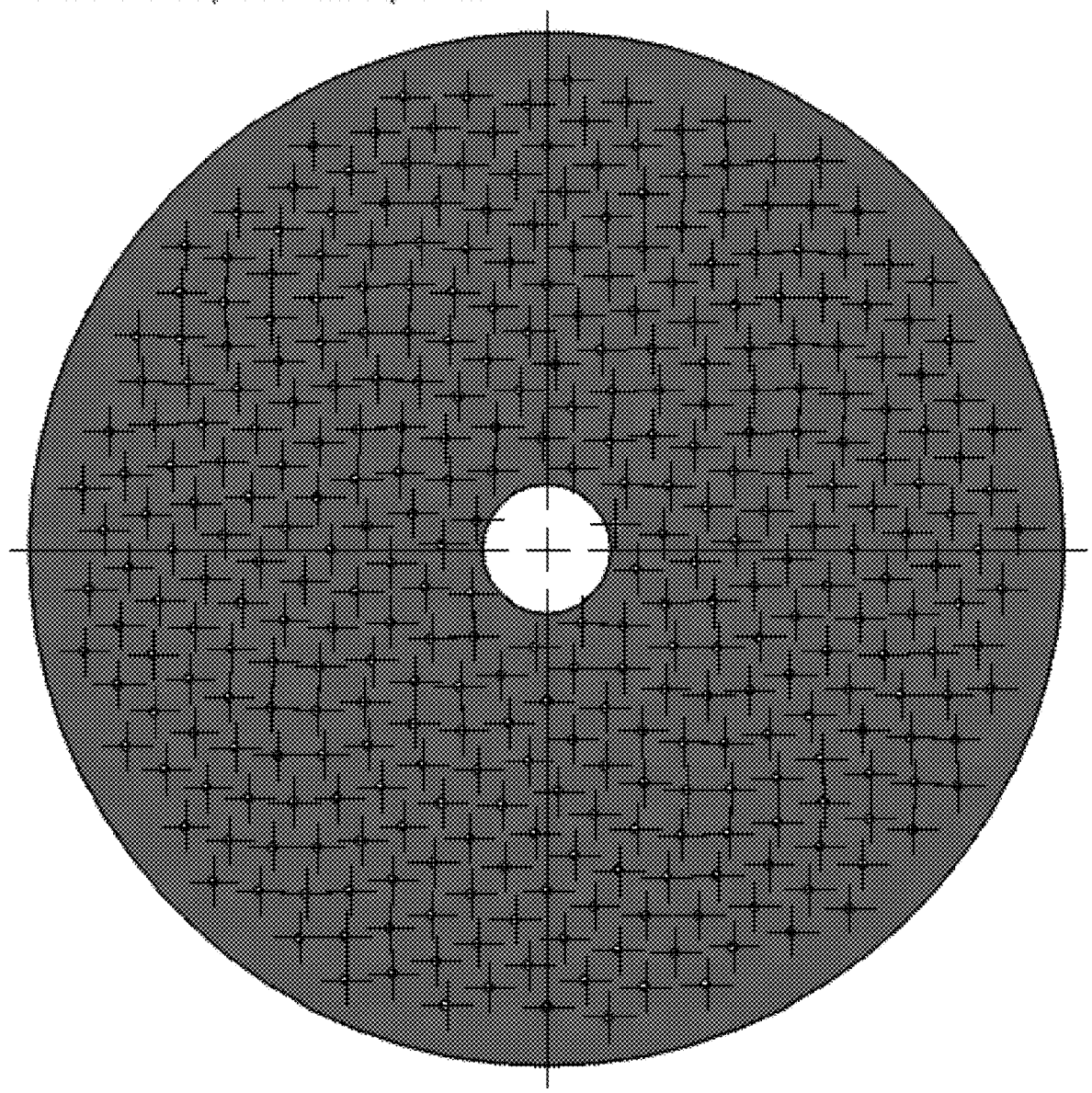
FIG. 43 is an illustration of the reverse side of the same embodiment shown in FIG. 42.
Figure 44:
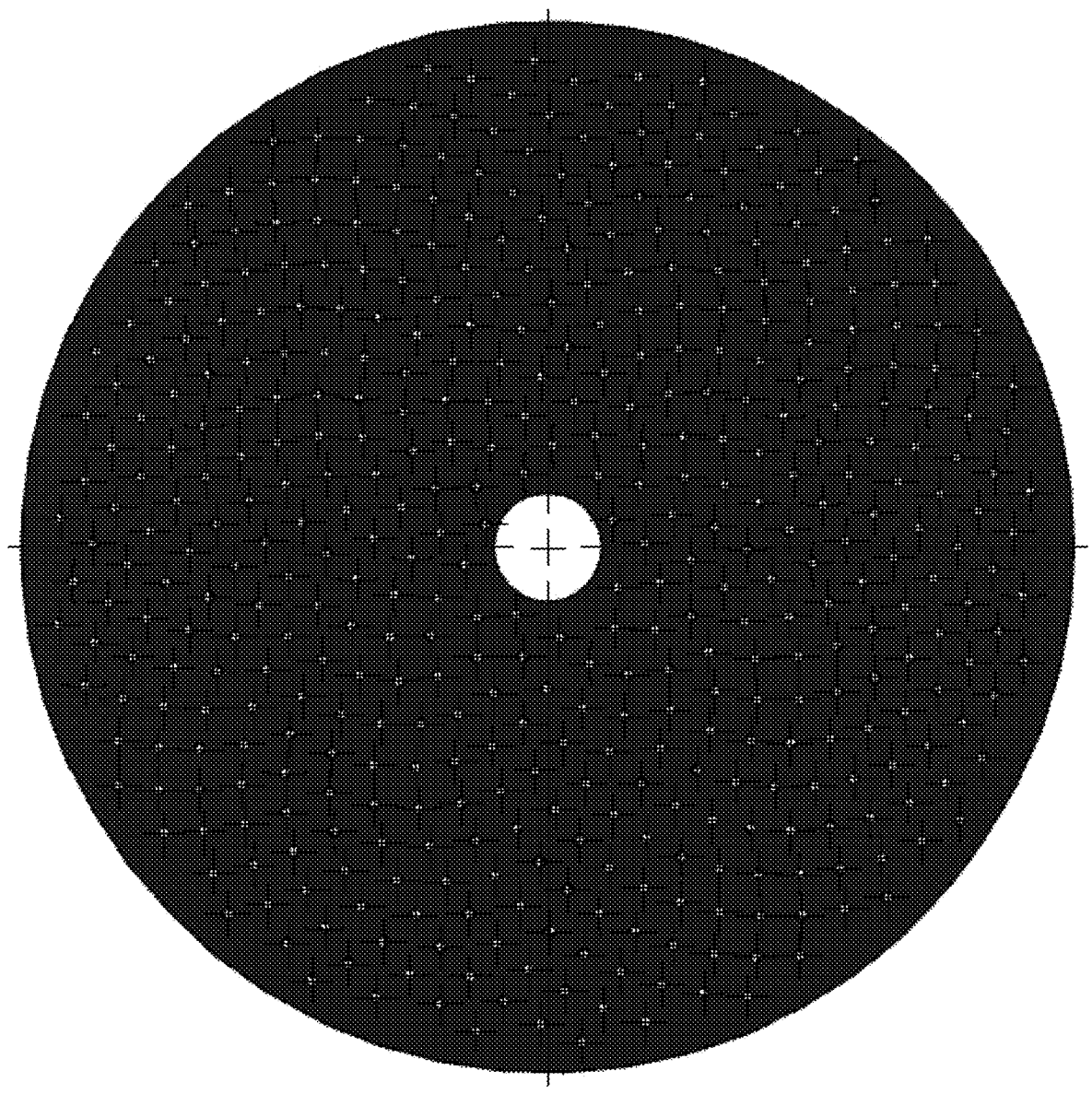
FIG. 44 is an illustration of the abrasive side of an embodiment of a coated abrasive having 442 apertures, 441 apertures around a central aperture, according to the present invention
Figure 45:
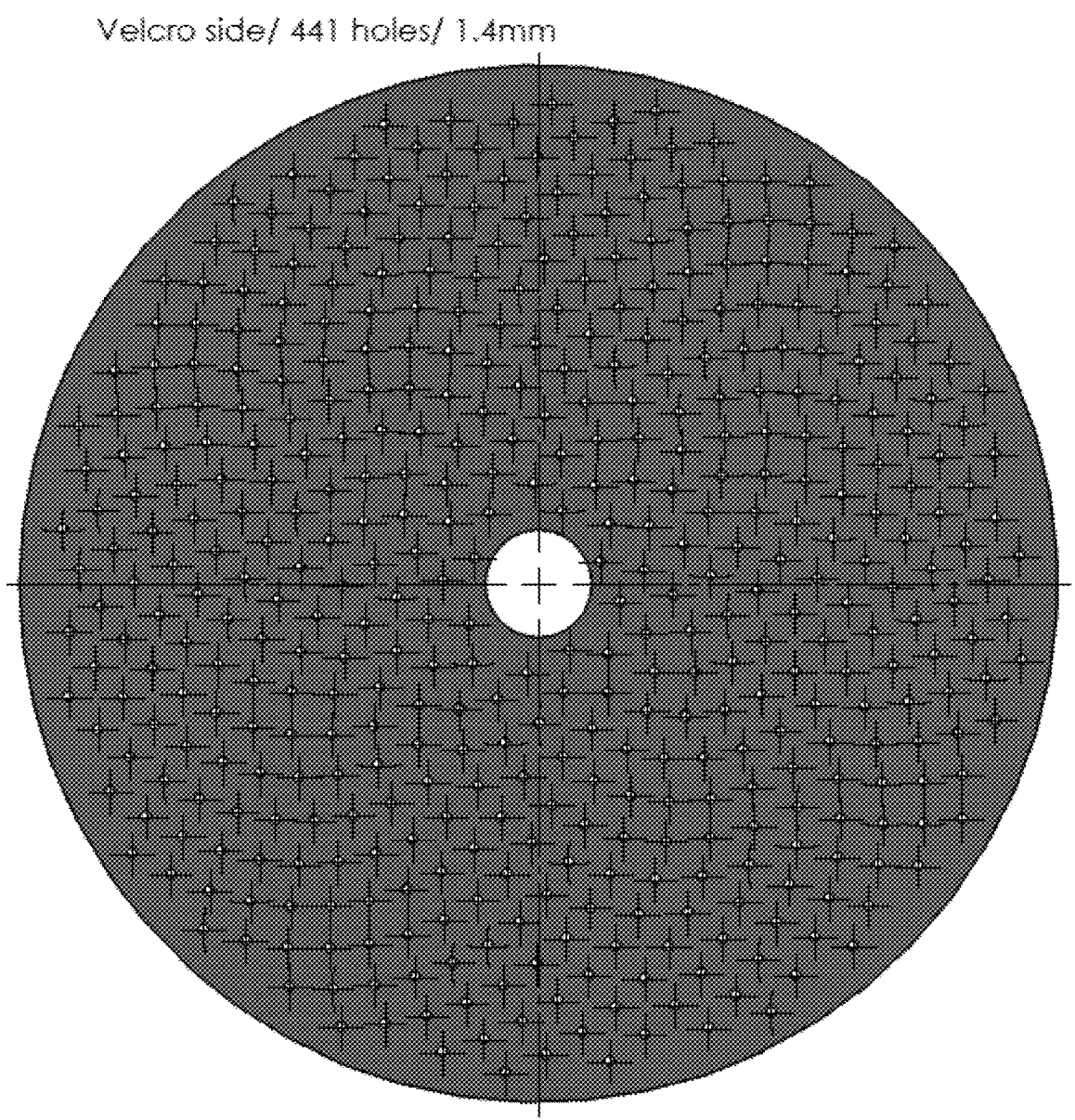
FIG. 45 is an illustration of the reverse side of the same embodiment shown in FIG. 44.

Inventive Sample 1 used a Laser Cut MultiAir abrasive disc the same as in Control Sample 2. An inventive 6" diameter back-up pad having spiral airflow channels based on a transpose of the Vogel equation was used (referred to hereinafter as "Sunflower back-up pad"). The Sunflower back-up pad had a two-fold symmetry and a spiral pattern adapted to correspond with a Vogel equation pattern having 247 total apertures. The spiral pattern comprised 34 outer spirals and 8 inner spirals each having a 1.3 mm width. The inner spirals and outer spirals were discrete from each other. Each of the spirals comprised a channel for the flow of air up through the apertures of the abrasive disc, along the channel, and up through the body of the back-up pad through at least one aperture disposed within the channel. See FIG. 36 and FIG. 46.

Inventive Sample 2 was a 6" diameter abrasive disc with P320 aluminum oxide abrasive grit and a phyllotactic aperture pattern according to the Vogel equation having a total number of 247 apertures (one 7.8 mm radius aperture in the center of the disc plus 246 1.3 mm apertures surrounding the center aperture)(referred to hereinafter as a Sunflower abrasive disc). The total amount of aperture area of the Sunflower disc was approximately 8% of the total disc area. A MultiAir Back-up Pad the same as in Control Sample 1 was used.

Inventive Sample 3 was a 6" diameter abrasive disc with P320 aluminum oxide abrasive grit and a phyllotactic aperture pattern according to the Vogel equation having a total number of 247 apertures (one 7.8 mm radius aperture in the center of the disc plus 246 1.3 mm apertures surrounding the center aperture)(referred to hereinafter as a Sunflower abrasive disc). The total amount of aperture area of the Sunflower disc was approximately 8% of the total disc area. A corresponding Sunflower back-up pad as in Inventive Sample 1 was used.

TABLE 9

Abrasive Performance

| | | Abrasive | Aperture Area | Disc Type | Back-Up Pad Type | Average Area covered (sq. in.) | Average Disc Lifespan (sec.) | Time to Abrade 10,000 sq. ft (hr) | % change time to abrade 10,000 sq. ft |
|---|---|---|---|---|---|---|---|---|---|
| Control 1 | | Aluminum Oxide P320 | 10% | 6-inch Die Punched MultiAir | 6-inch MultiAir Back-Up Pad | 1022 | 65 | 431.43 | 0% |

TABLE 9-continued

Abrasive Performance

|  | Abrasive | Aperture Area | Disc Type | Back-Up Pad Type | Average Area covered (sq. in.) | Average Disc Lifespan (sec.) | Time to Abrade 10,000 sq. ft (hr) | % change time to abrade 10,000 sq. ft |
|---|---|---|---|---|---|---|---|---|
| Control 2 | Aluminum Oxide P320 | 10% | 6-inch Laser Cut MultiAir | 6-inch MultiAir Back-Up Pad | 964 | 58 | 425.43 | −1% |
| Sample 1 | Aluminum Oxide P320 | 10% | 6-inch Laser Cut MultiAir | 6-inch Sunflower Back-Up Pad | 1408 | 88 | 376.30 | −13% |
| Sample 2 | Aluminum Oxide P320 | 8% | 6-inch Laser Cut Sunflower | 6-inch MultiAir Back-Up Pad | 1205 | 91 | 420.23 | −3% |
| Sample 3 | Aluminum Oxide P320 | 8% | 6-inch Laser Cut Sunflower | 6-inch Sunflower Back-Up Pad | 1504 | 78 | 326.45 | −24% |

Sample 1 demonstrates that the Sunflower Back-up pad was usable with the state-of-the art MultiAir disc and the paring of the Sunflower Back-up pad contributed to a greater total surface area abraded and a longer abrasive disc lifespan compared to Control 1 and Control 2. The amount of time required to abrade 10,000 square foot of panel was reduced by 13%.

Sample 2 demonstrates that the Sunflower abrasive disc was usable with the state-of-the art MultiAir back-up pad and the paring of the Sunflower abrasive disc contributed to a greater total surface area abraded and a longer abrasive disc lifespan compared to Control 1 and Control 2. The amount of time required to abrade 10,000 square foot of panel was reduced by 3%.

Sample 3 demonstrates that the pairing of the Sunflower abrasive disc and Sunflower back-up pad contributed to a greater total surface area abraded and a longer abrasive disc lifespan compared to the pairing of the MultiAir disc and MultiAir Back-up pad. Further, the pairing of the Sunflower abrasive disc and Sunflower back-up pad provided the highest total surface area abraded of all the test combinations. The amount of time required to abrade 10,000 square foot of panel was reduced by 24%. It is noted that the 24% reduction appears to synergistic, as the reduction is greater than the sum of the reduction for Sample 1 (Sunflower back-up pad—13% reduction) plus the reduction for sample 2 (Sunflower abrasive disk—3% reduction). It is also pointed out that the Sunflower abrasive disk achieves a higher abrasive performance even while having a smaller aperture area for swarf removal.

Example 9

Cutting Efficiency Testing

An abrasive performance test was conducted on vehicle side panels to estimate the cutting efficiency of various combinations of abrasive discs and back-up pads. The vehicle side panels were fiberglass and electro-deposition coated with primer as above in Example 8. The vehicle side panels were abraded using a hand-held orbital sander equipped with a 6-inch abrasive disc, a back-up pad, and a vacuum attachment as in Example 8. Three inventive samples and one control sample were tested. The MultiAir and Sunflower abrasive discs were the same as above for Example 8, except the abrasive grit was aluminum oxide size p80. The combinations of abrasive discs and back-up pads for the control sample and inventive samples are provided in Table 10 and described in greater detail below.

For all testing, the vehicle side panels were abraded using a side to side motion covering successive rows across the surface of the panel the same as above in Example 8. A single abrasive disc was used to provide controlled abrasion over the panel until the end of life of the disc was reached. The time to reach the end of life of the abrasive disc and the total area abraded were recorded. The cutting efficiency (total area abraded/lifespan) was calculated. FIG. 26 shows a chart comparing the calculated cutting efficinecies of the control and inventive samples.

TABLE 10

Abrasive Performance

|  | Abrasive | Aperture Area Disc | Disc Type | Back-Up Pad Type | Area covered (sq. in.) | Disc Lifespan (sec.) | Cutting Efficiency (Sq ft./sec) | % change |
|---|---|---|---|---|---|---|---|---|
| Control 1 | Aluminum Oxide P80 | 10% | 6-inch Die Punched MultiAir | 6-inch MultiAir Back-Up Pad | 1050 | 100.77 | .0724 | 0% |

TABLE 10-continued

| | | | | | | | | |
|---|---|---|---|---|---|---|---|---|
| | | | Abrasive Performance | | | | | |
| | Abrasive | Aperture Area Disc | Disc Type | Back-Up Pad Type | Area covered (sq. in.) | Disc Lifespan (sec.) | Cutting Efficiency (Sq ft./sec) | % change |
| Sample 1 | Aluminum Oxide P80 | 8% | 6-inch Laser Cut Sunflower | 6-inch MultiAir Back-Up Pad | 1170 | 100.26 | .0810 | 12% |
| Sample 2 | Aluminum Oxide P80 | 8% | 6-inch Laser Cut Sunflower | 6-inch Sunflower Back-Up Pad | 1152 | 101.26 | .0790 | 9% |

Sample 1 and Sample 2 demonstrated an improvement in cutting efficiency and an improvement in total area abraded compared to Control 1. Sample 1 had a 12% improvement in cutting efficiency compared to Control 1 and Sample 2 had a 9% improvement in cutting efficiency over Control 1.

Example 10

Cutting Efficiency Testing

An abrasive performance test was conducted on vehicle side panels to estimate the cutting efficiency of various combinations of abrasive discs and back-up pads. The vehicle side panels were fiberglass and electro-deposition coated with primer as above in Example 9. The vehicle side panels were abraded using a hand-held orbital sander equipped with a 6-inch abrasive disc, a back-up pad, and a vacuum attachment as in Example 9. Three inventive samples and one control sample were tested. The MultiAir and Sunflower abrasive discs were the same as above for Example 9, except the abrasive grit was a blend of p80 size ceramic aluminum oxide and sol-gel aluminum oxide. The combinations of abrasive discs and back-up pads for the control sample and inventive samples are provided in Table 6_ and described in greater detail below.

Figure 27:
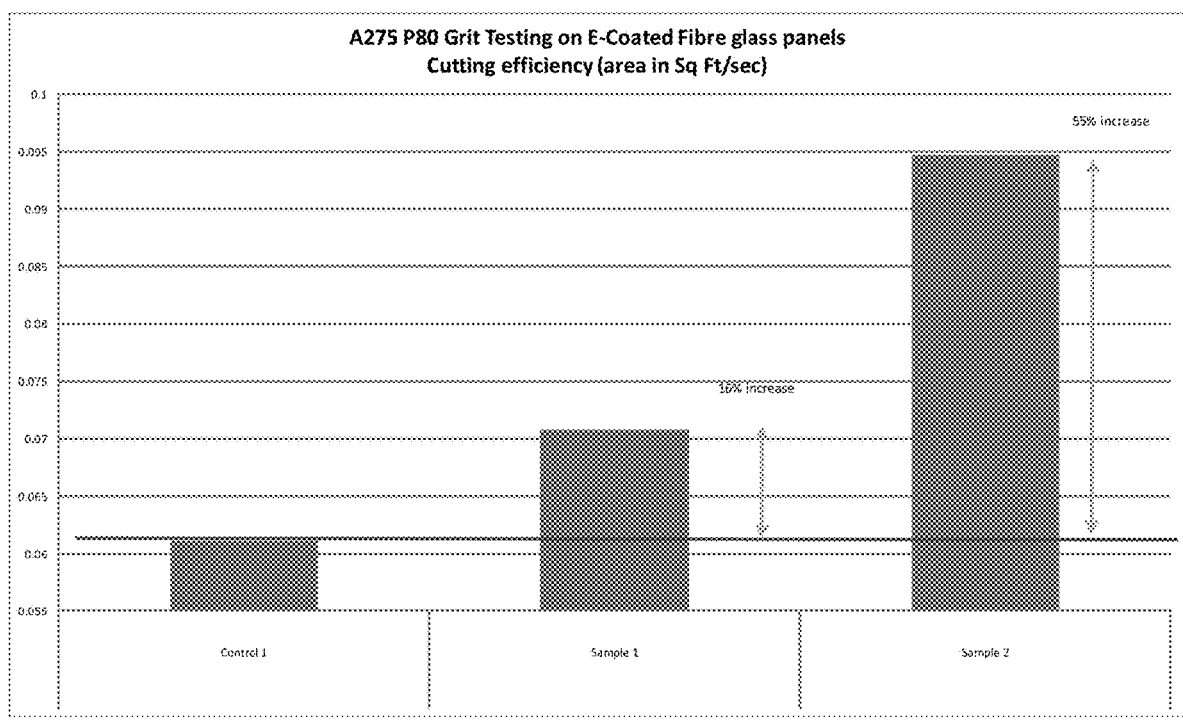
FIG. 27 is a another graph comparing cutting efficiency on vehicle paneling using other exemplary coated abrasive discs and back-up pads according to the present invention with combinations of state-of-the art coated abrasives and back-up pads
Figure 28:
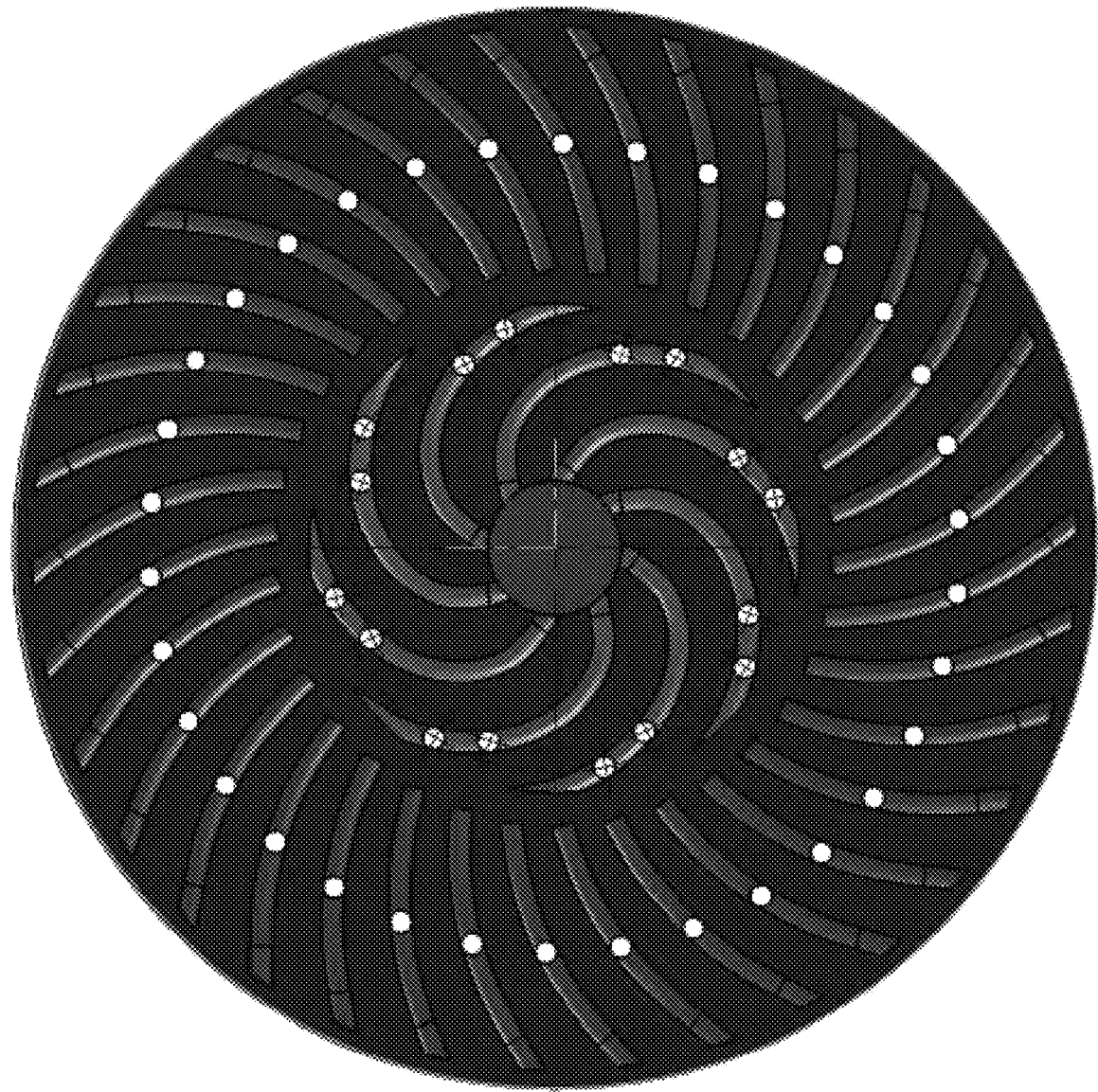
FIG. 28 is an illustration of an embodiment of a back-up pad having a pattern of spiral paths; 34 outer spiral paths and 8 inner spiral paths, according to the present invention. The back-pad pattern corresponds to a Vogel equation pattern having 151 apertures.
Figure 29:
FIG. 29 is an illustration of another embodiment of a back-up pad having a pattern of spiral paths; 34 outer spiral paths and 8 inner spiral paths, according to the present invention. The back-pad pattern corresponds to a Vogel equation pattern having 251 apertures.
Figure 30:
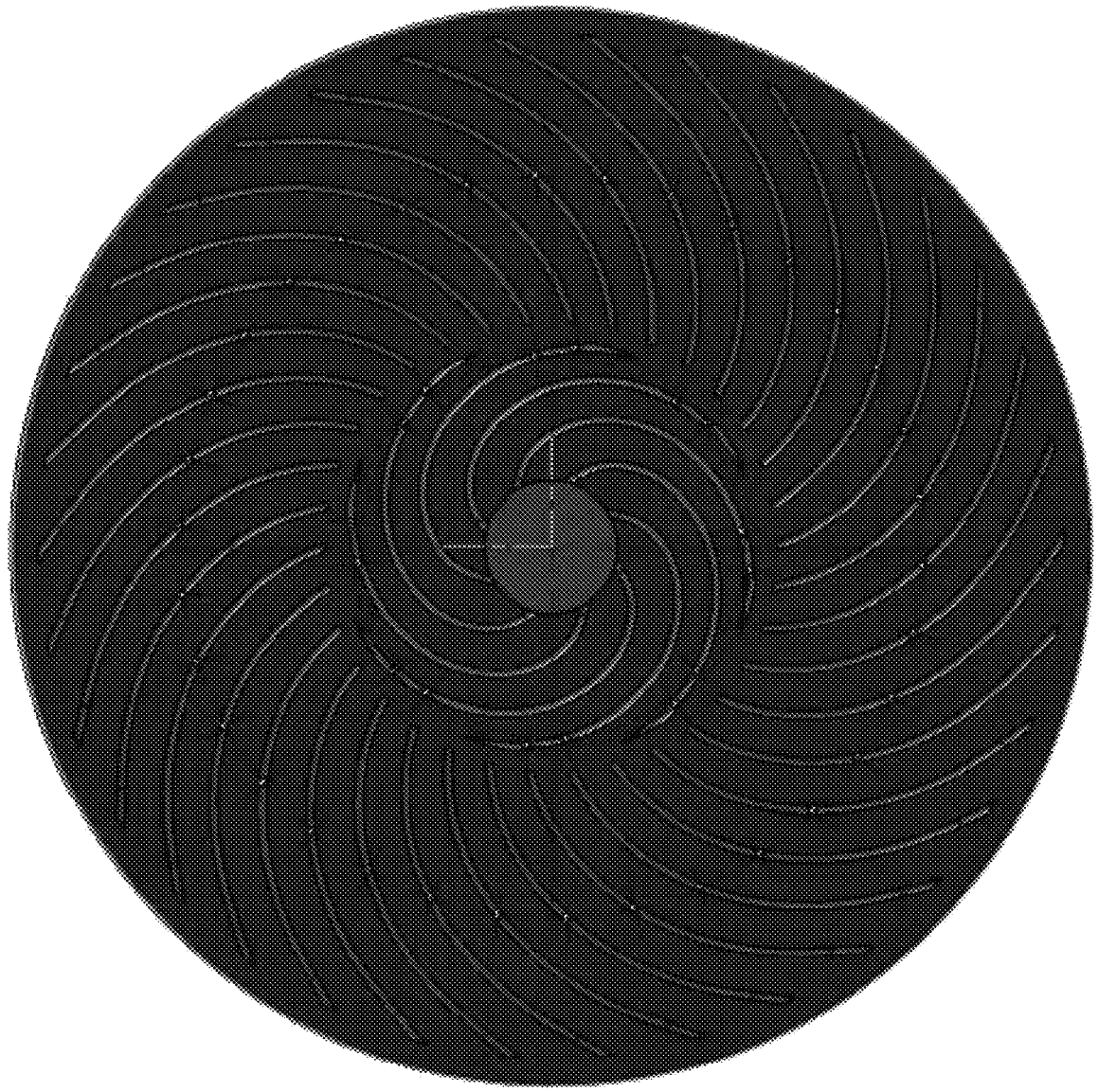
FIG. 30 is an illustration of another embodiment of a back-up pad having a pattern of spiral paths; 34 outer spiral paths and 8 inner spiral paths, according to the present invention. The back-pad pattern corresponds to a Vogel equation pattern having 351 apertures.
Figure 31:
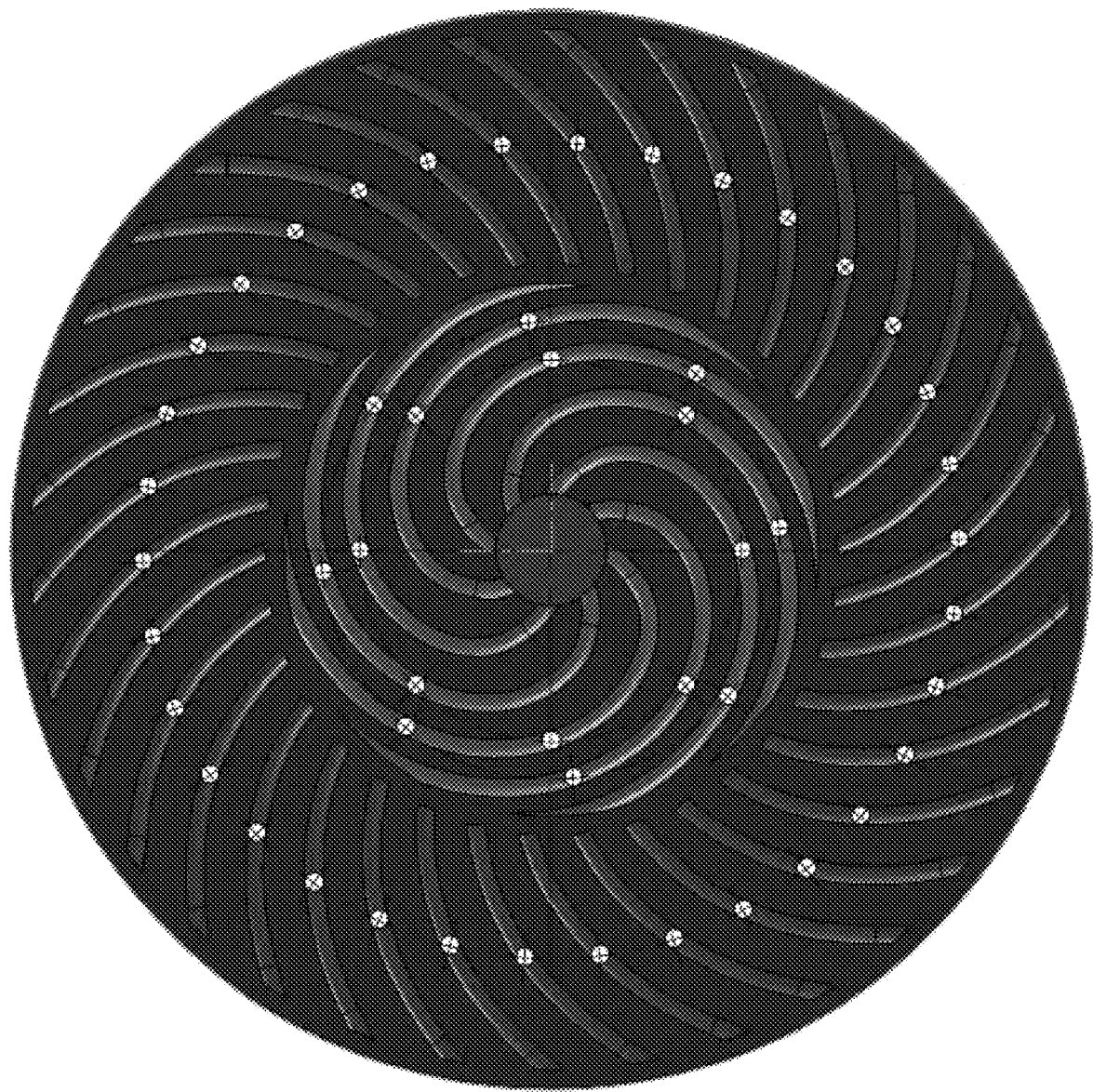
FIG. 31 is an illustration of embodiment of a back-up pad having a pattern of spiral paths; 34 outer spiral paths and 8 inner spiral paths, according to the present invention. The back-pad pattern corresponds to a Vogel equation pattern having 247 apertures.
Figure 32:
FIG. 32 is an illustration of embodiment of a back-up pad having a pattern of spiral paths; 34 outer spiral paths and 8 inner spiral paths, according to the present invention. The back-pad pattern corresponds to a Vogel equation pattern having 346 apertures.
Figure 33:
FIG. 33 is an illustration of embodiment of a back-up pad having a pattern of spiral paths; 34 outer spiral paths and 8 inner spiral paths, according to the present invention. The back-pad pattern corresponds to a Vogel equation pattern having 442 apertures.
Figure 34:
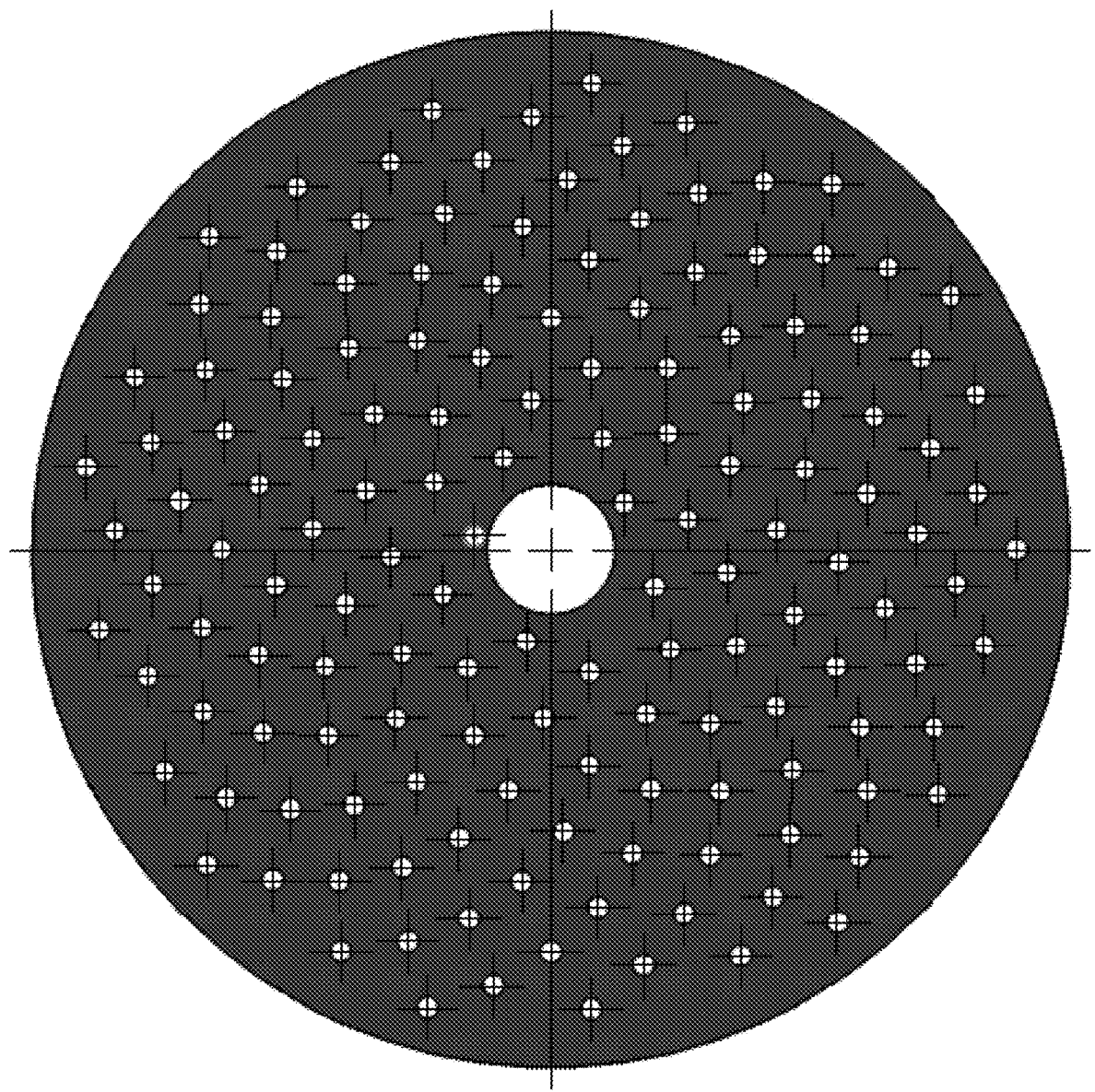
FIG. 34 is an illustration of the abrasive side of an embodiment of a coated abrasive having 151 apertures, 150 apertures around a central aperture, according to the present invention
Figure 35:
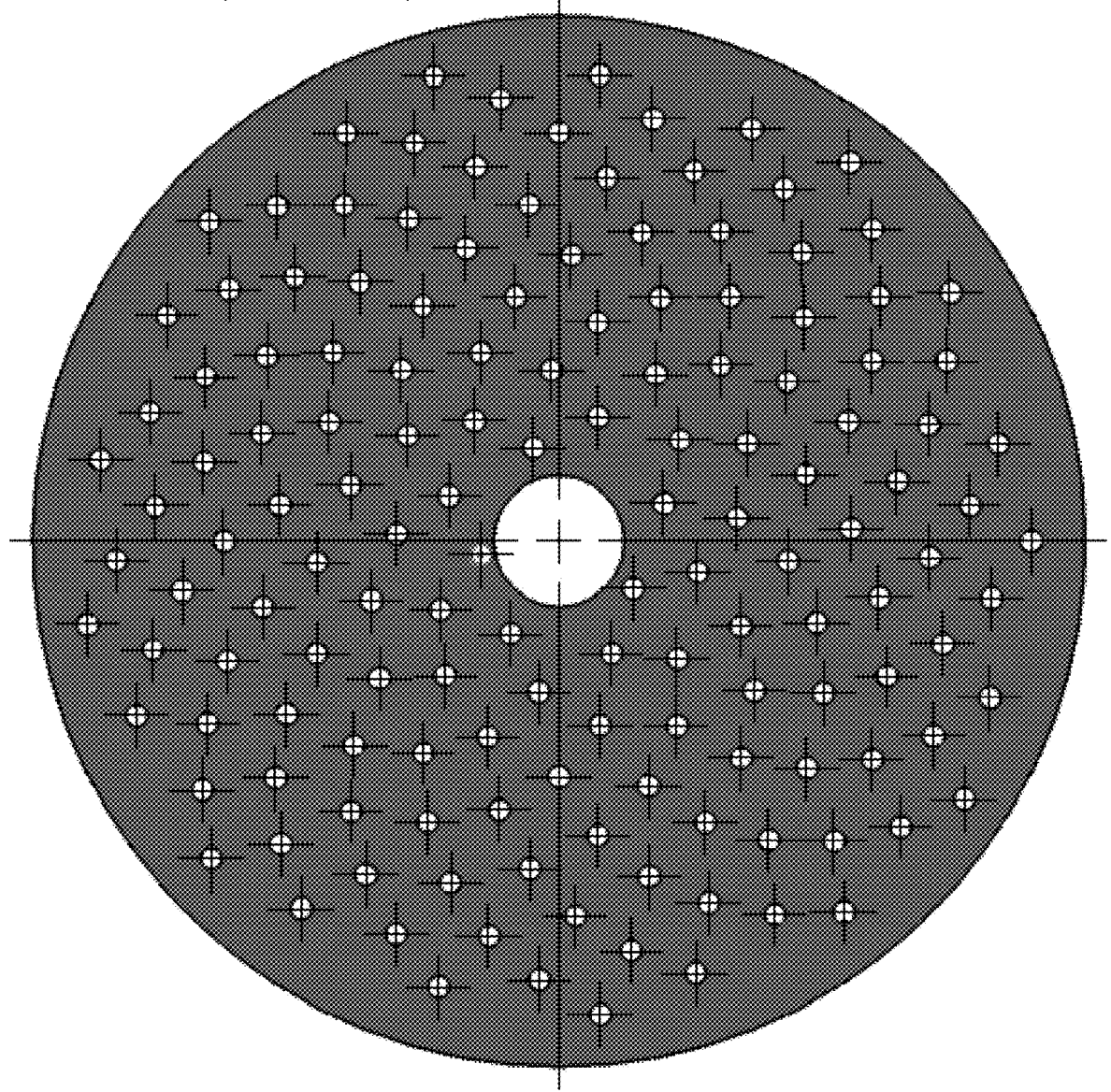
FIG. 35 is an illustration of the reverse side of the same embodiment shown in FIG. 34.

For all testing, the vehicle side panels were abraded using a side to side motion covering successive rows across the surface of the panel the same as above in Example 9. A single abrasive disc was used to provide controlled abrasion over the panel until the end of life of the disc was reached. The time to reach the end of life of the abrasive disc and the total area abraded were recorded. The cutting efficiency (total area abraded/lifespan) was calculated. FIG. 27 shows a chart comparing the calculated cutting efficiencies of the control and inventive samples.

TABLE 11

| | | | | | | | | |
|---|---|---|---|---|---|---|---|---|
| | | | Abrasive Performance | | | | | |
| | Abrasive | Aperture Area Disc | Disc Type | Back-Up Pad Type | Area covered (sq. in.) | Disc Lifespan (sec.) | Cutting Efficiency (Sq ft./sec) | % change |
| Control 1 | Aluminum Oxide P80 | 10% | 6-inch Die Punched MultiAir | 6-inch MultiAir Back-Up Pad | 883.5 | 100.36 | .0642 | 0% |
| Sample 1 | Aluminum Oxide P80 | 8% | 6-inch Laser Cut Sunflower | 6-inch MultiAir Back-Up Pad | 1037 | 101.75 | .0708 | 16% |
| Sample 2 | Aluminum Oxide P80 | 8% | 6-inch Laser Cut Sunflower | 6-inch Sunflower Back-Up Pad | 1368 | 100.3 | .0947 | 55% |

Sample 1 and Sample 2 demonstrated an improvement in cutting efficiency and an improvement in total area abraded compared to Control 1. Sample 1 had a 16% improvement in cutting efficiency compared to Control 1 and Sample 2 had a 55% improvement in cutting efficiency over Control 1.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An abrasive system comprising:
   a coated abrasive; and
   a back-up pad,
   wherein the coated abrasive comprises a controlled non-uniform distribution pattern of apertures, and
   wherein the back-up pad comprises a plurality of air flow paths disposed in a pattern adapted to correspond with the apertures of the coated abrasive,
   wherein of the x and y co-ordinates of the aperture pattern are transported and rotated according to equation (II), below, to determine x' and y' co-ordinates of the pattern of air flow paths, wherein θ is equal to π/n in radians and n is any integer:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}. \quad (II)$$

2. The system of claim 1, wherein the controlled non-uniform distribution pattern of apertures is a phyllotactic pattern.

3. The system of claim 2, wherein the controlled non-uniform distribution pattern of apertures is the Vogel equation.

4. The system of claim 1, wherein the pattern of air flow paths is a spiral pattern or a phyllotactic pattern.

* * * * *

UNITED STATES PATENT AND TRADEMARK OFFICE
CERTIFICATE OF CORRECTION

| | |
|---|---|
| PATENT NO. | : 11,504,822 B2 |
| APPLICATION NO. | : 16/104649 |
| DATED | : November 22, 2022 |
| INVENTOR(S) | : Anuj Seth et al. |

Page 1 of 1

It is certified that error appears in the above-identified patent and that said Letters Patent is hereby corrected as shown below:

On the Title Page

In Column 2, item (56), page 2, OTHER PUBLICATIONS, Line 11, please delete "Simon Zurcher, "line." Undergraduate Thesis," and insert --Simon ZURCHER, "linc." Undergraduate Thesis,--

In the Claims

In Column 34, Line 24, please delete "are transported and" and insert --are transposed and--

Signed and Sealed this
Eleventh Day of June, 2024

Katherine Kelly Vidal
*Director of the United States Patent and Trademark Office*